US010449740B2

(12) United States Patent
Qian et al.

(10) Patent No.: US 10,449,740 B2
(45) Date of Patent: Oct. 22, 2019

(54) METHOD FOR APPLYING STABLE COATING ON SILICONE HYDROGEL CONTACT LENSES

(71) Applicant: Novartis AG, Basel (CH)

(72) Inventors: Xinming Qian, Johns Creek, GA (US); Jared Nelson, Buford, GA (US); Robert Carey Tucker, Suwanee, GA (US); Steve Yun Zhang, Sugar Hill, GA (US); Daqing Wu, Suwanee, GA (US); Leroy Wainaina Muya, Duluth, GA (US); Dharmesh Patel, Atlanta, GA (US); Zach Munoz, Smyrna, GA (US); Yongxing Qiu, Suwanee, GA (US); Chung-Yuan Chiang, Johns Creek, GA (US); Ritu Shrestha, Pasadena, CA (US); Kelly Kayi Tallau, Johns Creek, GA (US)

(73) Assignee: Novartis AG, Basel (CH)

( * ) Notice: Subject to any disclaimer, the term of this patent is extended or adjusted under 35 U.S.C. 154(b) by 339 days.

(21) Appl. No.: 15/376,708

(22) Filed: Dec. 13, 2016

(65) Prior Publication Data
US 2017/0165932 A1 Jun. 15, 2017

Related U.S. Application Data

(60) Provisional application No. 62/304,494, filed on Mar. 7, 2016, provisional application No. 62/267,316, filed on Dec. 15, 2015.

(51) Int. Cl.
B29D 11/00 (2006.01)
G02B 1/04 (2006.01)
G02C 7/04 (2006.01)
B29K 83/00 (2006.01)
B29K 105/00 (2006.01)

(52) U.S. Cl.
CPC .. B29D 11/00865 (2013.01); B29D 11/00038 (2013.01); B29D 11/00144 (2013.01); G02B 1/043 (2013.01); G02C 7/049 (2013.01); *B29D 11/0025* (2013.01); *B29K 2083/00* (2013.01); *B29K 2105/0002* (2013.01); *B29K 2105/0061* (2013.01); *B29K 2995/0092* (2013.01); *G02C 2202/16* (2013.01)

(58) Field of Classification Search
CPC ........ B29D 11/00865; B29D 11/00038; B29D 11/00144; G02B 1/043; G02C 7/049
See application file for complete search history.

(56) References Cited

U.S. PATENT DOCUMENTS

| 2,296,891 A | 9/1942 | Bjorn |
| 2,926,154 A | 2/1960 | Keim |
| 3,224,986 A | 12/1965 | Butler et al. |
| 3,408,429 A | 10/1968 | Otto |
| 3,434,984 A | 3/1969 | Hyland |
| 3,488,327 A | 1/1970 | Kollinsky et al. |
| 3,566,874 A | 3/1971 | Shepherd et al. |
| 3,583,950 A | 6/1971 | Kollinsky et al. |
| 3,598,790 A | 8/1971 | Kollinsky et al. |
| 3,609,126 A | 9/1971 | Asao et al. |
| 3,616,935 A | 11/1971 | Love et al. |
| 3,617,344 A | 11/1971 | Leininger et al. |
| 3,634,123 A | 1/1972 | Eriksson et al. |
| 3,639,141 A | 2/1972 | Dyck |
| 3,663,288 A | 5/1972 | Miller |
| 3,695,921 A | 10/1972 | Shepherd et al. |
| 3,700,623 A | 10/1972 | Keim |
| 3,717,502 A | 2/1973 | Masuhara et al. |
| 3,772,076 A | 11/1973 | Keim |
| 3,813,695 A | 6/1974 | Podell et al. |
| 3,844,989 A | 10/1974 | Harumiya et al. |
| 3,861,396 A | 1/1975 | Vaillancourt et al. |
| 3,895,166 A | 7/1975 | Wood |
| 3,900,672 A | 8/1975 | Hammond et al. |
| 3,925,178 A | 12/1975 | Gesser et al. |
| 3,975,350 A | 8/1976 | Hudgin et al. |
| 4,060,657 A | 11/1977 | Iwami et al. |
| 4,118,485 A | 10/1978 | Eriksson et al. |
| 4,132,695 A | 1/1979 | Burkholder |
| 4,136,250 A | 1/1979 | Mueller et al. |
| 4,143,949 A | 1/1979 | Mueller et al. |
| 4,153,641 A | 5/1979 | Deichert et al. |
| 4,154,898 A | 5/1979 | Burkholder |
| 4,168,112 A | 9/1979 | Ellis et al. |
| 4,182,822 A | 1/1980 | Chang |
| 4,189,546 A | 2/1980 | Deichert et al. |
| 4,191,596 A | 3/1980 | Dollman et al. |
| 4,217,038 A | 8/1980 | Letter et al. |
| 4,229,838 A | 10/1980 | Mano |
| 4,254,248 A | 3/1981 | Friends et al. |
| 4,259,467 A | 3/1981 | Keogh et al. |
| 4,260,725 A | 4/1981 | Keogh et al. |
| 4,261,875 A | 4/1981 | Leboeuf |
| 4,263,188 A | 4/1981 | Hampton et al. |
| 4,276,402 A | 6/1981 | Chromecek et al. |
| 4,280,970 A | 7/1981 | Kesting |
| 4,293,642 A | 10/1981 | Beavan et al. |

(Continued)

FOREIGN PATENT DOCUMENTS

CA 2378841 C 1/2007
EP 021403 A2 6/1989

(Continued)

OTHER PUBLICATIONS

Sang-Kyu Kam, John Gregory; Charge determination of synthetic cationic polyelectrolytes by colloid titration; Colloids and Surfaces A Physicochemical and Engineerng Aspect 159 (1999) pp. 165-179.

(Continued)

*Primary Examiner* — Mathieu D Vargot
(74) *Attorney, Agent, or Firm* — Jian Zhou

(57) ABSTRACT

The present invention generally relates to a method for producing silicone hydrogel contact lenses having a stable lubricious coating thereon without involving use of organic solvent in post-curing processes.

22 Claims, No Drawings

(56) References Cited

U.S. PATENT DOCUMENTS

| | | | |
|---|---|---|---|
| 4,298,639 A | 11/1981 | Van Eenam | |
| 4,298,715 A | 11/1981 | Van Eenam | |
| 4,312,575 A | 1/1982 | Peyman et al. | |
| 4,327,203 A | 4/1982 | Deichert et al. | |
| 4,341,889 A | 7/1982 | Deichert et al. | |
| 4,343,927 A | 8/1982 | Chang | |
| 4,347,198 A | 8/1982 | Ohkada et al. | |
| 4,355,147 A | 10/1982 | Deichert et al. | |
| 4,373,009 A | 2/1983 | Winn | |
| 4,379,893 A | 4/1983 | O'Malley et al. | |
| 4,427,823 A | 1/1984 | Inagaki et al. | |
| 4,444,711 A | 4/1984 | Schad | |
| 4,450,045 A | 5/1984 | Hertel et al. | |
| 4,460,534 A | 7/1984 | Boehm et al. | |
| 4,462,665 A | 7/1984 | Shah | |
| 4,486,577 A | 12/1984 | Mueller et al. | |
| 4,487,808 A | 12/1984 | Lambert | |
| 4,495,313 A | 1/1985 | Larsen | |
| 4,499,154 A | 2/1985 | James et al. | |
| 4,521,564 A | 6/1985 | Solomon et al. | |
| 4,527,293 A | 7/1985 | Eckstein et al. | |
| 4,543,398 A | 9/1985 | Bany et al. | |
| 4,546,123 A | 10/1985 | Schafer et al. | |
| 4,548,844 A | 10/1985 | Podell et al. | |
| 4,565,740 A | 1/1986 | Golander et al. | |
| 4,575,476 A | 3/1986 | Podell et al. | |
| 4,605,712 A | 8/1986 | Mueller et al. | |
| 4,613,665 A | 9/1986 | Larm | |
| 4,631,072 A | 12/1986 | Koller | |
| 4,661,575 A | 4/1987 | Tom | |
| 4,684,538 A | 8/1987 | Klemarczyk | |
| 4,689,374 A | 8/1987 | Hansson | |
| 4,695,608 A | 9/1987 | Engler et al. | |
| 4,703,097 A | 10/1987 | Wingler et al. | |
| 4,720,512 A | 1/1988 | Hu et al. | |
| 4,734,475 A | 3/1988 | Goldenberg et al. | |
| 4,786,556 A | 11/1988 | Hu et al. | |
| 4,791,175 A | 12/1988 | Janssen | |
| 4,833,218 A | 5/1989 | Lee | |
| 4,837,289 A | 6/1989 | Mueller et al. | |
| 4,876,126 A | 10/1989 | Takemura et al. | |
| 4,892,402 A | 1/1990 | Sawamoto et al. | |
| 4,895,896 A | 1/1990 | Muller-Lierheim | |
| 4,920,184 A | 4/1990 | Schafer et al. | |
| 4,943,460 A | 7/1990 | Markle et al. | |
| 4,954,586 A | 9/1990 | Toyoshima et al. | |
| 4,954,587 A | 9/1990 | Mueller | |
| 4,959,074 A | 9/1990 | Halpern et al. | |
| 4,968,532 A | 11/1990 | Janssen et al. | |
| 4,973,359 A | 11/1990 | Yamasoe | |
| 4,973,493 A | 11/1990 | Guire | |
| 4,978,481 A | 12/1990 | Janssen et al. | |
| 4,979,959 A | 12/1990 | Guire | |
| 4,990,357 A | 2/1991 | Karakelle et al. | |
| 5,002,582 A | 3/1991 | Guire et al. | |
| 5,010,141 A | 4/1991 | Mueller | |
| 5,019,393 A | 5/1991 | Ito et al. | |
| 5,034,461 A | 7/1991 | Lai et al. | |
| 5,039,459 A | 8/1991 | Kindt-Larsen et al. | |
| 5,039,761 A | 8/1991 | Ono et al. | |
| 5,049,403 A | 9/1991 | Larm et al. | |
| 5,053,048 A | 10/1991 | Pinchuk | |
| 5,061,738 A | 10/1991 | Solomon et al. | |
| 5,070,170 A | 12/1991 | Robertson et al. | |
| 5,079,093 A | 1/1992 | Akashi et al. | |
| 5,079,319 A | 1/1992 | Mueller | |
| 5,080,924 A | 1/1992 | Kamel et al. | |
| 5,091,205 A | 2/1992 | Fan | |
| 5,108,776 A | 4/1992 | Goldberg et al. | |
| 5,112,900 A | 5/1992 | Buddenhagen et al. | |
| 5,132,108 A | 7/1992 | Narayanan et al. | |
| 5,135,297 A | 8/1992 | Valint | |
| 5,135,516 A | 8/1992 | Sahatjian et al. | |
| 5,155,194 A | 10/1992 | Kossmehl et al. | |
| 5,160,790 A | 11/1992 | Elton | |
| 5,165,919 A | 11/1992 | Sasaki et al. | |
| 5,208,111 A | 5/1993 | Decher et al. | |
| 5,210,111 A | 5/1993 | Goldenberg et al. | |
| 5,214,452 A | 5/1993 | Kossmehl et al. | |
| 5,217,492 A | 6/1993 | Guire et al. | |
| 5,229,211 A | 7/1993 | Murayama et al. | |
| 5,262,484 A | 11/1993 | Coleman et al. | |
| 5,263,992 A | 11/1993 | Guire | |
| 5,270,046 A | 12/1993 | Sakomoto et al. | |
| 5,272,012 A | 12/1993 | Opolski | |
| 5,290,548 A | 3/1994 | Goldberg et al. | |
| 5,290,585 A | 3/1994 | Elton | |
| 5,292,514 A | 3/1994 | Capecchi et al. | |
| 5,308,641 A | 5/1994 | Cahalan et al. | |
| 5,312,873 A | 5/1994 | Gregor et al. | |
| 5,346,946 A | 9/1994 | Yokoyama et al. | |
| 5,348,873 A | 9/1994 | Matsuda et al. | |
| 5,350,800 A | 9/1994 | Verhoeven et al. | |
| 5,352,714 A | 10/1994 | Lai et al. | |
| 5,355,213 A | 10/1994 | Dotan | |
| 5,358,995 A | 10/1994 | Lai et al. | |
| 5,387,632 A | 2/1995 | Lai et al. | |
| 5,397,848 A | 3/1995 | Yang et al. | |
| 5,407,715 A | 4/1995 | Buddenhagen et al. | |
| 5,408,002 A | 4/1995 | Coleman et al. | |
| 5,408,280 A | 4/1995 | Von Der Haegen et al. | |
| 5,409,731 A | 4/1995 | Nakagawa et al. | |
| 5,416,131 A | 5/1995 | Wolff et al. | |
| 5,416,132 A | 5/1995 | Yokoyama et al. | |
| 5,417,969 A | 5/1995 | Hsu et al. | |
| 5,418,295 A * | 5/1995 | Bowers | G02B 1/043 351/159.33 |
| 5,441,488 A | 8/1995 | Shimura et al. | |
| 5,442,402 A | 8/1995 | Sohn et al. | |
| 5,443,907 A | 8/1995 | Slaikeu et al. | |
| 5,451,617 A | 9/1995 | Lai et al. | |
| 5,461,433 A | 10/1995 | Nakabayashi et al. | |
| 5,470,944 A | 11/1995 | Bonsignor et al. | |
| 5,475,450 A | 12/1995 | Meadows | |
| 5,476,665 A | 12/1995 | Dennison | |
| 5,486,579 A | 1/1996 | Lai et al. | |
| 5,495,064 A | 2/1996 | James et al. | |
| 5,500,732 A | 3/1996 | Ebel et al. | |
| 5,508,317 A | 4/1996 | Muller | |
| 5,509,899 A | 4/1996 | Fan et al. | |
| 5,510,004 A | 4/1996 | Allen | |
| 5,510,418 A | 4/1996 | Rhee et al. | |
| 5,527,925 A | 6/1996 | Chabrecek et al. | |
| 5,528,357 A | 6/1996 | Davis | |
| 5,532,311 A | 7/1996 | Sirvio et al. | |
| 5,562,922 A | 10/1996 | Lambert | |
| 5,563,056 A | 10/1996 | Swan et al. | |
| 5,574,554 A | 11/1996 | Su et al. | |
| 5,578,675 A | 11/1996 | Mormile et al. | |
| 5,583,163 A | 12/1996 | Muller | |
| 5,583,463 A | 12/1996 | Merritt | |
| 5,584,882 A | 12/1996 | Yabushita et al. | |
| 5,591,140 A | 1/1997 | Narayanan et al. | |
| 5,597,873 A | 1/1997 | Chambers et al. | |
| 5,599,576 A | 2/1997 | Opolski | |
| 5,612,389 A | 3/1997 | Chabrecek et al. | |
| 5,612,391 A | 3/1997 | Chabrecek et al. | |
| 5,614,035 A | 3/1997 | Nadkarni | |
| 5,620,738 A | 4/1997 | Fan et al. | |
| 5,621,018 A | 4/1997 | Chabrecek et al. | |
| 5,626,000 A | 5/1997 | Edwards et al. | |
| 5,633,504 A | 5/1997 | Collins et al. | |
| 5,648,422 A | 7/1997 | Collina et al. | |
| 5,665,840 A | 9/1997 | Pohlmann et al. | |
| 5,670,558 A | 9/1997 | Onishi et al. | |
| 5,672,638 A | 9/1997 | Verhoeven et al. | |
| 5,674,942 A | 10/1997 | Hill et al. | |
| 5,681,510 A | 10/1997 | Valint et al. | |
| 5,688,855 A | 11/1997 | Stoy et al. | |
| 5,693,034 A | 12/1997 | Buscemi et al. | |
| 5,700,559 A | 12/1997 | Sheu et al. | |
| 5,702,754 A | 12/1997 | Zhong | |
| 5,705,583 A | 1/1998 | Bowers et al. | |
| 5,710,302 A | 1/1998 | Kunzler et al. | |

(56) References Cited

U.S. PATENT DOCUMENTS

| | | |
|---|---|---|
| 5,712,326 A | 1/1998 | Jones et al. |
| 5,712,327 A | 1/1998 | Chang et al. |
| 5,712,356 A | 1/1998 | Bothe et al. |
| 5,717,781 A | 2/1998 | Ebel et al. |
| 5,719,669 A | 2/1998 | Ross |
| 5,723,145 A | 3/1998 | Shikinami et al. |
| 5,731,087 A | 3/1998 | Fan et al. |
| 5,739,236 A | 4/1998 | Bowers et al. |
| 5,748,300 A | 5/1998 | Wilder et al. |
| 5,760,100 A | 6/1998 | Nicolson et al. |
| 5,766,158 A | 6/1998 | Opolski |
| 5,776,999 A | 7/1998 | Nicolson et al. |
| 5,779,943 A | 7/1998 | Enns et al. |
| 5,783,650 A | 7/1998 | Bowers et al. |
| 5,789,461 A | 8/1998 | Nicolson et al. |
| 5,789,462 A | 8/1998 | Motani et al. |
| 5,789,464 A | 8/1998 | Muller |
| 5,792,531 A | 8/1998 | Littleton et al. |
| 5,800,412 A | 9/1998 | Zhang et al. |
| 5,801,822 A | 9/1998 | Lafferty et al. |
| 5,804,318 A | 9/1998 | Pinchuk et al. |
| 5,805,264 A | 9/1998 | Janssen et al. |
| 5,805,276 A | 9/1998 | Davis et al. |
| 5,807,944 A | 9/1998 | Hirt et al. |
| 5,811,151 A | 9/1998 | Hendriks et al. |
| 5,818,573 A | 10/1998 | Lafferty et al. |
| 5,828,446 A | 10/1998 | Davis |
| 5,843,346 A | 12/1998 | Morrill |
| 5,849,810 A | 12/1998 | Muller |
| 5,849,811 A | 12/1998 | Nicolson et al. |
| 5,849,841 A | 12/1998 | Muhlebach et al. |
| 5,855,825 A | 1/1999 | Ito |
| 5,858,653 A | 1/1999 | Duran et al. |
| 5,859,107 A | 1/1999 | Jones et al. |
| 5,866,113 A | 2/1999 | Hendriks et al. |
| 5,869,127 A | 2/1999 | Zhong |
| 5,871,823 A | 2/1999 | Anders et al. |
| 5,874,500 A | 2/1999 | Rhee et al. |
| 5,879,436 A | 3/1999 | Kramer et al. |
| 5,879,697 A | 3/1999 | Ding et al. |
| 5,882,687 A | 3/1999 | Park et al. |
| 5,885,647 A | 3/1999 | Larm et al. |
| 5,894,002 A | 4/1999 | Boneberger et al. |
| 5,910,518 A | 6/1999 | Nakada et al. |
| 5,922,161 A | 7/1999 | Wu et al. |
| 5,922,249 A | 7/1999 | Ajello et al. |
| 5,936,052 A | 8/1999 | Bothe et al. |
| 5,936,703 A | 8/1999 | Miyazaki et al. |
| 5,945,498 A | 8/1999 | Hopken et al. |
| 5,962,548 A | 10/1999 | Vanderlaan et al. |
| 5,965,631 A | 10/1999 | Nicolson et al. |
| 5,981,615 A | 11/1999 | Valint, Jr. et al. |
| 5,981,675 A | 11/1999 | Davis et al. |
| 5,995,213 A | 12/1999 | Whitbourne |
| 5,997,517 A | 12/1999 | Passalaqua et al. |
| 6,007,526 A | 12/1999 | Passalaqua et al. |
| 6,018,001 A | 3/2000 | Hirt et al. |
| 6,039,913 A | 3/2000 | Domschke et al. |
| 6,043,328 A | 3/2000 | Domschke et al. |
| 6,048,620 A | 4/2000 | Toma |
| 6,054,504 A | 5/2000 | Exsted et al. |
| 6,063,484 A | 7/2000 | Vanderlaan et al. |
| 6,087,415 A | 7/2000 | Bowers et al. |
| 6,087,462 A | 7/2000 | Bowers et al. |
| 6,090,901 A | 7/2000 | Bowers et al. |
| 6,096,138 A | 8/2000 | Heiler et al. |
| 6,096,726 A | 8/2000 | Opolski |
| 6,099,122 A | 8/2000 | Chabrecek et al. |
| 6,099,852 A | 8/2000 | Jen |
| 6,106,889 A | 8/2000 | Beavers et al. |
| 6,134,342 A | 10/2000 | Doke et al. |
| 6,149,842 A | 11/2000 | Lally et al. |
| 6,165,322 A | 12/2000 | Bower |
| 6,165,408 A | 12/2000 | Steinmann |
| 6,169,127 B1 | 1/2001 | Lohmann et al. |
| 6,179,817 B1 | 1/2001 | Zhong |
| 6,193,369 B1 | 2/2001 | Valint, Jr. et al. |
| 6,207,796 B1 | 3/2001 | Dairoku et al. |
| 6,218,508 B1 | 4/2001 | Kragh et al. |
| 6,221,061 B1 | 4/2001 | Engelson et al. |
| 6,221,303 B1 | 4/2001 | Steinmann |
| 6,225,431 B1 | 5/2001 | Bowers et al. |
| 6,238,799 B1 | 5/2001 | Opolski |
| 6,284,854 B1 | 9/2001 | Bowers et al. |
| 6,301,005 B1 | 10/2001 | Epstein et al. |
| 6,303,687 B1 | 10/2001 | Muller |
| 6,306,514 B1 | 10/2001 | Weikel et al. |
| 6,314,199 B1 | 11/2001 | Hofer et al. |
| 6,323,165 B1 | 11/2001 | Heiler et al. |
| 6,340,465 B1 | 1/2002 | Hsu et al. |
| 6,342,570 B1 | 1/2002 | Bothe et al. |
| 6,346,170 B1 | 2/2002 | Bower |
| 6,348,507 B1 | 2/2002 | Heiler et al. |
| 6,364,934 B1 | 4/2002 | Nandu et al. |
| 6,367,929 B1 | 4/2002 | Maiden et al. |
| 6,428,839 B1 | 8/2002 | Kunzler et al. |
| 6,436,481 B1 | 8/2002 | Chabrecek et al. |
| 6,440,366 B1 | 8/2002 | Salpekar et al. |
| 6,440,571 B1 | 8/2002 | Valint, Jr. et al. |
| 6,410,616 B1 | 9/2002 | Harada et al. |
| 6,447,920 B1 | 9/2002 | Chabrecek et al. |
| 6,451,871 B1 | 9/2002 | Winterton et al. |
| 6,465,056 B1 | 10/2002 | Chabrecek et al. |
| 6,465,602 B2 | 10/2002 | Schroeder et al. |
| 6,472,489 B1 | 10/2002 | Stockinger |
| 6,478,423 B1 | 11/2002 | Turner et al. |
| 6,479,227 B1 | 11/2002 | Kubo |
| 6,479,587 B1 | 11/2002 | Stockinger et al. |
| 6,482,221 B1 | 11/2002 | Hebert et al. |
| 6,492,478 B1 | 12/2002 | Steinmann |
| 6,500,481 B1 | 12/2002 | Vanderlaan et al. |
| 6,517,678 B1 | 2/2003 | Shannon et al. |
| 6,521,352 B1 | 2/2003 | Chabrecek et al. |
| 6,531,432 B2 | 3/2003 | Molock et al. |
| 6,534,559 B1 | 3/2003 | Vanderlaan et al. |
| 6,537,614 B1 | 3/2003 | Wei et al. |
| 6,551,267 B1 | 4/2003 | Cohen et al. |
| 6,582,754 B1 | 6/2003 | Pasic et al. |
| 6,586,038 B1 | 7/2003 | Chabrecek et al. |
| 6,586,520 B1 | 7/2003 | Canorro et al. |
| 6,589,665 B2 | 7/2003 | Chabrecek et al. |
| 6,596,294 B2 | 7/2003 | Lai et al. |
| 6,599,559 B1 | 7/2003 | McGee et al. |
| 6,602,930 B2 | 8/2003 | Imafuku |
| 6,614,516 B2 | 9/2003 | Epstein et al. |
| 6,623,747 B1 | 9/2003 | Chatelier et al. |
| 6,623,786 B2 | 9/2003 | Baron et al. |
| 6,627,124 B1 | 9/2003 | Herbrechtsmeier et al. |
| 6,630,243 B2 | 10/2003 | Valint, Jr. et al. |
| 6,638,563 B2 | 10/2003 | McGee et al. |
| 6,673,447 B2 | 1/2004 | Wei et al. |
| 6,683,062 B2 | 1/2004 | Opolski |
| 6,686,054 B2 | 2/2004 | Nigam |
| 6,689,480 B2 | 2/2004 | Shimoyama et al. |
| 6,699,435 B2 | 3/2004 | Salpekar et al. |
| 6,719,929 B2 | 4/2004 | Winterton et al. |
| 6,730,366 B2 | 5/2004 | Lohmann et al. |
| 6,733,123 B2 | 5/2004 | Polzhofer et al. |
| 6,734,321 B2 | 5/2004 | Chabrecek et al. |
| 6,740,336 B2 | 5/2004 | Trubetskoy et al. |
| 6,743,878 B2 | 6/2004 | Bowers et al. |
| 6,762,264 B2 | 7/2004 | Kunzler et al. |
| 6,793,973 B2 | 9/2004 | Winterton et al. |
| 6,794,456 B2 | 9/2004 | Grobe, III |
| 6,800,225 B1 | 10/2004 | Hagmann et al. |
| 6,808,597 B2 | 10/2004 | Allen |
| 6,811,805 B2 | 11/2004 | Gilliard et al. |
| 6,822,016 B2 | 11/2004 | McCabe et al. |
| 6,835,410 B2 | 12/2004 | Chabrecek et al. |
| 6,838,491 B1 | 1/2005 | Vanderlaan et al. |
| 6,858,310 B2 | 2/2005 | McGee et al. |
| 6,866,936 B2 | 3/2005 | Opolski |
| 6,866,938 B2 | 3/2005 | Mori et al. |
| 6,867,245 B2 | 3/2005 | Iwata et al. |

(56) References Cited

U.S. PATENT DOCUMENTS

| | | |
|---|---|---|
| 6,878,399 B2 | 4/2005 | Chabrecek et al. |
| 6,884,457 B2 | 4/2005 | Gilliard et al. |
| 6,891,010 B2 | 5/2005 | Kunzler et al. |
| 6,896,926 B2 | 5/2005 | Qui et al. |
| 6,902,812 B2 | 6/2005 | Valint, Jr. et al. |
| 6,921,802 B2 | 7/2005 | Kunzler et al. |
| 6,923,538 B2 | 8/2005 | Dean |
| 6,923,978 B2 | 8/2005 | Chatelier et al. |
| 6,926,965 B2 | 8/2005 | Qui et al. |
| 6,936,641 B2 | 8/2005 | Molock et al. |
| 6,940,580 B2 | 9/2005 | Winterton et al. |
| 6,951,894 B1 | 10/2005 | Nicolson et al. |
| 7,018,688 B2 | 3/2006 | Shepherd |
| 7,032,251 B2 | 4/2006 | Janssen |
| 7,052,131 B2 | 5/2006 | McCabe et al. |
| 7,091,283 B2 | 8/2006 | Muller |
| 7,160,953 B2 | 1/2007 | Bowers et al. |
| 7,213,918 B2 | 5/2007 | Phelan |
| 7,238,750 B2 | 7/2007 | Muller et al. |
| 7,247,692 B2 | 7/2007 | Laredo |
| 7,249,848 B2 | 7/2007 | Laredo et al. |
| 7,268,189 B2 | 9/2007 | Muller et al. |
| 7,268,198 B2 | 9/2007 | Kunzler et al. |
| 7,270,678 B2 | 9/2007 | Valint, Jr. et al. |
| 7,297,725 B2 | 11/2007 | Winterton et al. |
| 7,344,607 B2 | 3/2008 | Melzer et al. |
| 7,360,890 B2 | 4/2008 | Back |
| 7,364,723 B1 | 4/2008 | Nakada et al. |
| 7,384,590 B2 | 6/2008 | Kelly et al. |
| 7,387,759 B2 | 6/2008 | Kelly et al. |
| 7,396,890 B2 | 7/2008 | Zanini et al. |
| 7,399,795 B2 | 7/2008 | Lai et al. |
| 7,423,074 B2 | 9/2008 | Lai et al. |
| 7,426,993 B2 | 9/2008 | Coldrey et al. |
| 7,428,029 B2 | 9/2008 | Murakami et al. |
| 7,429,558 B2 | 9/2008 | Batchelor et al. |
| 7,429,623 B2 | 9/2008 | Molock et al. |
| 7,435,452 B2 | 10/2008 | Shimoyama et al. |
| 7,452,377 B2 | 11/2008 | Watling et al. |
| 7,459,489 B2 | 12/2008 | Lewandowski et al. |
| 7,468,398 B2 | 12/2008 | Nicolson et al. |
| 7,521,519 B1 | 4/2009 | Hirt et al. |
| 7,538,146 B2 | 5/2009 | Nicolson et al. |
| 7,540,609 B2 | 6/2009 | Chen et al. |
| 7,553,880 B2 | 6/2009 | Nicolson et al. |
| 7,556,858 B2 | 7/2009 | Rasmussen et al. |
| 7,572,841 B2 | 8/2009 | Chen et al. |
| 7,588,334 B2 | 9/2009 | Matsushita et al. |
| 7,598,298 B2 | 10/2009 | Lewandowski et al. |
| 7,605,190 B2 | 10/2009 | Moszner et al. |
| 7,632,876 B2 | 12/2009 | Lai et al. |
| 7,659,323 B2 | 2/2010 | Lewandowski et al. |
| 7,671,156 B2 | 3/2010 | Phelan et al. |
| 7,691,917 B2 | 4/2010 | Lai et al. |
| 7,726,809 B2 | 6/2010 | Filippo |
| 7,780,879 B2 | 8/2010 | Pruitt |
| 7,781,536 B2 | 8/2010 | Kamiya et al. |
| 7,781,554 B2 | 8/2010 | Lai et al. |
| 7,789,509 B2 | 9/2010 | Mentak et al. |
| 7,832,856 B2 | 11/2010 | Vanderbilt et al. |
| 7,841,716 B2 | 11/2010 | McCabe et al. |
| 7,847,025 B2 | 12/2010 | Liu et al. |
| 7,857,447 B2 | 12/2010 | Myung et al. |
| 7,875,687 B2 | 1/2011 | Kunzler et al. |
| 7,879,267 B2 | 2/2011 | Turner et al. |
| 7,915,323 B2 | 3/2011 | Awasthi et al. |
| 7,919,136 B2 | 4/2011 | Linhardt et al. |
| 7,977,430 B2 | 7/2011 | Devlin et al. |
| 8,003,710 B2 | 8/2011 | Medina et al. |
| 8,071,658 B2 | 12/2011 | Zhou et al. |
| 8,071,703 B2 | 12/2011 | Zhou et al. |
| 8,092,724 B2 | 1/2012 | Pruitt et al. |
| 8,163,206 B2 | 4/2012 | Chang et al. |
| 8,383,744 B2 | 2/2013 | Justynska et al. |
| 8,404,783 B2 | 3/2013 | Chang et al. |
| 8,420,711 B2 | 4/2013 | Awasthi et al. |
| 8,440,735 B2 | 5/2013 | Pruitt et al. |
| 8,480,227 B2 | 7/2013 | Qiu et al. |
| 8,524,800 B2 | 9/2013 | Phelan |
| 8,529,057 B2 | 9/2013 | Qiu et al. |
| 8,642,712 B2 | 2/2014 | Chang et al. |
| 8,689,971 B2 | 4/2014 | Minick et al. |
| 8,944,592 B2 | 2/2015 | Qui et al. |
| 2001/0019762 A1 | 9/2001 | Nazarova et al. |
| 2002/0071789 A1 | 6/2002 | Molock et al. |
| 2002/0120084 A1 | 8/2002 | Valint, Jr. et al. |
| 2002/0149742 A1 | 10/2002 | Back |
| 2002/0173580 A1 | 11/2002 | Allen |
| 2002/0182315 A1 | 12/2002 | Heiler et al. |
| 2003/0039748 A1 | 2/2003 | Valint, Jr. et al. |
| 2003/0143335 A1 | 7/2003 | Qiu et al. |
| 2003/0175325 A1 | 9/2003 | Chatelier et al. |
| 2003/0186825 A1 | 10/2003 | Mitani et al. |
| 2004/0082680 A1 | 4/2004 | Phelan et al. |
| 2004/0116564 A1 | 6/2004 | Devlin et al. |
| 2004/0170752 A1 | 9/2004 | Luthra et al. |
| 2005/0060812 A1 | 3/2005 | Batchelor et al. |
| 2005/0070688 A1 | 3/2005 | Lewandowski et al. |
| 2005/0113549 A1 | 5/2005 | Devlin et al. |
| 2005/0228065 A1 | 10/2005 | Nicolson et al. |
| 2006/0055882 A1 | 3/2006 | Phelan |
| 2006/0063852 A1 | 3/2006 | Iwata et al. |
| 2006/0100113 A1 | 5/2006 | Pegram et al. |
| 2006/0142410 A1 | 6/2006 | Baba et al. |
| 2006/0217276 A1 | 9/2006 | Mitani et al. |
| 2006/0292209 A1 | 12/2006 | Lewandowski et al. |
| 2007/0037898 A1 | 2/2007 | Phelan et al. |
| 2007/0066706 A1 | 3/2007 | Manesis et al. |
| 2007/0105973 A1 | 5/2007 | Nicolson et al. |
| 2007/0105974 A1 | 5/2007 | Nicolson et al. |
| 2007/0122540 A1 | 5/2007 | Salamone et al. |
| 2007/0149428 A1 | 6/2007 | Ammon et al. |
| 2007/0185281 A1 | 8/2007 | Song et al. |
| 2007/0229758 A1 | 10/2007 | Matsuzawa |
| 2007/0296914 A1 | 12/2007 | Hong et al. |
| 2008/0003259 A1 | 1/2008 | Salamone et al. |
| 2008/0015315 A1 | 1/2008 | Chang et al. |
| 2008/0017525 A1 | 1/2008 | Newman |
| 2008/0100796 A1 | 5/2008 | Pruitt et al. |
| 2008/0110770 A1 | 5/2008 | Burke et al. |
| 2008/0138310 A1 | 6/2008 | Ketelson et al. |
| 2008/0142038 A1 | 6/2008 | Kunzler et al. |
| 2008/0143003 A1 | 6/2008 | Phelan |
| 2008/0143957 A1 | 6/2008 | Linhardt et al. |
| 2008/0143958 A1 | 6/2008 | Medina et al. |
| 2008/0148689 A1 | 6/2008 | Xia et al. |
| 2008/0152540 A1 | 6/2008 | Schorzman et al. |
| 2008/0152800 A1 | 6/2008 | Bothe et al. |
| 2008/0170201 A1 | 7/2008 | Filippo |
| 2008/0174035 A1 | 7/2008 | Winterton |
| 2008/0226922 A1 | 9/2008 | Ferreiro et al. |
| 2008/0231798 A1 | 9/2008 | Zhou et al. |
| 2008/0234457 A1 | 9/2008 | Zhou et al. |
| 2008/0273168 A1 | 11/2008 | Rathore et al. |
| 2008/0275156 A1 | 11/2008 | Laredo et al. |
| 2008/0306455 A1 | 12/2008 | Dias et al. |
| 2008/0307751 A1 | 12/2008 | Newman et al. |
| 2008/0314767 A1 | 12/2008 | Lai et al. |
| 2009/0036577 A1 | 2/2009 | Luo et al. |
| 2009/0039535 A1 | 2/2009 | Nicolson et al. |
| 2009/0046242 A1 | 2/2009 | Nicolson et al. |
| 2009/0057164 A1 | 3/2009 | Minick et al. |
| 2009/0062711 A1 | 3/2009 | Lewandowski et al. |
| 2009/0100801 A1 | 4/2009 | Zhao et al. |
| 2009/0111942 A1 | 4/2009 | Lang et al. |
| 2009/0141234 A1 | 6/2009 | Blackwell et al. |
| 2009/0142485 A1 | 6/2009 | Lai et al. |
| 2009/0142508 A1 | 6/2009 | Lai et al. |
| 2009/0145086 A1 | 6/2009 | Reynolds et al. |
| 2009/0145091 A1 | 6/2009 | Connolly et al. |
| 2009/0160074 A1 | 6/2009 | Pruitt et al. |
| 2009/0168012 A1 | 7/2009 | Linhardt et al. |
| 2009/0169716 A1 | 7/2009 | Linhardt et al. |
| 2009/0171027 A1 | 7/2009 | Linhardt et al. |

(56) References Cited

U.S. PATENT DOCUMENTS

| | | |
|---|---|---|
| 2009/0171049 A1 | 7/2009 | Linhardt et al. |
| 2009/0171050 A1 | 7/2009 | Linhardt et al. |
| 2009/0171459 A1 | 7/2009 | Linhardt et al. |
| 2009/0173044 A1 | 7/2009 | Linhardt et al. |
| 2009/0173045 A1 | 7/2009 | Lai et al. |
| 2009/0173643 A1 | 7/2009 | Lai et al. |
| 2009/0182067 A1 | 7/2009 | Liu |
| 2009/0186229 A1 | 7/2009 | Muller et al. |
| 2009/0238948 A1 | 9/2009 | Muller et al. |
| 2009/0264553 A1 | 10/2009 | Chen et al. |
| 2009/0280157 A1 | 11/2009 | Maas et al. |
| 2009/0326498 A1 | 12/2009 | Lewandowski et al. |
| 2010/0029802 A1 | 2/2010 | Mehrabi et al. |
| 2010/0048847 A1 | 2/2010 | Broad et al. |
| 2010/0084775 A1 | 4/2010 | McCabe et al. |
| 2010/0118261 A1 | 5/2010 | McGee et al. |
| 2010/0127219 A1 | 5/2010 | Mohamed |
| 2010/0149482 A1 | 6/2010 | Ammon et al. |
| 2010/0152084 A1 | 6/2010 | Rathore et al. |
| 2010/0162661 A1 | 7/2010 | Vanderbilt et al. |
| 2010/0162663 A1 | 7/2010 | McGee et al. |
| 2010/0225881 A1 | 9/2010 | Filippo |
| 2010/0238398 A1 | 9/2010 | Nicolson et al. |
| 2010/0240776 A1 | 9/2010 | Filippo |
| 2010/0249356 A1 | 9/2010 | Rathore et al. |
| 2010/0258961 A1 | 10/2010 | Chang et al. |
| 2010/0276823 A1 | 11/2010 | Pruitt et al. |
| 2010/0276824 A1 | 11/2010 | Pruitt et al. |
| 2010/0296049 A1 | 11/2010 | Justynska et al. |
| 2010/0298446 A1 | 11/2010 | Chang et al. |
| 2010/0300902 A1 | 12/2010 | Marmo |
| 2011/0009519 A1 | 1/2011 | Awasthi et al. |
| 2011/0009587 A1 | 1/2011 | Awasthi et al. |
| 2011/0015298 A1 | 1/2011 | Schorzman et al. |
| 2011/0102736 A1 | 5/2011 | Wu et al. |
| 2011/0134387 A1 | 6/2011 | Samuel et al. |
| 2012/0026457 A1* | 2/2012 | Qiu .............. G02B 1/043 351/159.33 |
| 2012/0026458 A1 | 2/2012 | Qui et al. |
| 2012/0029111 A1 | 2/2012 | Chang et al. |
| 2012/0112373 A1 | 5/2012 | Holland et al. |
| 2012/0172478 A1 | 7/2012 | Chang et al. |
| 2012/0177839 A1 | 7/2012 | Tucker et al. |
| 2012/0244088 A1 | 9/2012 | Saxena et al. |
| 2012/0245249 A1 | 9/2012 | Saxena et al. |
| 2013/0308093 A1 | 11/2013 | Qui et al. |
| 2013/0337160 A1 | 12/2013 | Holland et al. |
| 2014/0100291 A1 | 4/2014 | Chang et al. |
| 2014/0171543 A1* | 6/2014 | Chang .............. C08G 18/10 523/107 |
| 2014/0237945 A1 | 8/2014 | Minick et al. |
| 2014/0356965 A1 | 12/2014 | Qian et al. |
| 2015/0309210 A1 | 10/2015 | Huang et al. |
| 2015/0309211 A1 | 10/2015 | Huang et al. |
| 2016/0061995 A1 | 3/2016 | Chang et al. |

FOREIGN PATENT DOCUMENTS

| | | |
|---|---|---|
| EP | 0362137 A2 | 4/1990 |
| EP | 0362145 A2 | 4/1990 |
| EP | 0393532 A2 | 10/1990 |
| EP | 0455323 A2 | 11/1991 |
| EP | 0480809 A2 | 4/1992 |
| EP | 0537972 A1 | 4/1993 |
| EP | 0574352 A1 | 12/1993 |
| EP | 0632329 A1 | 1/1995 |
| EP | 0655470 A1 | 5/1995 |
| EP | 0712867 A1 | 5/1996 |
| EP | 0713106 A1 | 5/1996 |
| EP | 0728487 A1 | 8/1996 |
| EP | 0747071 A1 | 12/1996 |
| EP | 0751407 A2 | 1/1997 |
| EP | 0758687 A1 | 2/1997 |
| EP | 0765741 A2 | 4/1997 |
| EP | 0780419 A1 | 6/1997 |
| EP | 0832618 A1 | 4/1998 |
| EP | 0940447 A2 | 9/1999 |
| EP | 0940693 A2 | 9/1999 |
| EP | 0963761 A1 | 12/1999 |
| EP | 0958315 B1 | 6/2001 |
| EP | 0932635 B1 | 7/2001 |
| EP | 0961941 B1 | 4/2002 |
| EP | 1272353 B1 | 12/2003 |
| EP | 1287060 B1 | 11/2005 |
| EP | 1214383 B1 | 12/2005 |
| EP | 1149198 B1 | 4/2006 |
| EP | 1179190 B1 | 4/2006 |
| EP | 1153964 B1 | 7/2006 |
| EP | 1569702 B1 | 10/2006 |
| EP | 1754731 A1 | 2/2007 |
| EP | 1802357 B1 | 12/2009 |
| EP | 1945688 B1 | 12/2010 |
| JP | 61209275 A2 | 9/1986 |
| JP | 08239639 A1 | 9/1996 |
| JP | 2001117054 A | 4/2001 |
| JP | 2008285791 A | 11/2008 |
| JP | 2010163717 A | 7/2010 |
| WO | 8909246 A1 | 10/1989 |
| WO | 9104283 A1 | 4/1991 |
| WO | 9209639 A2 | 6/1992 |
| WO | 9209650 A1 | 6/1992 |
| WO | 9300391 A1 | 1/1993 |
| WO | 9406485 A1 | 3/1994 |
| WO | 9504609 A1 | 2/1995 |
| WO | 9618498 A1 | 6/1996 |
| WO | 9620796 A1 | 7/1996 |
| WO | 9624392 A1 | 8/1996 |
| WO | 9637241 A1 | 11/1996 |
| WO | 9700274 A1 | 1/1997 |
| WO | 9718904 A1 | 5/1997 |
| WO | 9721497 A1 | 6/1997 |
| WO | 9723532 A1 | 7/1997 |
| WO | 9729160 A1 | 8/1997 |
| WO | 9821270 A1 | 5/1998 |
| WO | 9828026 A1 | 7/1998 |
| WO | 9915917 A1 | 4/1999 |
| WO | 9935520 A1 | 7/1999 |
| WO | 0031150 A1 | 6/2000 |
| WO | 0037385 A1 | 6/2000 |
| WO | 0072052 A1 | 11/2000 |
| WO | 0138636 A1 | 5/2001 |
| WO | 0157118 A2 | 8/2001 |
| WO | 03037960 A1 | 5/2003 |
| WO | 03059967 A1 | 7/2003 |
| WO | 2004050132 A2 | 6/2004 |
| WO | 2005031400 A2 | 4/2005 |
| WO | 2005035607 A1 | 4/2005 |
| WO | 2006024520 A1 | 3/2006 |
| WO | 2006038080 A2 | 4/2006 |
| WO | 2006088758 A2 | 8/2006 |
| WO | 2007017243 A1 | 2/2007 |
| WO | 2008073193 A2 | 6/2008 |
| WO | 2008076506 A1 | 6/2008 |
| WO | 2008095955 A1 | 8/2008 |
| WO | 2009032122 A1 | 3/2009 |
| WO | 2009085902 A1 | 7/2009 |
| WO | 2010071691 A1 | 6/2010 |
| WO | 2014093299 A1 | 6/2014 |

OTHER PUBLICATIONS

Niklaus Buhler, Hans-Peter Haerri, Manfred Hofmann, Christine Irrgang, Andreas Muhlebach, Beat Muller and Friedrich Stockinger; Nelfilcon A, A New Material for Contact Lenses; Chimia 53 (1999) pp. 269-274; Industrial Chemistry.

N. Dilsiz and G. Akovali; Plasma Polymerization of Selected Organic Compounds; Polymer (1996) vol. 37, No. 2, pp. 333-342.

Frank Jansen; Plasma Deposited Thin Films (Chapter 1); Plasma Deposition Processes (19), CRC Press (1986); Boca Raton, FL.

H. Yasuda; Glow Discharge Polymerization; Journal of Polymer Science: Macromolecular Reviews, vol. 16 (1981), pp. 199-293.

(56) References Cited

OTHER PUBLICATIONS

Kazuo Sugiyama and Koji Ohga; Surface modified poly(methyl methacrylate) with 1-methyl-2-methacrylamidoethyl phosphorylcholine moiety; Macromol. Chem. Phys. 200, No. 6 (1999), pp. 1439-1445.
Sean P. Cullen, Ian C. Mandel, and Padma Gopalan; Surface-Anchored Poly(2-vinyl-4, 4-dimethyl azlactone) Brushes as Templates for Enzyme Immobilzation; Langmuir, 2008 24 (23) pp. 13701-13709.
Joel Baguet, Francoise Sommer, Veronique Claudon-Eyl and Tran Minh Duc; Characterization of lacrymal component accumulation on worn soft contact lens surfaces by atomic force microscopy; Biomaterials 16 (1995) pp. 3-9.
Joel Baguet, Francoise Sommer, Tran Minh Duc; Imaging surfaces of hydrophilic contact lenses with the atomic force microscope; Biomaterials 1993, vol. 14, No. 4, pp. 279-284.
Z.M. Jin and D. Dowson; Elastohydrodynamic lubrication in biological systems; Proc. IMechE (2005) vol. 219, Part J: J. Engineering Tribology, pp. 367-380.
Jeannine E. Elliott, Mara McDonald, Jun Nie, Christopher N. Bowman; Structure and swelling of poly (acrylic acid) hydrogels: effect of pH, ionic strength, and dilution on the crosslinked polymer structure; Polymer 45 (2004) pp. 1503-1510.
Niriam V. Flores-Merino, Somot Chirasatisin, Caterina Lopresti, Gwendolen C. Reilly, Giuseppe Battaglia and Adam J. Engler; Nanoscopic mechanical anisotropy in hydrogel surfaces; The Royal Society of Chemistry, 2010.
F. Fornasiero, J.M. Prausnitz, C.J. Radke; Post-lens tear-film depletion due to evaporative dehydration of a soft contact lens; Journal of Membrane Science 275 (2006) pp. 229-243.
Francesco Fornasiero, Florian Krull, John M. Prausnitz, Clayton J. Radke; Steady-state diffusion of water through soft-contact-lens materials; Biomaterials 26 (2005) pp. 5704-5716.
Jian Ping Gong, Takayuki Kurokawa, Tetsuharu Narita, Go Kagata, Yoshihito Isada, Goro Vishimura, and Masataka Kinjo; Synthesis of Hydrogels with Extremely Low Surface Friction; J. Am. Chem, Soc. 2001, 123, pp. 5582-5583.
J.M. Gonzalez-Meijome, J.B. Almeida and M.A. Parafita; Analysis of Surface Mechanical Properties of Unworn and Worn Silicone Hydrogel Contact Lenses Using Nanoindentation with AFM; Microscopy: Science, Technology, Applications and Education, (Formatex 2010) pp. 554-559.
George L. Grobe III, Paul L. Valint, Jr. and Daniel M. Ammon, Jr.; Surface chemical structure for soft contact lenses as a function of polymer processing; Journal of Biomedical Materials Research, vol. 32, pp. 45-54, 1996.
Murat Guvendiren, Jason A. Burdick, and Shu Yang; Kinetic study of swelling-induced surface pattern formation and ordering in hydrogel films with depth-wise crosslinking gradient; Soft Matter, 2010, vol. 6, pp. 2044-2049.
Gavin Hoch, Anuh Chauhan, C.J. Radke; Permeability and diffusivity for water transport through hydrogel membranes; Journal of Membrane Science 214 (2003) pp. 199-209.
R.E. Imhof, H.J.S. Birch, F.R. Thornley and J.R. Gilchrist; Opto-thermal Transient Emission Radiometry: a New Surface Analysis Technique; Analytical Proceedings, Jan. 1987, vol. 24, pp. 17-18.
L. Jones, C. May, L. Nazar, T. Simpson; In vitro evaluation of the dehydration characteristics of silicone hydrogel and conventional hydrogel contact lens materials; Contact Lens & Anterior Eye 25 (2002) pp. 147-156.
Lyndon Jones, Lakshman Subbaraman, Ronan Rogers, and Kathy Dumbleton; Surface treatment, wetting and modulus of silicone hydrogels; Contact Lens Monthly, Optician, Sep. 1, 2006, No. 6067, vol. 232, pp. 28-34.
Seong Han Kim, Aric Opdahl, Chris Marmo, Garbor A. Somorjai; AFM and SFG studies of pHEMA-based hydrogel contact lens surfaces in saline solution: adhesion, friction, and the presence of non-crosslinked polymer chains at the surface; Biomaterials 23 (2002) pp. 1657-1666.

Seong Han Kim, Aric Opdahl, Chris Marmo, Garbor A. Somorjai; Friction studies of hydrogel contact lenses using AFM: non-cross-linked polymers of low friction at the surface; Biomaterials 22 (2001) pp. 3285-3294.
Gerald E. Lowther; Hydrophilic Lens Inspection with Phase Contrast Microscopy; American Journal of Optometry & Physiological Optics, vol. 58, No. 8, pp. 621-625, Aug. 1981.
M.D. Merindano, M. Canals, C. Saona, and J. Costa; Rigid gas permeable contact lenses surface roughness examined by interferential shifting phase and scanning electron microscopies; Ophthal. Physiol. Opt. vol. 18, No. 1 pp. 75-92, 1998.
K.J. Strout, L. Blunt; Nanometres to micrometres: three-dimentional surface measurement in bio-engineering; Surface and Coatings Technology 71 (1995) pp. 69-81.
Oguz Okay, Safiye B. Sariisik; Swelling behavior of poly(acrylamide-co-sodium acrylate) hydrogels in aqueous salt solutions: theory versus experiments; European Polymer Journal 36 (2000) pp. 393-399.
Sudi Patel, Waheeda Illahi, Arthur Davis; Changes in water content of high plus hydrogel lenses worn on an extended wear basis in a geriatric aphakic population; Contact Lens & Anterior Eye 28 (2005) pp. 127-134.
Carol E. Rabke, Paul L. Valient, Jr., and Daniel M. Ammon; Ophthalmic Applications of Atomic Force Microscopy; ICLC, vol. 22, Jan./Feb. 1995, pp. 32-41.
V. Rebeix, F. Sommer, B. Marchin, D. Baude, Tran Minh; Artificial tear absorption on soft contact lenses: methods to test surfactant efficacy; Biomaterials, 21 (2000), pp. 1197-1205.
Ronan Rogers; In vitro and ex vivo wettability of hydrogel contact lenses; Thesis, University of Waterloo, Waterloo, Ontario, Canada, 2006.
F.M. Serry; Applications of Atomic Force Microscopy for Contact Lens Manufacturing; Veeco Instruments, Inc. (2004), www.veeco.com.
Christopher Snyder, OD, MS, FAAO; A Primer on Contact Lens Materials; http://www.clspectrum.com/references.asp; (2004) Contact Lens Spectrum, Document 102.
Kim Sweers, Kees Van Der Werf, Martin Bennink and Vinod Subramaniam; Nanomechanical properties of a-synuclein amyloid fibrils: a comparative study by nanoindentation, harmonic force microscopy, and Peakforce QNM; Nanoscale Research Letters, 2011, 6:270, pp. 1-10.
Gareth Ross, Muriel Nasso, Val Franklin, Fiona Lydon and Brian Tighe; Silicone Hydrogels: Trends in Products and Properties; Biomaterials Research Unit, Aston University, Birmingham, B4 7ET (2005).
David A. Tirrell, Doreen Y. Takigawa and Kenji Seki; pH Sensitization of Phospholipid Vesicles via Complexation with Synthetic Poly(carboxylic acid)s; Annals of the New Your Academy of Sciences (1985), vol. 446, pp. 237-248.
Ioannis Tranoudis, Nathan Efron; Water properties of soft contact lens materials; Contact Lens & Anterior Eye 27 (2004) pp. 193-208.
Sean L. Willis, Jane L. Court, Richard P. Redman, Hin-Hai Wang, Simon W. Leppard, Wincent J. O'Byrne, Sharon A. Small, Andrew L. Lewis, Stephen A. Jones, Peter W. Stratford; A novel phosphorylcholine-coated contact lens for extended wear use; Biomaterials 22 (2001) pp. 3261-3272.
Peng Xiao, Robert E. Imhof; Opto-Thermal Skin Water Concentration Gradient Measurement; School of EE & IE, South Bank University (1996) vol. 2681, pp. 31-41.
Abohachem Laguecir, Serge Ulrich, Jerone Labille, Nicolas Fatin-Rouge, Serge Stoll, & Jacques Buffle; European Polymner Journal, 42(2006) pp. 1135-1144, Size and pH effect on electrical and conformational behavior of poly(acrylic acid): Simulation and experiment.
Shuping Jin, Mingzhu Liu, Shilan Chen, Yong Chen, European Polymer Journal, 41 (2005), pp. 2406-2415; Complexation between poly(acrylic acid) and poly(vinylpyrrolidone).

* cited by examiner

METHOD FOR APPLYING STABLE COATING ON SILICONE HYDROGEL CONTACT LENSES

This application claims the benefits under 35 USC § 119 (e) of U.S. provisional application No. 62/267,316 filed 15 Dec. 2015 and 62/304,494 filed 7 Mar. 2016, herein incorporated by references in their entireties.

The present invention generally relates to a method for producing silicone hydrogel contact lenses having a stable lubricious coating thereon without involving use of organic solvent in post-curing processes. In addition, the present invention provides silicone hydrogel contact lenses produced according to the method of the invention.

BACKGROUND

Soft silicone hydrogel contact lenses are increasingly becoming popular because of their high oxygen permeability and comfort. But, a silicone hydrogel material typically has a surface, or at least some areas of its surface, which is hydrophobic (non-wettable) and susceptible to adsorbing lipids or proteins from the ocular environment and may adhere to the eye. Thus, a silicone hydrogel contact lens will generally require a surface modification.

A known approach for modifying the hydrophilicity of a relatively hydrophobic contact lens material is through the use of a plasma treatment, for example, commercial lenses such as Focus NIGHT & DAY™ and O2OPTIX™ (CIBA VISION), and PUREVISION™ (Bausch & Lomb) utilize this approach in their production processes. Advantages of a plasma coating, such as, e.g., those may be found with Focus NIGHT & DAY™, are its durability, relatively high hydrophilicity/wettability), and low susceptibility to lipid and protein deposition and adsorption. But, plasma treatment of silicone hydrogel contact lenses may not be cost effective, because the preformed contact lenses must typically be dried before plasma treatment and because of relative high capital investment associated with plasma treatment equipment.

Various other approaches are proposed and/or used for modifying the surface hydrophilicity of a silicone hydrogel contact lens. Examples of such approaches include: incorporation of wetting agents (hydrophilic polymers) into a lens formulation for making the silicone hydrogel contact lens (see, e.g., U.S. Pat. Nos. 6,367,929, 6,822,016, 7,052,131, and 7,249,848); a layer-by-layer (LbL) polyionic material deposition technique (see, e.g., U.S. Pat. Nos. 6,451,871; 6,719,929; 6,793,973; 6,884,457; 6,896,926; 6,926,965; 6,940,580; and 7,297,725, and U.S. Pat. Appl. Pub. Nos. 2007/0229758A1; 2008/0174035A1 and 2008/0152800A1); crosslinking of LbL coatings on contact lenses has been proposed in commonly-owned copending US pat. Appl. pub. Nos. 2008/0226922 A1 and 2009/0186229 A1; and attachment of hydrophilic polymers onto contact lenses according to various mechanisms (see for example, U.S. Pat. Nos. 6,099,122, 6,436,481, 6,440,571, 6,447,920, 6,465,056, 6,521,352, 6,586,038, 6,623,747, 6,730,366, 6,734,321, 6,835,410, 6,878,399, 6,923,978, 6,440,571, and 6,500,481, US Pat. Appl. Pub. Nos. 2009/0145086 A1, 2009/0145091A1, 2008/0142038A1, and 2007/0122540A1). Although those techniques can be used in rendering a silicone hydrogel material wettable, there are some shortcomings in those techniques. For example, wetting agents may impart haziness to the resultant lenses because of their incompatibility with other silicone components in the lens formulation and may not provide a durable hydrophilic surface for extended wear purposes. LbL coatings may not be as durable as plasma coatings and may have relatively high densities of surface charges; which may interfere with contact lens cleaning and disinfecting solutions. Crosslinked LbL coatings may have a hydrophilicity and/or wettability inferior than original LbL coatings (prior to crosslinking) and still have relative high densities of surface charges. In addition, they may not be cost-effective and/or time-efficient for implementation in a mass production environment, because they typically require relatively long time and/or involve laborious, multiple steps to obtain a hydrophilic coating.

Recently, a new cost-effective approach has been described in U.S. Pat. No. 8,529,057 (herein incorporated by reference in its entirety) for applying a non-silicone hydrogel coating onto a silicone hydrogel contact lens, involving the extraction of the silicone hydrogel contact lens with an organic solvent, contacting of the extracted silicone hydrogel contact lens with an organic solvent-based coating solution to form a stable, interpenetrating base coating on a silicone hydrogel contact lens, rinsing of the silicone hydrogel contact lens with a mixture of water and an organic solvent, and covalently attaching of a partially-crosslinked hydrophilic polymeric material onto the base coating directly in a lens package during autoclave. Although this new approach can provide silicone hydrogel contact lenses with durable hydrophilic coatings thereon, it may not be environmentally friendly manufacturing process because it involves use of organic solvents in lens processing steps after the lens molding step.

Therefore, there is still a need for new method for manufacturing silicone hydrogel contact lenses with a stable, lubricious coating thereon in an environmentally-friendly manner.

SUMMARY OF THE INVENTION

The invention, in one aspect, provides a method for producing silicone hydrogel contact lenses each having a crosslinked hydrophilic coating thereon, the method of invention comprising the steps of:

(1) introducing a polymerizable composition into a lens mold, wherein the polymerizable composition comprises (a) at least silicone-containing polymerizable component which is at least one siloxane-containing vinylic monomer, at least one silicone-containing vinylic macromer, or a combination thereof, (b) at least one vinylic crosslinking agent, (c) a blending vinylic monomer selected from the group consisting of a $C_1$-$C_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), (d) from about 30% to about 60% by weight of at least one N-vinyl amide monomer relative to the total amount of polymerizable components, and (e) at least one initiator;

(2) curing thermally or actinically the polymerizable composition in the lens mold to form a silicone hydrogel contact lens;

(3) forming a base coating on the formed silicone hydrogel contact lens by immersing the formed silicone hydrogel contact lens in an aqueous solution of a polyanionic polymer having carboxyl groups and a number average molecular weight of at least about 100000 Daltons for a time period of from about 60 minutes to about 240 minutes, wherein the aqueous solution has a pH of from about 0 to about 3.0;

(4) rinsing the silicone hydrogel contact lens having the base coating thereon with a buffered saline having a pH from about 6.5 to about 9.5; and (5) heating the rinsed silicone hydrogel contact lens having the base coating thereon in a packaging solution including a water-soluble, thermally-crosslinkable hydrophilic polymeric material at a temperature from about 60° C. to about 140° C. to form the crosslinked hydrophilic coating, wherein the packaging solution has a pH from about 6.8 to about 9.5 and a tonicity of from about 200 to about 450 milliosmol (mOsm), wherein the crosslinked hydrophilic coating exhibits a water-break-up-time (WBUT) of at least about 5 seconds, a friction rating of about 3 or lower, and a coating durability characterized by surviving a digital rubbing test, provided that after step (2) the silicone hydrogel contact lens is not in contact with any organic solvent other than propylene glycol and polyethylene glycol having a molecular weight of 400 Daltons or less.

In another aspect, the invention provides a silicone hydrogel contact lens obtained according to a method of the invention, wherein the silicone hydrogel contact lens has an oxygen permeability of at least about 40 barrers, a water-break-up-time (WBUT) of at least about 10 seconds, a friction rating of about 3 or lower (preferably about 2.5 or lower, more preferably about 2 or lower, even more preferably about 1.5 or lower, most preferably about 1 or lower), a surface wettability characterized by a water contact angle of about 80 degrees or less, and a coating durability characterized by surviving a digital rubbing test.

These and other aspects of the invention will become apparent from the following description of the presently preferred embodiments. The detailed description is merely illustrative of the invention and does not limit the scope of the invention, which is defined by the appended claims and equivalents thereof. As would be obvious to one skilled in the art, many variations and modifications of the invention may be effected without departing from the spirit and scope of the novel concepts of the disclosure.

DETAILED DESCRIPTION OF EMBODIMENTS OF THE INVENTION

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. Where a term is provided in the singular, the inventors also contemplate the plural of that term. The nomenclature used herein and the laboratory procedures described below are those well-known and commonly employed in the art.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel bulk (core) material.

A "soft contact lens" refers to a contact lens which has an elastic modulus (i.e., Young's modulus) of less than 2.5 MPa.

A "hydrogel" or "hydrogel material" refers to a crosslinked polymeric material which has three-dimensional polymer networks (i.e., polymer matrix), is insoluble in water, but can hold at least 10 percent by weight of water in its polymer matrix when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

As used in this application, the term "non-silicone hydrogel" refers to a hydrogel that is theoretically free of silicon.

"Hydrophilic," as used herein, describes a material or portion thereof that will more readily associate with water than with lipids.

A "vinylic monomer" refers to a compound that has one sole ethylenically unsaturated group, is soluble in a solvent, and can be polymerized actinically or thermally.

The term "room temperature" refers to a temperature of about 22° C. to about 28° C.

The term "soluble", in reference to a compound or material in a solvent, means that the compound or material can be dissolved in the solvent to give a solution with a concentration of at least about 0.02% by weight at room temperature.

The term "insoluble", in reference to a compound or material in a solvent, means that the compound or material can be dissolved in the solvent to give a solution with a concentration of less than 0.005% by weight at room temperature.

As used in this application, the term "ethylenically unsaturated group" is employed herein in a broad sense and is intended to encompass any groups containing at least one >C=C< group. Exemplary ethylenically unsaturated groups include without limitation (meth)acryloyl

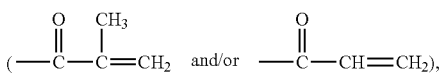

allyl, vinyl, styrenyl, or other C=C containing groups.

The term "(meth)acrylamide" refers to methacrylamide and/or acrylamide.

The term "(meth)acrylate" refers to methacrylate and/or acrylate.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV/visible irradiation, ionizing radiation (e.g. gamma ray or X-ray irradiation), microwave irradiation, and the like. Thermal curing or actinic curing methods are well-known to a person skilled in the art.

A "hydrophilic vinylic monomer", as used herein, refers to a vinylic monomer which as a homopolymer typically yields a polymer that is water-soluble or can absorb at least 10 percent by weight of water.

A "hydrophobic vinylic monomer", as used herein, refers to a vinylic monomer which as a homopolymer typically yields a polymer that is insoluble in water and can absorb less than 10 percent by weight of water.

A "blending vinylic monomer" refers to a vinylic monomer capable of dissolving both hydrophilic and hydrophobic components of a polymerizable composition to form a solution.

A "macromer" or "prepolymer" refers to a compound or polymer that contains ethylenically unsaturated groups and has a number average molecular weight of greater than 700 Daltons.

As used in this application, the term "vinylic crosslinker" refers to a compound having at least two ethylenically unsaturated groups. A "vinylic crosslinking agent" refers to a vinylic crosslinker having a molecular weight of 700 Daltons or less.

As used in this application, the term "polymer" means a material formed by polymerizing/crosslinking one or more monomers or macromers or prepolymers or combinations thereof.

As used in this application, the term "molecular weight" of a polymeric material (including monomeric or macromeric materials) refers to the number average molecular weight unless otherwise specifically noted or unless testing conditions indicate otherwise.

A "polysiloxane" refers to a compound containing a polysiloxane segment of

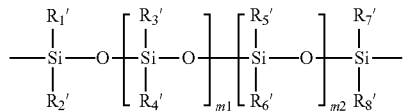

in which m1 and m2 independently of each other are an integer of from 0 to 500 and (m1+m2) is from 2 to 500, $R_1'$, $R_2'$, $R_3'$, $R_4'$, $R_5'$, $R_6'$, $R_7'$, and $R_8'$ independently of one another, are $C_1$-$C_{10}$ alkyl, $C_1$-$C_4$ alkyl- or $C_1$-$C_4$-alkoxy-substituted phenyl, $C_1$-$C_{10}$ fluoroalkyl, $C_1$-$C_{10}$ fluoroether, $C_6$-$C_{18}$ aryl radical, -alk-$(OC_2H_4)_{m3}$—OR' (in which alk is $C_1$-$C_6$ alkyl diradical, R' is H or $C_1$-$C_4$ alkyl and m3 is an integer from 1 to 10), or a linear hydrophilic polymer chain.

A "polycarbosiloxane" refers to a compound containing a polycarbosiloxane segment of

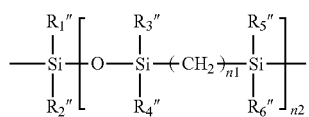

in which n1 is an integer of 2 or 3, n2 is an integer of from 2 to 100 (preferably from 2 to 20, more preferably from 2 to 10, even more preferably from 2 to 6), $R_1''$, $R_2''$, $R_3''$, $R_4''$, $R_5''$, and $R_6''$ independent of one another are a $C_1$-$C_6$ alkyl radical (preferably methyl).

The term "fluid" as used herein indicates that a material is capable of flowing like a liquid.

The term "alkyl" refers to a monovalent radical obtained by removing a hydrogen atom from a linear or branched alkane compound. An alkyl group (radical) forms one bond with one other group in an organic compound.

The term "alkylene divalent group" or "alkylene diradical" or "alkyl diradical" interchangeably refers to a divalent radical obtained by removing one hydrogen atom from an alkyl. An alkylene divalent group forms two bonds with other groups in an organic compound.

The term "alkyl triradical" refers to a trivalent radical obtained by removing two hydrogen atoms from an alkyl. An alkyl triradical forms three bonds with other groups in an organic compound.

The term "alkoxy" or "alkoxyl" refers to a monovalent radical obtained by removing the hydrogen atom from the hydroxyl group of a linear or branched alkyl alcohol. An alkoxy group (radical) forms one bond with one other group in an organic compound.

In this application, the term "substituted" in reference to an alkyl diradical or an alkyl radical means that the alkyl diradical or the alkyl radical comprises at least one substituent which replaces one hydrogen atom of the alkyl diradical or the alkyl radical and is selected from the group consisting of hydroxy (—OH), carboxy (—COOH), —NH₂, sulfhydryl (—SH), $C_1$-$C_4$ alkyl, $C_1$-$C_4$ alkoxy, $C_1$-$C_4$ alkylthio (alkyl sulfide), $C_1$-$C_4$ acylamino, $C_1$-$C_4$ alkylamino, di-$C_1$-$C_4$ alkylamino, halogen atom (Br or Cl), and combinations thereof.

In this application, the term "polyoxazoline" refers to a linear polymer having a formula

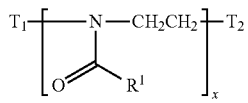

in which: T1 and T2 are two terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500. A polyoxazoline segment has a divalent polymer chain of a formula of

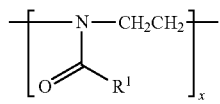

in which $R^1$ and x are as defined above.

In this application, the term "poly(2-oxazoline-co-ethyleneimine)" refers to a statistical copolymer having a formula of

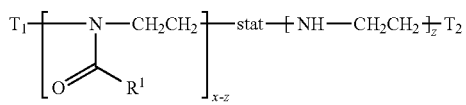

in which: T1 and T2 are terminal groups; $R^1$ is hydrogen, methyl, ethyl, N-pyrrolidonylmethyl, N-pyrrolidonylethyl, N-pyrrolidonylpropyl, or a monovalent radical of -alk-$(OC_2H_4)_{m3}$—OR" in which alk is $C_1$-$C_4$ alkyl diradical; R" is $C_1$-$C_4$ alkyl (preferably methyl); m3 is an integer from 1 to 10 (preferably 1 to 5); x is an integer from 5 to 500; z is an integer equal to or less than x. A poly(2-oxazoline-co-ethyleneimine) is obtained by hydrolyzing a polyoxazoline.

In this application, the term "poly(2-oxazoline-co-ethyleneimine)-epichlorohydrin" refers to a polymer obtained by reacting a poly(2-oxazoline-co-ethyleneimine) with epichlorohydrin to convert all or substantial percentage (90%) of the secondary amine groups of the poly(2-oxazoline-co-ethyleneimine) into azetidinium groups. Examples of poly (2-oxazoline-co-ethyleneimine)-epichlorohydrin are disclosed in U.S. pat. Appl. pub. No. 2016/0061995 A1 (herein incorporated by reference in its entirety).

An "epichlorohydrin-functionalized polyamine" or "epichlorohydrin-functionalized polyamidoamine" refers to a polymer obtained by reacting a polyamine or polyamidoamine with epichlorohydrin to convert all or a substantial percentage of the secondary amine groups of the polyamine or polyamidoamine into azetidinium groups.

The term "polyamidoamine-epichlorohydrin" refers to an epichlorohydrin-functionalized adipic acid-diethylenetriamine copolymer.

In this application the term "azetidinium" or "3-hydroxyazetidinium" refers to a positively-charged, divalent radical (or group or moiety) of

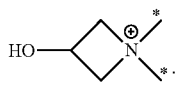

The term "thermally-crosslinkable" in reference to a polymeric material or a functional group means that the polymeric material or the functional group can undergo a crosslinking (or coupling) reaction with another material or functional group at a relatively-elevated temperature (from about 40° C. to about 140° C.), whereas the polymeric material or functional group cannot undergo the same crosslinking reaction (or coupling reaction) with another material or functional group at room temperature (i.e., from about 22° C. to about 28° C., preferably from about 24° C. to about 26° C., in particular at about 25° C.) to an extend detectable for a period of about one hour.

The term "azlactone" refers to a mono-valent radical of formula

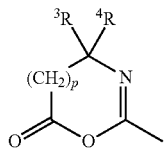

in which p is 0 or 1; $^3R$ and $^4R$ independently of each other is $C_1$-$C_8$ alkyl (preferably methyl).

As used in this application, the term "phosphorylcholine" refers to a monovalent zwitterionic group of

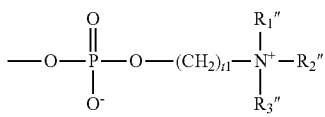

in which t1 is an integer of 1 to 5 and $R_1''$, $R_2''$ and $R_3''$ independently of one another are $C_1$-$C_8$ alkyl or $C_1$-$C_8$ hydroxyalkyl.

As used in this application, the term "reactive vinylic monomer" refers to any vinylic monomer having at least one reactive functional group selected from the group consisting of carboxyl group, primary amino group, and secondary amino group.

As used in this application, the term "non-reactive vinylic monomer" refers to any vinylic monomer (either hydrophilic or hydrophobic vinylic monomer) free of carboxyl group, primary amino group, secondary amino group, epoxide group, isocyanate group, azlactone group, or aziridine group.

A free radical initiator can be either a photoinitiator or a thermal initiator. A "photoinitiator" refers to a chemical that initiates free radical crosslinking/polymerizing reaction by the use of light. A "thermal initiator" refers to a chemical that initiates radical crosslinking/polymerizing reaction by the use of heat energy.

A "spatial limitation of actinic radiation" refers to an act or process in which energy radiation in the form of rays is directed by, for example, a mask or screen or combinations thereof, to impinge, in a spatially restricted manner, onto an area having a well defined peripheral boundary. A spatial limitation of UV/visible radiation is obtained by using a mask or screen having a radiation (e.g.,UV/visible) permeable region, a radiation (e.g., UV/visible) impermeable region surrounding the radiation-permeable region, and a projection contour which is the boundary between the radiation-impermeable and radiation-permeable regions, as schematically illustrated in the drawings of U.S. Pat. No. 6,800,225 (FIGS. 1-11), and U.S. Pat. No. 6,627,124 (FIGS. 1-9), U.S. Pat. No. 7,384,590 (FIGS. 1-6), and U.S. Pat. No. 7,387,759 (FIGS. 1-6), herein incorporated by reference in their entireties. The mask or screen allows to spatially projects a beam of radiation (e.g., UV/visible radiation) having a cross-sectional profile defined by the projection contour of the mask or screen. The projected beam of radiation (e.g., UV/visible radiation) limits radiation (e.g., UV/visible radiation) impinging on a lens-forming material located in the path of the projected beam from the first molding surface to the second molding surface of a mold. The resultant contact lens comprises an anterior surface defined by the first molding surface, an opposite posterior surface defined by the second molding surface, and a lens edge defined by the sectional profile of the projected UV/visible beam (i.e., a spatial limitation of radiation). The radiation used for the crosslinking is any radiation energy, especially UV/visible radiation, gamma radiation, electron radiation or thermal radiation, the radiation energy preferably being in the form of a substantially parallel beam in order on the one hand to achieve good restriction and on the other hand efficient use of the energy.

A "water contact angle" refers to an average water contact angle (i.e., contact angles measured by Sessile Drop method) at the room temperature, which is obtained by averaging measurements of contact angles with at least 3 individual contact lenses.

The term "intactness" in reference to a coating on a silicone hydrogel contact lens is intended to describe the extent to which the contact lens can be stained by Sudan Black in a Sudan Black staining test described in Example 1. Good intactness of the coating on a silicone hydrogel contact lens means that there is practically no Sudan Black staining of the contact lens.

The term "durability" in reference to a coating on a silicone hydrogel contact lens is intended to describe that the coating on the silicone hydrogel contact lens can survive a digital rubbing test.

As used herein, "surviving a digital rubbing test" or "surviving a durability test" in reference to a coating on a contact lens means that after digitally rubbing the lens according to a procedure described in Example 1, water contact angle on the digitally rubbed lens is still about 100 degrees or less, preferably about 90 degrees or less, more preferably about 80 degrees or less, most preferably about 70 degrees or less.

The intrinsic "oxygen permeability", Dk, of a material is the rate at which oxygen will pass through a material.

Oxygen permeability is conventionally expressed in units of barrers, where "barrer" is defined as [(cm$^3$ oxygen)(mm)/(cm$^2$)(sec)(mm Hg)]×10$^{-10}$.

The "oxygen transmissibility", Dk/t, of a lens or material is the rate at which oxygen will pass through a specific lens or material with an average thickness of t [in units of mm] over the area being measured. Oxygen transmissibility is conventionally expressed in units of barrers/mm, where "barrers/mm" is defined as [(cm$^3$ oxygen)/(cm$^2$)(sec)(mm Hg)]×10$^{-9}$.

The "ion permeability" through a lens correlates with the Ionoflux Diffusion Coefficient. The Ionoflux Diffusion Coefficient, D (in units of [mm$^2$/min]), is determined by applying Fick's law as follows:

$$D=-n'/(A\times dc/dx)$$

where n'=rate of ion transport [mol/min]; A=area of lens exposed [mm$^2$]; dc=concentration difference [mol/L]; dx=thickness of lens [mm].

"Ophthalmically compatible", as used herein, refers to a material or surface of a material which may be in intimate contact with the ocular environment for an extended period of time without significantly damaging the ocular environment and without significant user discomfort.

The term "ophthalmically safe" with respect to a packaging solution for sterilizing and storing contact lenses is meant that a contact lens stored in the solution is safe for direct placement on the eye without rinsing after autoclave and that the solution is safe and sufficiently comfortable for daily contact with the eye via a contact lens. An ophthalmically-safe packaging solution after autoclave has a tonicity and a pH that are compatible with the eye and is substantially free of ocularly irritating or ocularly cytotoxic materials according to international ISO standards and U.S. FDA regulations.

The term "modulus" or "elastic modulus" in reference to a contact lens or a material means the tensile modulus or Young's modulus which is a measure of the stiffness of a contact lens or a material. The modulus can be measured using a method in accordance with ANSI Z80.20 standard. A person skilled in the art knows well how to determine the elastic modulus of a silicone hydrogel material or a contact lens. For example, all commercial contact lenses have reported values of elastic modulus.

The invention is generally related to a method for producing silicone hydrogel contact lenses with a non-silicone hydrogel coating thereon, which comprises a water-based coating step for forming a base coating, and an in-package-crosslinking step for forming a crosslinked hydrophilic coating and is free of use of any organic solvent other than propylene glycol and polyethylene glycol having a molecular weight of 400 Daltons or less in any post-molding processes. This invention is partly based on the discovery that an aqueous coating solution at a low pH (from about 0 to about 3.5) of a polyanionic polymer having a high molecular weight can have dual function: extracting extractable materials from a molded silicone hydrogel contact lens from a lens formulation of the invention and applying a stable base coating onto the mold material. With such stable base coating formed in a water-based coating process, a durable non-silicone hydrogel coating on the silicone hydrogel contact lens can be formed by covalently attaching a partially-crosslinked hydrophilic polymeric material according to thermally-induced reaction mechanism involving an azetidnium group and a carboxyl, primary amino or secondary amino group as shown below:

Scheme I

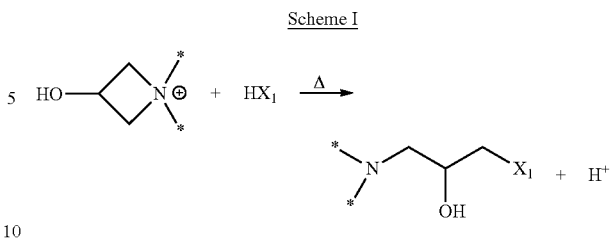

in which X$_1$ is —S—*, —OC(=O)—*, or —NR'—* in which R' is hydrogen, a C$_1$-C$_{20}$ unsubstituted or substituted, linear or branched alkyl group; * represents an organic radical. Such a reaction can be carried out conveniently and directly in a lens package during autoclave (i.e., heating the lens package with the lens in a packaging solution about 115° C. to about 125° C. for approximately 20-40 minutes under pressure) which is a commonly-used sterilization process in the contact lens industry. Any azetidnium groups which are not reacted with carboxyl, primary amino or secondary amino groups will be hydrolyzed during autoclave as shown below Scheme II

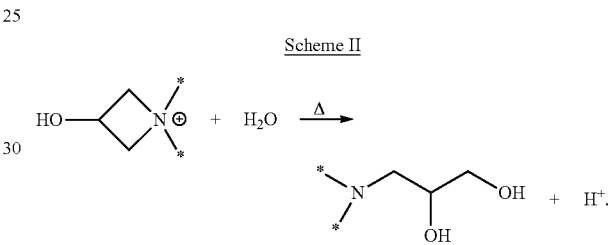

The invention, in one aspect, provides a method for producing silicone hydrogel contact lenses each having a crosslinked hydrophilic coating thereon, the method of invention comprising the steps of:

(1) introducing a polymerizable composition into a lens mold, wherein the polymerizable composition comprises (a) at least silicone-containing polymerizable component which is at least one siloxane-containing vinylic monomer, at least one silicone-containing vinylic macromer, or a combination thereof, (b) at least one vinylic crosslinking agent, (c) a blending vinylic monomer selected from the group consisting of a C$_1$-C$_{10}$ alkyl methacrylate, isobornylmethacrylate, isobornylacrylate, cyclopentylmethacrylate, cyclopentylacrylate, cyclohexylmethacrylate, cyclohexylacrylate, styrene, 2,4,6-trimethylstyrene (TMS), and t-butyl styrene (TBS), (d) from about 30% to about 60% by weight (preferably from about 35% to about 56%, more preferably from about 40% to about 52% by weight) of at least one N-vinyl amide monomer (which is preferably N-vinylpyrrolidone, N-vinyl-N-methyl acetamide, N-vinyl acetamide, N-vinyl formamide, N-vinyl isopropylamide, or a mixture thereof, more preferably is N-vinylpyrrolidone, N-vinyl-N-methyl acetamide, or a combination thereof) relative to the total amount of polymerizable components, and (e) at least one free-radical initiator;

(2) curing thermally or actinically the polymerizable composition in the lens mold to form a silicone hydrogel contact lens;

(3) forming a base coating on the formed silicone hydrogel contact lens by immersing the formed silicone hydrogel contact lens in an aqueous solution of a polyanionic polymer having carboxyl groups and a number average molecular weight of at least about 100000 Daltons (preferably from about 200000 Daltons to about 3000000 Daltons, more preferably from about 300000 Daltons to about 2500000 Daltons) for a time period of from about 60 minutes to about 240 minutes, wherein the aqueous solution has a pH of from about 0 to about 3.5 (preferably from about 1.0 to about 2.5);

(4) rinsing the silicone hydrogel contact lens having the base coating thereon with a buffered saline having a pH from about 6.5 to about 9.5 (preferably from about 6.8 to about 8.0, more preferably from about 7.0 to about 7.5); and (5) heating the rinsed silicone hydrogel contact lens having the base coating thereon in a packaging solution including a water-soluble, thermally-crosslinkable hydrophilic polymeric material at a temperature from about 60° C. to about 140° C. to form the crosslinked hydrophilic coating, wherein the packaging solution has a pH from about 6.8 to about 9.5 and a tonicity of from about 200 to about 450 milliosmol (mOsm), wherein the crosslinked hydrophilic coating exhibits a water-break-up-time (WBUT) of at least about 5 seconds (preferably at least about 10 second, more preferably at least about 15 second, even more preferably at least about 20 seconds), a friction rating of about 3 or lower (preferably about 2.5 or lower, more preferably about 2 or lower, even more preferably about 1.5 or lower, most preferably about 1 or lower), and a coating durability characterized by surviving a digital rubbing test, provided that after step (2) the silicone hydrogel contact lens is not in contact with any organic solvent other than propylene glycol and polyethylene glycol having a molecular weight of 400 Daltons or less.

Any suitable siloxane-containing vinylic monomers can be used in the invention. Examples of preferred siloxane-containing vinylic monomers include without limitation N-[tris(trimethylsiloxy)silylpropyl]-(meth)acrylamide, N-[tris(dimethylpropylsiloxy)-silylpropyl]-(meth)acrylamide, N-[tris(dimethylphenylsiloxy)silylpropyl] (meth)acrylamide, N-[tris(dimethylethylsiloxy)silylpropyl] (meth)acrylamide, N-(2-hydroxy-3-(3-(bis(trimethylsilyloxy)methylsilyl)propyloxy)propyl)-2-methyl acrylamide; N-(2-hydroxy-3-(3-(bis(trimethylsilyloxy)methylsilyl)propyloxy)propyl) acrylamide; N,N-bis[2-hydroxy-3-(3-(bis(trimethylsilyloxy)methylsilyl)propyloxy)propyl]-2-methyl acrylamide; N,N-bis[2-hydroxy-3-(3-(bis(trimethylsilyloxy)methylsilyl)propyloxy)propyl] acrylamide; N-(2-hydroxy-3-(3-(tris(trimethylsilyloxy)silyl)propyloxy)propyl)-2-methyl acrylamide; N-(2-hydroxy-3-(3-(tris(trimethylsilyloxy)silyl)propyloxy)propyl)acrylamide; N,N-bis[2-hydroxy-3-(3-(tris(trimethylsilyloxy)silyl)propyloxy)propyl]-2-methyl acrylamide; N,N-bis[2-hydroxy-3-(3-(tris(trimethylsilyloxy)silyl)propyloxy)propyl]acrylamide; N-[2-hydroxy-3-(3-(t-butyldimethylsilyl) propyloxy)propyl]-2-methyl acrylamide; N-[2-hydroxy-3-(3-(t-butyldimethylsilyl)propyloxy)propyl]acrylamide; N,N-bis[2-hydroxy-3-(3-(t-butyldimethylsilyl)propyloxy)propyl]-2-methyl acrylamide; N,N-bis[2-hydroxy-3-(3-(t-butyldimethylsilyl)propyloxy)propyl]acrylamide; 3-methacryloxy propylpentamethyldisiloxane, tris(trimethylsilyloxy)silylpropyl methacrylate (TRIS), (3-methacryloxy-2-hydroxypropyloxy)propylbis(trimethylsiloxy)methylsilane), (3-methacryloxy-2-hydroxypropyloxy)propyltris(trimethylsiloxy)silane, 3-methacryloxy-2-(2-hydroxyethoxy)-propyloxy)propylbis(trimethylsiloxy)methylsilane, N-2-methacryloxyethyl-O-(methyl-bis-trimethylsiloxy-3-propyl)silylcarbamate, 3-(trimethylsilyl)propylvinyl carbonate, 3-(vinyloxycarbonylthio)propyl-tris(trimethyl-siloxy)silane, 3-[tris(trimethylsiloxy)silyl]propylvinyl carbamate, 3-[tris(trimethylsiloxy)silyl] propyl allyl carbamate, 3-[tris(trimethylsiloxy)silyl]propyl vinyl carbonate, t-butyldimethyl-siloxyethyl vinyl carbonate; trimethylsilylethyl vinyl carbonate, and trimethylsilylmethyl vinyl carbonate). Most preferred siloxane-containing (meth) acrylamide monomers of formula (1) are N-[tris(trimethylsiloxy)silylpropyl]acrylamide, TRIS, N-[2-hydroxy-3-(3-(t-butyldimethylsilyl)propyloxy)propyl]acrylamide, or combinations thereof.

A class of preferred siloxane-containing vinylic monomers is polycarbosiloxane vinylic monomers (or carbosiloxane vinylic mnomers). Examples of such polycarbosiloxane vinylic monomers or macromers are those described in U.S. Pat. Nos. 7,915,323 and 8,420,711, in US Patent Applicaton Publication Nos. 2012/244088, 2012/245249, 2015/0309211, and 2015/0309210 (herein incorporated by references in their entireties).

A class of preferred siloxane-containing vinylic monomers is polysiloxane-containing vinylic monomers or macromers. Examples of such polysiloxane-containing vinylic monomers are monomethacrylated or monoacrylated polydimethylsiloxanes of various molecular weight (e.g., mono-3-methacryloxypropyl terminated, mono-butyl terminated polydimethylsiloxane or mono-(3-methacryloxy-2-hydroxypropyloxy)propyl terminated, mono-butyl terminated polydimethylsiloxane), or combinations thereof.

A class of preferred silicone-containing macromers is polysiloxane-containing macromers. Examples of such polysiloxane-containing macromers are dimethacrylated or diacrylated polydimethylsiloxanes of various molecular weight; vinyl carbonate-terminated polydimethylsiloxanes; vinyl carbamate-terminated polydimethylsiloxane; vinyl terminated polydimethylsiloxanes of various molecular weight; methacrylamide-terminated polydimethylsiloxanes; acrylamide-terminated polydimethylsiloxanes; acrylate-terminated polydimethylsiloxanes; methacrylate-terminated polydimethylsiloxanes; bis-3-methacryloxy-2-hydroxypropyloxypropyl polydimethylsiloxane; N,N,N',N'-tetrakis(3-methacryloxy-2-hydroxypropyl)-alpha,omega-bis-3-aminopropyl-polydimethylsiloxane; polysiloxanylalkyl (meth)acrylic monomers; siloxane-containing macromer selected from the group consisting of Macromer A, Macromer B, Macromer C, and Macromer D described in U.S. Pat. No. 5,760,100 (herein incorporated by reference in its entirety); the reaction products of glycidyl methacrylate with amino-functional polydimethylsiloxanes; hydroxyl-functionalized siloxane-containing vinylic monomers or macromers; polysiloxane-containing macromers disclosed in U.S. Pat. Nos. 4,136,250, 4,153,641, 4,182,822, 4,189,546, 4,343,927, 4,254,248, 4,355,147, 4,276,402, 4,327,203, 4,341,889, 4,486,577, 4,543,398, 4,605,712, 4,661,575, 4,684,538, 4,703,097, 4,833,218, 4,837,289, 4,954,586, 4,954,587, 5,010,141, 5,034,461, 5,070,170, 5,079,319, 5039,761, 5,346,946, 5,358,995, 5,387,632, 5,416,132, 5,451,617, 5,486,579, 5,962,548, 5,981,675, 6,039,913, and 6,762,264 (here incorporated by reference in their entireties); polysiloxane-containing macromers disclosed in U.S. Pat. Nos. 4,259,467, 4,260,725, and 4,261,875 (herein incorporated by reference in their entireties).

Suitable monofunctional hydroxyl-functionalized siloxane-containing vinylic monomers/macromers and suitable multifunctional hydroxyl-functionalized siloxane-containing vinylic monomers/macromers are commercially available from Gelest, Inc, Morrisville, Pa.

Another class of preferred silicone-containing vinylic macromers is silicon-containing prepolymers comprising hydrophilic segments and hydrophobic segments. Any suitable of silicone-containing prepolymers with hydrophilic segments and hydrophobic segments can be used in the invention. Examples of such silicone-containing prepolymers include those described in commonly-owned U.S. Pat. Nos. 6,039,913, 7,091,283, 7,268,189, 7,238,750, 7,521,519, 8,003,710, 8,071,658, 8,071,703, 8,383,744, 8,404,783, 8,524,800, and 8,642,712 (all of which are incorporated herein by references in their entireties.

In addition to N-vinylpyrrolidone, a lens formulation for making SiHy contact lenses of the invention can further comprise one or more hydrophilic vinylic monomers other than N-vinylpyrrolidone. Preferred examples of such hydrophilic vinylic monomers are N,N-dimethylacrylamide (DMA), N,N-dimethylmethacrylamide (DMMA), 2-acrylamidoglycolic acid, 3-acryloylamino-1-propanol, N-hydroxyethyl acrylamide, N-hydroxyethyl methacrylamide, N-hydroxypropyl acrylamide, N-hydroxypropyl methacrylamide, N[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 1-n-propyl-3-methylene-2-pyrrolidone, 1-n-propyl-5-methylene-2-pyrrolidone, 1-isopropyl-3-methylene-2-pyrrolidone, 1-isopropyl-5-methylene-2-pyrrolidone, 1-n-butyl-3-methylene-2-pyrrolidone, 1-tert-butyl-3-methylene-2-pyrrolidone, 2-hydroxyethylmethacrylate (HEMA), 2-hydroxyethyl acrylate (HEA), hydroxypropyl acrylate, hydroxypropyl methacrylate (H PMA), methoxyethylmethacrylate (i.e., ethylene glycol methyl ether methacrylate, EGMA), methoxyethylacrylate, trimethylammonium 2-hydroxy propylmethacrylate hydrochloride, aminopropyl methacrylate hydrochloride, dimethylaminoethyl methacrylate (DMAEMA), glycerol methacrylate (GMA), a $C_1$-$C_4$-alkoxy polyethylene glycol (meth)acrylate having a number average molecular weight of up to 1500, methacrylic acid, allyl alcohol, and mixtures thereof.

Examples of preferred blending vinylic monomers include $C_1$-$C_{10}$ alkyl (meth)acrylate (e.g., methyl (meth)acrylate, ethyl (meth)acrylate, propyl (meth)acrylate, isopropyl (meth)acrylate, 2-ethylhexyl (meth)acrylate, pentyl (meth)acrylate, hexyl (meth)acrylate, etc.), cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof. Preferably, methyl methacrylate or styrene is used as a blending vinylic monomer.

Examples of preferred vinylic cross-linking agents include without limitation ethyleneglycol di-(meth)acrylate, diethyleneglycol di-(meth)acrylate, triethyleneglycol di-(meth)acrylate, tetraethyleneglycol di-(meth)acrylate, glycerol di-(meth)acrylate, 1,3-propanediol di-(meth)acrylate, 1,3-butanediol di-(meth)acrylate, 1,4-butanediol di-(meth)acrylate, glycerol 1,3-diglycerolate di-(meth)acrylate, ethylenebis[oxy(2-hydroxypropane-1,3-diyl)] di-(meth)acrylate, bis[2-(meth)acryloxyethyl] phosphate, trimethylolpropane di-(meth)acrylate, and 3,4-bis[(meth)acryloyl]tetrahydrofuan, diacrylamide (i.e., N-(1-oxo-2-propenyl)-2-propenamide), dimethacrylamide (i.e., N-(1-oxo-2-methyl-2-propenyl)-2-methyl-2-propenamide), N,N-di(meth)acryloyl-N-methylamine, N,N-di(meth)acryloyl-N-ethylamine, N,N'-methylene bis(meth)acrylamide, N,N'-ethylene bis(meth)acrylamide, N,N'-dihydroxyethylene bis(meth)acrylamide, N,N'-propylene bis(meth)acrylamide, N,N'-2-hydroxypropylene bis(meth)acrylamide, N,N'-2,3-dihydroxybutylene bis(meth)acrylamide, 1,3-bis(meth)acrylamidepropane-2-yl dihydrogen phosphate (i.e., N,N'-2-phophonyloxypropylene bis(meth)acrylamide), piperazine diacrylamide (or 1,4-bis(meth)acryloyl piperazine), vinyl methacrylate, allylmethacrylate, allylacrylate, N-allyl-methacrylamide, N-allylacrylamide, tetraethyleneglycol divinyl ether, triethyleneglycol divinyl ether, diethyleneglycol divinyl ether, ethyleneglycol divinyl ether, triallyl isocyanurate, triallyl cyanurate, trimethylopropane trimethacrylate, pentaerythritol tetramethacrylate, bisphenol A dimethacrylate, 1,3-bis(acrylamidopropyl)-1,1,3,3-tetrakis(trimethylsiloxy) disiloxane, 1,3-bis(methacrylamidopropyl)-1,1,3,3-tetrakis (trimethylsiloxy)disiloxane, 1,3-bis(methacrylamidobutyl)-1,1,3,3-tetrakis(trimethylsiloxy)-disiloxane, 1,3-bis(methacryloxyethylureidopropyl)-1,1,3,3-tetrakis (trimethylsiloxy)disiloxane, and combinations thereof. A preferred cross-linking agent is tetra(ethyleneglycol) di-(meth)acrylate, tri(ethyleneglycol) di-(meth)acrylate, ethyleneglycol di-(meth)acrylate, di(ethyleneglycol) di-(meth)acrylate, methylenebisacrylamide, triallyl isocyanurate, or triallyl cyanurate. The amount of a cross-linking agent used is expressed in the weight content with respect to the total polymer and is preferably in the range from about 0.05% to about 3%, and more preferably in the range from about 0.1% to about 2%.

Examples of hydrophilic prepolymers with multiple acryloyl or methacryloyl groups include, but are not limited to, a water-soluble crosslinkable poly(vinyl alcohol) prepolymer described in U.S. Pat. Nos. 5,583,163 and 6,303,687; a water-soluble vinyl group-terminated polyurethane prepolymer described in U.S. Patent Application Publication No. 2004/0082680; derivatives of a polyvinyl alcohol, polyethyleneimine or polyvinylamine, which are disclosed in U.S. Pat. No. 5,849,841; a water-soluble crosslinkable polyurea prepolymer described in U.S. Pat. Nos. 6,479,587 and 7,977,430; crosslinkable polyacrylamide; crosslinkable statistical copolymers of vinyl lactam, MMA and a comonomer, which are disclosed in EP 655,470 and U.S. Pat. No. 5,712,356; crosslinkable copolymers of vinyl lactam, vinyl acetate and vinyl alcohol, which are disclosed in EP 712,867 and U.S. Pat. No. 5,665,840; polyether-polyester copolymers with crosslinkable side chains which are disclosed in EP 932,635 and U.S. Pat. No. 6,492,478; branched polyalkylene glycol-urethane prepolymers disclosed in EP 958,315 and U.S. Pat. No. 6,165,408; polyalkylene glycol-tetra (meth)acrylate prepolymers disclosed in EP 961,941 and U.S. Pat. No. 6,221,303; and crosslinkable polyallylamine gluconolactone prepolymers disclosed in International Application No. WO 2000/31150 and U.S. Pat. No. 6,472,489.

A polymerizavle composition can also comprise other necessary components known to a person skilled in the art, such as, for example, a UV-absorbing agent (i.e., UV-absorbing vinylic monomers), a visibility tinting agent (e.g., dyes, pigments, or mixtures thereof), antimicrobial agents (e.g., preferably silver nanoparticles), a bioactive agent, leachable lubricants, leachable tear-stabilizing agents, and mixtures thereof, as known to a person skilled in the art.

Any suitable UV-absorbing vinylic monomers can be used in a polymerizable composition for preparing a polymer of the invention. Examples of preferred UV-absorbing and UV/HEVL-absorbing, benzotriazole-containing vinylic monomers include without limitation: 2-(2-hydroxy-5-vinylphenyl)-2H-benzotriazole, 2-(2-hydroxy-5-acrylyloxyphenyl)-2H-benzotriazole, 2-(2-hydroxy-3-methacrylamido methyl-5-tert octylphenyl) benzotriazole, 2-(2'-hydroxy-5-methacrylamidophenyl)-5-chlorobenzotriazole, 2-(2'-hydroxy-5-methacrylamidophenyl)-5-methoxybenzotriazole, 2-(2'-hydroxy-5'-methacryloxypropyl-3'-t-butyl-phenyl)-5- chlorobenzotriazole, 2-(2'-hydroxy-5-methacryloxypropylphenyl) benzotriazole, 2-hydroxy-5-methoxy-3-(5-(trifluoromethyl)-2H-benzo[d][1,2,3]triazol-2-yl)benzyl methacrylate (WL-1), 2-hydroxy-5-methoxy-3-(5-methoxy-2H-benzo[d][1,2,3]triazol-2-yl)benzyl methacrylate (WL-5), 3-(5-fluoro-2H-benzo[d][1,2,3]triazol-2-yl)-2-hydroxy-5-methoxybenzyl methacrylate (WL-2), 3-(2H-benzo[d][1,2,3]triazol-2-yl)-2-hydroxy-5-methoxybenzyl methacrylate (WL-3), 3-(5-chloro-2H-benzo[d][1,2,3]triazol-2-yl)-2-hydroxy-5-methoxybenzyl methacrylate (WL-4), 2-hydroxy-5-methoxy-3-(5-methyl-2H-benzo[d][1,2,3]triazol-2-yl) benzyl methacrylate (WL-6), 2-hydroxy-5-methyl-3-(5-(trifluoromethyl)-2H-benzo[d][1,2,3]triazol-2-yl)benzyl methacrylate (WL-7), 4-allyl-2-(5-chloro-2H-benzo[d][1,2,3]triazol-2-yl)-6-methoxyphenol (WL-8), 2-{2'-Hydroxy-3'-tert-5'[3"-(4"-vinylbenzyloxy)propoxy]phenyl}-5-methoxy-2H-benzotriazole, phenol, 2-(5-chloro-2H-benzotriazol-2-yl)-6-(1,1-dimethylethyl)-4-ethenyl- (UVAM), 2-(2'-hydroxy-5'-methacryloxyethylphenyl) benzotriazole (2-Propenoic acid, 2-methyl-, 2-[3-(2H-benzotriazol-2-yl)-4-hydroxyphenyl]ethyl ester, Norbloc), 2-{2'-Hydroxy-3'-tert-butyl-5'-[3'-methacryloyloxypropoxy]phenyl}-5-methoxy-2H-benzotriazole (UV13), 2-[2'-Hydroxy-3'-tert-butyl-5'-(3'-acryloyloxypropoxy)phenyl]-5-trifluoromethyl-2H-benzotriazole (CF$_3$—UV13), 2-(2'-hydroxy-5-methacrylam idophenyl)-5-methoxybenzotriazole (UV6), 2-(3-allyl-2-hydroxy-5-methylphenyl)-2H-benzotriazole (UV9), 2-(2-Hydroxy-3-methallyl-5-methylphenyl)-2H-benzotriazole (UV12), 2-3'-t-butyl-2'-hydroxy-5'-(3"-dimethylvinylsilylpropoxy)-2'-hydroxy-phenyl)-5-methoxybenzotriazole (UV15), 2-(2'-hydroxy-5'-methacryloylpropyl-3'-tert-butyl-phenyl)-5-methoxy-2H-benzotriazole (UV16), 2-(2'-hydroxy-5'-acryloylpropyl-3'-tert-butyl-phenyl)-5-methoxy-2H-benzotriazole (UV16A), 2-Methylacrylic acid 3-[3-tert-butyl-5-(5-chlorobenzotriazol-2-yl)-4-hydroxyphenyl]-propyl ester (16-100, CAS#96478-15-8), 2-(3-(tert-butyl)-4-hydroxy-5-(5-methoxy-2H-benzo[d][1,2,3]triazol-2-yl)phenoxy)ethyl methacrylate (16-102); Phenol, 2-(5-chloro-2H-benzotriazol-2-yl)-6-methoxy-4-(2-propen-1-yl) (CAS#1260141-20-5); 2-[2-Hydroxy-5-[3-(methacryloyloxy)propyl]-3-tert-butylphenyl]-5-chloro-2H-benzotriazole; Phenol, 2-(5-ethenyl-2H-benzotriazol-2-yl)-4-methyl-, homopolymer (901) (CAS#83063-87-0). In accordance with the invention, the polymerizable composition comprises about 0.2% to about 5.0%, preferably about 0.3% to about 2.5%, more preferably about 0.5% to about 1.8%, by weight of a UV-absorbing agent.

Examples of suitable thermal initiators include, but are not limited to, 2,2'-azobis (2,4-dimethylpentanenitrile), 2,2'-azobis (2-methylpropanenitrile), 2,2'-azobis (2-methylbutanenitrile), peroxides such as benzoyl peroxide, and the like. Preferably, the thermal initiator is 2,2'-azobis(isobutyronitrile) (AIBN).

Suitable photoinitiators are benzoin methyl ether, diethoxyacetophenone, a benzoylphosphine oxide, 1-hydroxycyclohexyl phenyl ketone and Darocur and Irgacur types, preferably Darocur 11730 and Darocur 2959®, Germane-based Norrish Type I photoinitiators. Examples of benzoylphosphine initiators include 2,4,6-trimethylbenzoyl-diphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers.

Where a vinylic monomer capable of absorbing ultraviolet radiation and high energy violet light (HEVL) is used in the invention, a Germane-based Norrish Type I photoinitiator and a light source including a light in the region of about 400 to about 550 nm are preferably used to initiate a free-radical polymerization. Any Germane-based Norrish Type I photoinitiators can be used in this invention, so long as they are capable of initiating a free-radical polymerization under irradiation with a light source including a light in the region of about 400 to about 550 nm. Examples of Germane-based Norrish Type I photoinitiators are acylgermanium compounds described in U.S. Pat. No. 7,605,190 (herein incorporated by reference in its entirety). Preferably, the monomer of lens-forming materials comprises at least one of the following acylgermanium compounds.

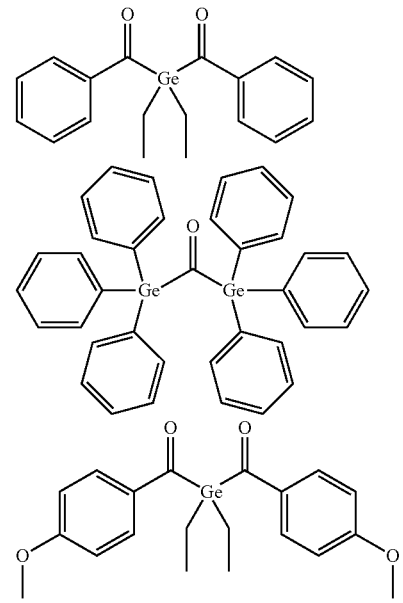

The bioactive agent is any compound that can prevent a malady in the eye or reduce the symptoms of an eye malady. The bioactive agent can be a drug, an amino acid (e.g., taurine, glycine, etc.), a polypeptide, a protein, a nucleic acid, or any combination thereof. Examples of drugs useful herein include, but are not limited to, rebamipide, ketotifen, olaptidine, cromoglycolate, cyclosporine, nedocromil, levocabastine, lodoxamide, ketotifen, or the pharmaceutically acceptable salt or ester thereof. Other examples of bioactive agents include 2-pyrrolidone-5-carboxylic acid (PCA), alpha hydroxyl acids (e.g., glycolic, lactic, malic, tartaric, mandelic and citric acids and salts thereof, etc.), linoleic and gamma linoleic acids, and vitamins (e.g., B5, A, B6, etc.).

Examples of leachable lubricants include without limitation mucin-like materials (e.g., polyglycolic acid) and non-crossllinkable hydrophilic polymers (i.e., without ethylenically unsaturated groups). Any hydrophilic polymers or copolymers without any ethylenically unsaturated groups can be used as leachable lubricants. Preferred examples of non-crosslinkable hydrophilic polymers include, but are not limited to, polyvinyl alcohols (PVAs), polyamides, polyimides, polylactone, a homopolymer of a vinyl lactam, a copolymer of at least one vinyl lactam in the presence or in the absence of one or more hydrophilic vinylic comonomers, a homopolymer of acrylamide or methacrylamide, a copolymer of acrylamide or methacrylamide with one or more hydrophilic vinylic monomers, polyethylene oxide (i.e., polyethylene glycol (PEG)), a polyoxyethylene derivative, poly-N—N-dimethylacrylamide, polyacrylic acid, poly 2 ethyl oxazoline, heparin polysaccharides, polysaccharides, and mixtures thereof. The number average molecular weight $M_w$ of the non-crosslinkable hydrophilic polymer is preferably from 5,000 to 1,000,000.

Examples of leachable tear-stabilizing agents include, without limitation, phospholipids, monoglycerides, diglycerides, triglycerides, glycolipids, glyceroglycolipids, sphingolipids, sphingo-glycolipids, fatty alcohols, fatty acids, mineral oils, and mixtures thereof. Preferably, a tear stabilizing agent is a phospholipid, a monoglyceride, a diglyceride, a triglyceride, a glycolipid, a glyceroglycolipid, a sphingolipid, a sphingo-glycolipid, a fatty acid having 8 to 36 carbon atoms, a fatty alcohol having 8 to 36 carbon atoms, or a mixture thereof.

In accordance with the invention, a polymerizable composition is preferably a solution of all desirable components dissolved in a suitable solvent (i.e., one chemical that cannot participate in free-radical polymerization reaction) or a mixture of suitable solvents, more preferably is a solution of all desirable components in propylene glycol or a polyethylene glycol having a molecular weight of about 400 Daltons or less, even more preferably is a solution free of any organic solvent.

A polymerizable composition can be prepared by dissolving all of the desirable components in any suitable solvent, such as, a mixture of water and one or more organic solvents miscible with water, an organic solvent, or a mixture of one or more organic solvents, as known to a person skilled in the art.

Example of preferred organic solvents includes without limitation, tetrahydrofuran, tripropylene glycol methyl ether, dipropylene glycol methyl ether, ethylene glycol n-butyl ether, ketones (e.g., acetone, methyl ethyl ketone, etc.), diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimetyl ether, polyethylene glycols, polypropylene glycols, ethyl acetate, butyl acetate, amyl acetate, methyl lactate, ethyl lactate, i-propyl lactate, methylene chloride, 2-butanol, 1-propanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methyl-1-cyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves. The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Other materials that allow UV light transmission could be used, such as quartz glass and sapphire.

In a preferred embodiment, reusable molds are used and the silicone-hydrogel lens-forming composition is cured actinically under a spatial limitation of actinic radiation to form a SiHy contact lens. Examples of preferred reusable molds are those disclosed in U.S. Pat. Nos. 6,800,225, 7,384,590, and 7,387,759. Reusable molds can be made of quartz, glass, sapphire, $CaF_2$, a cyclic olefin copolymer (such as for example, Topas® COC grade 8007-S10 (clear amorphous copolymer of ethylene and norbornene) from Ticona GmbH of Frankfurt, Germany and Summit, N.J., Zeonex® and Zeonor® from Zeon Chemicals LP, Louisville, Ky.), polymethylmethacrylate (PMMA), polyoxymethylene from DuPont (Delrin), Ultem® (polyetherimide) from G.E. Plastics, PrimoSpire®, etc.

In accordance with the invention, the polymerizable composition can be introduced (dispensed) into a cavity formed by a mold according to any known methods.

After the polymerizable composition is dispensed into the mold, it is polymerized to produce a contact lens. Cross-linking may be initiated thermally or actinically to crosslink the polymerizable components in the polymerizable composition.

Opening of the mold so that the molded article can be removed from the mold may take place in a manner known per se.

In accordance with the invention, the molded contact lens is not subject to any lens extraction with an organic solvent other than propylene glycol or a polyethylene glycol with a molecular weight of about 400 Dalton or less to remove unpolymerized polymerizable components. Instead, an aqueous solution of a polyanionic polymer is used to extract the molded silicone hydrogel contact lenses while forming a base coating on the molded silicone hydrogel contact lenses. In another preferred embodiment, a molded silicone hydrogel contact lens is extracted with a buffered saline (preferably a phosphate buffered saline for a time period of at least about 40 minutes).

In accordance with the invention, a polyanionic polymer is polyacrylic acid, polymethacrylic acid, poly(2-ethylacrylic acid) (i.e., polyethacrylic acid, poly(acrylic acid-co-methacrylic acid), poly(acrylic acid-co-ethacrylic acid), poly(methacrylic acid-co-ethacrylic acid), or a mixture thereof. Preferably, polyanionic polymer is a polyacrylic acid having a number average molecular weight of at least about 100000 Daltons (preferably from about 200000 Daltons to about 3000000 Daltons, more preferably from about 300000 Daltons to about 2500000 Daltons).

An aqueous solution of a polyanionic polymer for forming a base coating on silicone hydrogel contact lenses can be prepared by dissolving the polyanionic polymer in water (purified water, such as distilled water or deionized water). The pH of the aqueous solution is from about 0 to about 3.5, preferably from about 1.0 to about 2.5 and adjusted by adding an acid, such as, hydrochloric acid, formic acid, acetic acid, malic acid, citric acid, nitric acid, phosphoric acid, sulfuric acid, etc. (preferably hydrochloric acid or formic acid or phosphoric acid). The concentration of the polyanionic polymer is preferably from about 0.005% by weight to about 10%, more preferably from about 0.1% by weight to about 5% by weight, even more preferably from about 0.02% by weight to about 2% by weight.

In a preferred embodiment, an aqueous solution of a polyanionic polymer for forming a base coating on silicone hydrogel contact lenses has a temperature of above the room temperature, preferably from about 35° C. to about 90° C., more preferably from about 40° C. to about 80° C. A person skilled in the art knows well how to control and maintain the temperature of an aqueous solution of a polyanionic polymer in which the formed silicone hydrogel contact lens is immersed in the step of forming a base coating on the formed silicone hydrogel contact lens. For example, a thermostat can be used for maintaining a temperature of an aqueous solution of a polyanionic polymer.

Contacting of a SiHy contact lens with a coating solution of a polyanionic polymer can involves solely dipping the SiHy contact lens in a bath of a coating solution for a period of time or alternatively dipping the SiHy contact lens sequentially in a series of bath of coating solutions for a fixed shorter time period for each bath, cumulatively having a total coating time of from 60 minutes to about 240 minutes. Preferably, each bath of a coating solution is maintained at a temperature of preferably from about 35° C. to about 90° C., more preferably from about 40° C. to about 80° C.

In accordance with the invention, after the polyanionic polymer coating step, the silicone hydrogel contact lens with a base coating thereon is rinsed with a buffered saline (preferably a phosphate buffered saline) having a pH a pH from about 6.5 to about 9.5 (preferably from about 6.8 to about 8.0, more preferably from about 7.0 to about 7.5). By rinsing the coated silicone hydrogel contact lens with such a buffered saline (instead of water), the stability (or durability) of a base coating on a SiHy contact lens can be enhanced. It is believed that the polyanionic polymer in the base coating on a silicone hydrogel contact lens would have different structural conformations before and after being rinsed with such a buffered saline. Before rinsing, the structural conformation of the polyanionic polymer in the base coating would be a contracted or compact conformation. After rinsing, the structural conformation of the polyanionic polymer in the base coating would be an extended or stretched conformation so that the polyanionic polymer may penetrate partially into the polymer matrix of the silicone hydrogel contact lens to increase the stability of the base coating. It is understood that a stable base coating also may require the incorporation of an adequate amount (e.g., from about 30% to about 60%, preferably from about 35% to about 56%, more preferably from about 40% to about 52% by weight) of N-vinylpyrrolidone into a polymerizable composition for forming silicone hydrogel contact lenses, because the polymer matrix of resultant silicone hydrogel contact lenses may contain polyvinylpyrrolidone (PVP) segments which can form strong interpolymer complexes with a polyanionic polymer in aqueous solution. Preferably, the step of rinsing is carried out at room temperature, i.e., the buffered saline for rinsing the silicone hydrogel contact lens having the base coating thereon has a room temperature, from about 22° C. to about 28° C., preferably from about 24° C. to about 26° C., more preferably about 25° C.

In accordance with the invention, a water-soluble and thermally-crosslinkable hydrophilic polymeric material preferably comprises azetidinium groups. Examples of preferred water-soluble and thermally-crosslinkable hydrophilic polymeric material include without limitation poly(2-oxazoline-co-ethyleneimine)-epichlorohydrin copolymers which are disclosed in U.S. Pat. Appl. Pub. No. 2016-0061995 (herein incorporated by reference in its entirety), chemically-modified poly(2-oxazoline-co-ethyleneimine)-epichlorohydrin copolymers which are disclosed in U.S. Pat. Appl. Pub. No. 2016-0061995, chemically-modified polyamidoamine-epichlorohydrins as disclosed in U.S. Pat. No. 8,529,057 (herein incorporated by reference in its entirety), copolymers of an azetidinium-containing vinylic monomer with one or more hydrophilic vinylic monomers (which are disclosed in US2013/0337160, herein incorporated by reference in its entirety), chemically-modified copolymers of an azetidinium-containing vinylic monomer with one or more hydrophilic vinylic monomers (which are disclosed in US2013/0337160, herein incorporated by reference in its entirety), or combinations thereof.

In accordance with the invention, the term "chemically-modified" in reference with a water-soluble and thermally crosslinkable hydrophilic polymeric material having azetidinium groups means that a poly(2-oxazoline-co-ethyleneimine)-epichlorohydrin copolymer, a polyamidoamine-epichlorohydrin or a copolymer of an azetidinium-containing vinylic monomer is reacted partially (i.e., not consuming all of the azetidinium groups) with a hydrophilicity-enhancing agent having at least one reactive functional group selected from the group consisting of amino group, carboxyl group, thiol group, and combination thereof. A chemically-modified poly(2-oxazoline-co-ethyleneimine)-epichlorohydrin copolymer or polyamidoamine-epichlorohydrin or copolymer of an azetidinium-containing vinylic monomer can be especially useful for forming relatively-thick and soft non-silicone hydrogel coatings on silicone hydrogel contact lenses.

Any suitable hydrophilicity-enhancing agents can be used in the invention so long as they contain at least one amino group, at least one carboxyl group, and/or at least one thiol group.

A preferred class of hydrophilicity-enhancing agents include without limitation: primary amino-, secondary amino-, carboxyl- or thiol-containing monosaccharides (e.g., 3-amino-1,2-propanediol, 1-thiolglycerol, 5-keto-D-gluconic acid, galactosamine, glucosamine, galacturonic acid, gluconic acid, glucosaminic acid, mannosamine, saccharic acid 1,4-lactone, saccharide acid, Ketodeoxynonulosonic acid, N-methyl-D-glucamine, 1-amino-1-deoxy-8-D-galactose, 1-amino-1-deoxysorbitol, 1-methylamino-1-deoxysorbitol, N-aminoethyl gluconamide); primary amino-, secondary amino-, carboxyl- or thiol-containing disaccharides (e.g., chondroitin disaccharide sodium salt, di(8-D-xylopyranosyl)amine, digalacturonic acid, heparin disaccharide, hyaluronic acid disaccharide, Lactobionic acid); and primary amino-, secondary amino-, carboxyl- or thiol-containing oligosaccharides (e.g., carboxymethyl-β-cyclodextrin sodium salt, trigalacturonic acid); and combinations thereof.

Another preferred class of hydrophilicity-enhancing agents is hydrophilic polymers having one or more (primary or secondary) amino, carboxyl and/or thiol groups. More preferably, the content of the amino (—NHR' with R' as defined above), carboxyl (—COOH) and/or thiol (—SH) groups in a hydrophilic polymer as a hydrophilicity-enhancing agent is less than about 40%, preferably less than about 30%, more preferably less than about 20%, even more preferably less than about 10%, by weight based on the total weight of the hydrophilic polymer.

One preferred class of hydrophilic polymers as hydrophilicity-enhancing agents are (primary or secondary) amino- or carboxyl-containing polysaccharides, for example, such as, carboxymethylcellulose (having a carboxyl content of about 40% or less, which is estimated based on the composition of repeating units, —[$C_6H_{10-m}O_5(CH_2CO_2H)_m$]— in which m is 1 to 3), carboxyethylcellulose (having a carboxyl content of about 36% or less, which is estimated based on the composition of repeating units, —[$C_6H_{10-m}O_5(C_2H_4CO_2H)_m$]— in which m is 1 to 3) carboxypropylcellulose (having a carboxyl content of about 32% or less, which is estimated based on the composition of repeating units, —[$C_6H_{10-m}O_5(C_3H_6CO_2H)_m$]—, in which m is 1 to 3), hyaluronic acid (having a carboxyl content of about 11%, which is estimated based on the composition of repeating units, —($C_{13}H_{20}O_9NCO_2H$)—), chondroitin sulfate (having a carboxyl content of about 9.8%, which is estimated based on the composition of repeating units, —($C_{12}H_{18}O_{13}NS$ $CO_2H$)—), or combinations thereof.

Another preferred class of hydrophilic polymers as hydrophilicity-enhancing agents include without limitation: poly (ethylene glycol) (PEG) with mono-amino (primary or secondary amino), carboxyl or thiol group (e.g., PEG-N $H_2$, PEG-SH, PEG-COOH); $H_2$N-PEG-N$H_2$; HOOC-PEG-COOH; HS-PEG-SH; $H_2$N-PEG-COOH; HOOC-PEG-SH; $H_2$N-PEG-SH; multi-arm PEG with one or more amino (primary or secondary), carboxyl or thiol groups; PEG dendrimers with one or more amino (primary or secondary), carboxyl or thiol groups; a diamino-(primary or secondary) or dicarboxyl-terminated homo- or co-polymer of a non-reactive hydrophilic vinylic monomer; a monoamino- (primary or secondary) or monocarboxyl-terminated homo- or co-polymer of a non-reactive hydrophilic vinylic monomer; a copolymer which is a polymerization product of a composition comprising (1) about 60% by weight or less, preferably from about 0.1% to about 30%, more preferably from about 0.5% to about 20%, even more preferably from about 1% to about 15%, by weight of one or more reactive vinylic monomers and (2) at least one non-reactive hydrophilic vinylic monomer; and combinations thereof. Reactive vinylic monomer(s) and non-reactive hydrophilic vinylic monomer(s) are those described previously.

More preferably, a hydrophilic polymer as a hydrophilicity-enhancing agent is PEG-N$H_2$; PEG-SH; PEG-COOH; $H_2$N-PEG-N$H_2$; HOOC-PEG-COOH; HS-PEG-SH; $H_2$N-PEG-COOH; HOOC-PEG-SH; $H_2$N-PEG-SH; multi-arm PEG with one or more amino, carboxyl or thiol groups; PEG dendrimers with one or more amino, carboxyl or thiol groups; a monoamino-, monocarboxyl-, diamino- or dicarboxyl-terminated homo- or copolymer of a non-reactive hydrophilic vinylic monomer selected from the group consisting of acryamide (AAm), N,N-dimethylacrylamide (DMA), N-vinylpyrrolidone (NVP), N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a number average molecular weight of up to 400 Daltons, vinyl alcohol, N-methyl-3-methylene-2-pyrrolidone, 1-methyl-5-methylene-2-pyrrolidone, 5-methyl-3-methylene-2-pyrrolidone, N,N-dimethylaminoethyl (meth)acrylate, N,N-dimethylaminopropyl (metha)crylamide, (meth)acryloyloxyethyl phosphorylcholine, and combinations thereof; a copolymer which is a polymerization product of a composition comprising (1) from about 0.1% to about 30%, preferably from about 0.5% to about 20%, more preferably from about 1% to about 15%, by weight of acrylic acid, $C_1$-$C_3$ alkylacrylic acid, allylamine and/or amino-$C_2$-$C_4$ alkyl (meth)acrylate, and (2) at least one non-reactive hydrophilic vinylic monomer selected from the group consisting of acryamide, N,N-dimethylacrylamide, N-vinylpyrrolidone, (meth)acryloyloxyethyl phosphorylcholine, N-vinyl-N-methyl acetamide, glycerol (meth)acrylate, hydroxyethyl (meth)acrylate, N-hydroxyethyl (meth)acrylamide, $C_1$-$C_4$-alkoxy polyethylene glycol (meth)acrylate having a number average molecular weight of up to 400 Daltons, vinyl alcohol, and combination thereof.

Most preferably, the hydrophilicity-enhancing agent as a hydrophilicity-enhancing agent is PEG-N $H_2$; PEG-SH; PEG-COOH; monoamino-, monocarboxyl-, diamino- or dicarboxyl-terminated polyvinylpyrrolidone; monoamino-, monocarboxyl-, diamino- or dicarboxyl-terminated polyacrylamide; monoamino-, monocarboxyl-, diamino- or dicarboxyl-terminated poly(DMA); monoamino- or monocarboxyl-, diamino- or dicarboxyl-terminated poly(DMA-co-NVP); monoamino-, monocarboxyl-, diamino- or dicarboxyl-terminated poly(NVP-co-N,N-dimethylaminoethyl (meth)acrylate)); monoamino-, monocarboxyl-, diamino- or dicarboxyl-terminated poly(vinylalcohol); monoamino-, monocarboxyl-, diamino- or dicarboxyl-terminated poly [(meth)acryloyloxyethyl phosphrylcholine] homopolymer or copolymer; monoamino-, monocarboxyl-, diamino- or dicarboxyl-terminated poly(NVP-co-vinyl alcohol); monoamino-, monocarboxyl-, diamino- or dicarboxyl-terminated poly(DMA-co-vinyl alcohol); poly[(meth)acrylic acid-co-acrylamide] with from about 0.1% to about 30%, preferably from about 0.5% to about 20%, more preferably from about 1% to about 15%, by weight of (meth)acrylic acid; poly [(meth)acrylic acid-co-NVP) with from about 0.1% to about 30%, preferably from about 0.5% to about 20%, more preferably from about 1% to about 15%, by weight of (meth)acrylic acid; a copolymer which is a polymerization product of a composition comprising (1) (meth)acryloyloxyethyl phosphorylcholine and (2) from about 0.1% to about 30%, preferably from about 0.5% to about 20%, more preferably from about 1% to about 15%, by weight of acrylic acid, $C_1$-$C_3$ alkylacrylic acid, allylamine and/or amino-$C_2$-$C_4$alkyl (meth)acrylate; and combination thereof.

PEGs with functional groups and multi-arm PEGs with functional groups can be obtained from various commercial suppliers, e.g., Polyscience, and Shearwater Polymers, inc., etc.

Monoamino-, monocarboxyl-, diamino- or dicarboxyl-terminated homo- or copolymers of one or more non-reactive hydrophilic vinylic monomers or of a phosphorylcholine-containing vinylic monomer can be prepared according to procedures described in U.S. Pat. No. 6,218,508, herein incorporated by reference in its entirety. For example, to prepare a diamino- or dicarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomer are copolymerized (thermally or actinically) with a reactive vinylic monomer (having an amino or carboxyl group), in the presence of an free-radical initiator. Generally, the molar ratio of chain transfer agent to that of all of vinylic monomers other than the reactive vinylic monomer is from about 1:5 to about 1:100, whereas the molar ratio of chain transfer agent to the reactive vinylic monomer is 1:1. In such preparation, the chain transfer agent with amino or carboxyl group is used to control the molecular weight of the resultant hydrophilic polymer and forms a terminal end of the resultant hydrophilic polymer so as to provide the resultant hydrophilic polymer with one terminal amino or carboxyl group, while the reactive vinylic monomer provides the other terminal carboxyl or amino group to the resultant hydrophilic polymer. Similarly, to prepare a monoamino- or monocarboxyl-terminated homo- or co-polymer of a non-reactive hydrophilic vinylic monomer, the non-reactive vinylic monomer, a chain transfer agent with an amino or carboxyl group (e.g., 2-aminoethanethiol, 2-mercaptopropinic acid, thioglycolic acid, thiolactic acid, or other hydroxymercaptanes, aminomercaptans, or carboxyl-containing mercaptanes) and optionally other vinylic monomers are copolymerized (thermally or actinically) in the absence of any reactive vinylic monomer.

As used herein, a copolymer of a non-reactive hydrophilic vinylic monomer refers to a polymerization product of a non-reactive hydrophilic vinylic monomer with one or more additional vinylic monomers. Copolymers comprising a non-reactive hydrophilic vinylic monomer and a reactive vinylic monomer (e.g., a carboxyl-containing vinylic monomer, a primary amino group-containing vinylic monomer or a secondary amino group-containing vinylic monomer) can be prepared according to any well-known radical polymerization methods or obtained from commercial suppliers. Copolymers containing methacryloyloxyethyl phosphorylcholine and carboxyl-containing vinylic monomer (or amino-containing vinylic monomer) can be obtained from NOP Corporation (e.g., LIPIDURE®-AC01, and AE).

The number average molecular weight $M_w$ of the hydrophilic polymer having at least one amino, carboxyl or thiol group (as a hydrophilicity-enhancing agent) is preferably from about 500 to about 2,000,000, more preferably from about 1,000 to about 500,000, even more preferably from about 5,000 to about 250,000 Daltons.

In accordance with the invention, the reaction between a hydrophilicity-enhancing agent and a poly(2-oxazoline-co-ethyleneimine)-epichlorohydrin copolymer (or a polyamidoamine-epichlorohydrin or a copolymer of azetidinium-containing vinylic monomer) is carried out at a temperature of from about 40° C. to about 100° C. for a period of time sufficient (from about 0.3 hour to about 24 hours, preferably from about 1 hour to about 12 hours, even more preferably from about 2 hours to about 8 hours) to form a water-soluble and thermally-crosslinkable hydrophilic polymeric material containing azetidinium groups.

In accordance with the invention, the concentration of a hydrophilicity-enhancing agent relative to a poly(2-oxazoline-co-ethyleneimine)-epichlorohydrin copolymer (or a polyamidoamine-epichlorohydrin or a copolymer of azetidinium-containing vinylic monomer) must be selected not to render a resultant hydrophilic polymeric material water-insoluble (i.e., a solubility of less than 0.005 g per 100 ml of water at room temperature) and not to consume more than about 99%, preferably about 98%, more preferably about 97%, even more preferably about 96% of the azetidinium groups of the poly(2-oxazoline-co-ethyleneimine)-epichlorohydrin copolymer (or a polyamidoamine-epichlorohydrin or a copolymer of azetidinium-containing vinylic monomer).

In a preferred embodiment, a water-soluble and thermally-crosslinkable hydrophilic polymeric material having azetidinium groups comprises: azetidinium groups; from about 20% to about 95%, preferably from about 35% to about 90%, more preferably from about 50% to about 85%, by weight of first polymer chains derived from a poly(2-oxazoline-co-ethyleneimine)-epichlorohydrin copolymer or a polyamidoamine-epichlorohydrin or a copolymer of azetidinium-containing vinylic monomer; and from about 5% to about 80%, preferably from about 10% to about 65%, even more preferably from about 15% to about 50%, by weight of hydrophilic moieties or second polymer chains derived from at least one hydrophilicity-enhancing agent having at least one reactive functional group selected from the group consisting of primary amino group, secondary amino group, carboxyl group, thiol group, and combination thereof. The composition of the hydrophilic polymeric material is determined by the composition (based on the total weight of the reactants) of a reactants mixture used for preparing the thermally-crosslinkable hydrophilic polymeric material according to the crosslinking reactions shown in Scheme I above. For example, if a reactant mixture comprises about 75% by weight of a poly(2-oxazoline-co-ethyleneimine)-epichlorohydrin copolymer (or a polyamidoamine-epichlorohydrin or a copolymer of azetidinium-containing vinylic monomer) and about 25% by weight of at least one hydrophilicity-enhancing agent based on the total weight of the reactants, then the resultant hydrophilic polymeric material comprise about 75% by weight of first polymer chains derived from the poly(2-oxazoline-co-ethyleneimine)-epichlorohydrin copolymer (or a polyamidoamine-epichlorohydrin or a copolymer of azetidinium-containing vinylic monomer) and about 25% by weight of hydrophilic moieties or second polymer chains derived from said at least one hydrophilicity-enhancing agent. The azetidinium groups of the thermally-crosslinkable hydrophilic polymeric material are those azetidinium groups which do not participate in crosslinking reactions for preparing the thermally-crosslinkable hydrophilic polymeric material.

In accordance with the invention, the step of heating is performed preferably by autoclaving the silicone hydrogel contact lens with a base coating thereon immersed in a packaging solution (i.e., a buffered aqueous solution) in a sealed lens package at a temperature of from about 115° C. to about 125° C. for approximately 20-90 minutes. In accordance with this embodiment of the invention, the packaging solution is a buffered aqueous solution which is ophthalmically safe after autoclave.

Lens packages (or containers) are well known to a person skilled in the art for autoclaving and storing a soft contact lens. Any lens packages can be used in the invention. Preferably, a lens package is a blister package which comprises a base and a cover, wherein the cover is detachably sealed to the base, wherein the base includes a cavity for receiving a sterile packaging solution and the contact lens.

Lenses are packaged in individual packages, sealed, and sterilized (e.g., by autoclave at about 120° C. or higher for at least 30 minutes under pressure) prior to dispensing to users. A person skilled in the art will understand well how to seal and sterilize lens packages.

In accordance with the invention, a packaging solution contains at least one buffering agent and one or more other ingredients known to a person skilled in the art. Examples of other ingredients include without limitation, tonicity agents, surfactants, antibacterial agents, preservatives, and lubricants (e.g., cellulose derivatives, polyvinyl alcohol, polyvinyl pyrrolidone).

The packaging solution contains a buffering agent in an amount sufficient to maintain a pH of the packaging solution in the desired range, for example, preferably in a physiologically acceptable range of about 6.5 to about 7.5. Any known, physiologically compatible buffering agents can be used. Suitable buffering agents as a constituent of the contact lens care composition according to the invention are known to the person skilled in the art. Examples are boric acid, borates, e.g. sodium borate, citric acid, citrates, e.g. potassium citrate, bicarbonates, e.g. sodium bicarbonate, TRIS (2-amino-2-hydroxymethyl-1,3-propanediol), Bis-Tris (Bis-(2-hydroxyethyl)-imino-tris-(hydroxymethyl)-methane), bis-aminopolyols, triethanolamine, ACES (N-(2-hydroxyethyl)-2-aminoethanesulfonic acid), BES (N,N-Bis(2-hydroxyethyl)-2-aminoethanesulfonic acid), HEPES (4-(2-hydroxyethyl)-1-piperazineethanesulfonic acid), MES (2-(N-morpholino)ethanesulfonic acid), MOPS (3-[N-morpholino]-propanesulfonic acid), PIPES (piperazine-N,N'-bis(2-ethanesulfonic acid), TES (N-[Tris(hydroxymethyl)methyl]-2-aminoethanesulfonic acid), salts thereof, phosphate buffers, e.g. $Na_2HPO_4$, $NaH_2PO_4$, and $KH_2PO_4$ or mixtures thereof. A preferred bis-aminopolyol is 1,3-bis(tris[hydroxymethyl]-methylamino)propane (bis-TRIS-propane). The amount of each buffer agent in a packaging solution is preferably from 0.001% to 2%, preferably from 0.01% to 1%; most preferably from about 0.05% to about 0.30% by weight.

The packaging solution has a tonicity of from about 200 to about 450 milliosmol (mOsm), preferably from about 250 to about 350 mOsm. The tonicity of a packaging solution can be adjusted by adding organic or inorganic substances which affect the tonicity. Suitable occularly acceptable tonicity agents include, but are not limited to sodium chloride, potassium chloride, glycerol, propylene glycol, polyols, mannitols, sorbitol, xylitol and mixtures thereof.

A packaging solution of the invention has a viscosity of from about 1 centipoise to about 8 centipoises, more preferably from about 1.5 centipoises to about 5 centipoises, at 25° C.

In a preferred embodiment, the packaging solution comprises preferably from about 0.01% to about 2%, more preferably from about 0.05% to about 1.5%, even more preferably from about 0.1% to about 1%, most preferably from about 0.2% to about 0.5%, by weight of a water-soluble thermally-crosslinkable hydrophilic polymeric material having azetidinium groups.

A silicone hydrogel contact lens obtained according to a method of the invention has a surface wettability characterized by having an averaged water contact angle of about 80 degrees or less, more preferably about 70 degrees or less, even more preferably about 60 degrees or less.

A silicone hydrogel contact lens obtained according to a method of the invention has one property selected from the group consisting of: an oxygen permeability of at least about 40 barrers, preferably at least about 50 barrers, more preferably at least about 60 barrers, even more preferably at least about 70 barrers; an elastic modulus of about 1.5 MPa or less, preferably about 1.2 MPa or less, more preferably about 1.0 or less, even more preferably from about 0.2 MPa to about 1.0 MPa; a water content of from about 15% to about 70%, preferably from about 20% to about 65%, more preferably from about 25% to about 60%, even more preferably from about 30% to about 55% by weight when fully hydrated; and combinations thereof.

The water content of a silicone hydrogel contact lens can be measured according to Bulk Technique as disclosed in U.S. Pat. No. 5,849,811.

Although various embodiments of the invention have been described using specific terms, devices, and methods, such description is for illustrative purposes only. The words used are words of description rather than of limitation. It is to be understood that changes and variations may be made by those skilled in the art without departing from the spirit or scope of the present invention, which is set forth in the following claims. In addition, it should be understood that aspects of the various embodiments may be interchanged either in whole or in part or can be combined in any manner and/or used together, as illustrated below:

1. A method for producing coated silicone hydrogel contact lenses each having a crosslinked hydrophilic coating thereon, the method of invention comprising the steps of:
   (1) introducing a polymerizable composition into a lens mold, wherein the polymerizable composition comprises
      (a) at least silicone-containing polymerizable component which is at least one siloxane-containing vinylic monomer, at least one silicone-containing vinylic macromer, or a combination thereof,
      (b) at least one vinylic crosslinking agent,
      (c) a blending vinylic monomer,
      (d) from about 30% to about 60% by weight of at least one N-vinyl amide monomer relative to the total amount of polymerizable components, and
      (e) at least one free-radical initiator;
   (2) curing thermally or actinically the polymerizable composition in the lens mold to form a silicone hydrogel contact lens;
   (3) forming a base coating on the formed silicone hydrogel contact lens by immersing the formed silicone hydrogel contact lens in an aqueous solution of a polyanionic polymer having carboxyl groups and a number average molecular weight of at least about 100000 Daltons for a time period of from about 60 minutes to about 240 minutes, wherein the aqueous solution has a pH of from about 0 to about 3.5;

(4) rinsing the silicone hydrogel contact lens having the base coating thereon with a buffered saline having a pH from about 6.5 to about 9.5; and (5) heating the rinsed silicone hydrogel contact lens having the base coating thereon in a packaging solution including a water-soluble, thermally-crosslinkable hydrophilic polymeric material at a temperature from about 60° C. to about 140° C. to form the crosslinked hydrophilic coating, wherein the packaging solution has a pH from about 6.8 to about 7.6 and a tonicity of from about 200 to about 450 milliosmol (mOsm), wherein the crosslinked hydrophilic coating exhibits a water-break-up-time (WBUT) of at least about 5 seconds, a friction rating of about 3 or lower, and a coating durability characterized by surviving a digital rubbing test, provided that after step (2) the silicone hydrogel contact lens is not in contact with any organic solvent other than propylene glycol and polyethylene glycol having a molecular weight of 400 Daltons or less.

2. The method according to invention 1, wherein the polymerizable composition comprises from about 35% to about 56% by weight (more preferably from about 40% to about 52% by weight) of said at least one N-vinyl amide monomer relative to the total amount of polymerizable components.

3. The method according to invention 1 or 2, wherein said at least one N-vinyl amide monomer is N-vinylpyrrolidone, N-vinyl-N-methyl acetamide, N-vinyl acetamide, N-vinyl formamide, N-vinyl isopropylamide, or a mixture thereof.

4. The method according to invention 1 or 2, wherein said at least one N-vinyl amide monomer is N-vinylpyrrolidone, N-vinyl-N-methyl acetamide, or a combination thereof.

5. The method according to any one of inventions 1 to 4, wherein the polyanionic polymer has a number average molecular weight of from about 200000 Daltons to about 3000000 Daltons (preferably from about 300000 Daltons to about 2500000 Daltons).

6. The method according to any one of inventions 1 to 5, wherein the aqueous solution has a pH of from 0 to about 2.5 (preferably from about 1 to about 2.5).

7. The method according to any one of inventions 1 to 6, wherein the aqueous solution has a temperature of from about 35° C. to about 90° C. (preferably from about 40° C. to about 80° C.).

8. The method according to any one of inventions 1 to 7, wherein the silicone hydrogel contact lens having the base coating thereon is rinsed with a buffered saline having a pH from about 6.8 to about 8 (preferably from about 7.0 to about 7.5).

9. The method according to any one of inventions 1 to 8, wherein the silicone hydrogel contact lens having the base coating thereon is rinsed with a buffered saline having a temperature of from about 22° C. to about 28° C. (preferably from about 24° C. to about 26° C., more preferably about 25° C.).

10. The method according to any one of invention 1 to 9, wherein the crosslinked hydrophilic coating exhibits a water-break-up-time (WBUT) of at least about 10 second (preferably at least about 15 second, more preferably at least about 20 seconds).

11. The method according to any one of invention 1 to 10, wherein the crosslinked hydrophilic coating exhibits a friction rating of about 2.5 or lower (preferably about 2 or lower, more preferably about 1.5 or lower, even more preferably about 1 or lower).

12. The method according to any one of inventions 1 to 11, wherein the polymerizable composition comprises from about 35% to about 56% (preferably from about 40% to about 52%) by weight of N-vinylpyrrolidone relative to the total amount of polymerizable components.

13. The method according to any one of inventions 1 to 12, wherein the polymerizable composition is a solution of all desirable components dissolved in propylene glycol or a polyethylene glycol having a molecular weight of about 400 Daltons or less (preferably is a solution free of any organic solvent).

14. The method according to any one of inventions 1 to 13, wherein the blending vinylic monomer is a $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof (preferably is methyl methacrylate or styrene, more preferably is methyl methacrylate).

15. The method according to any one of inventions 1 to 14, wherein the step of curing is carried out thermally for a time period of at least about 60 minutes (preferably from about 120 minutes to about 600 minutes), wherein the polymerizable composition comprises at least one thermal free-radical initiator.

16. The method according to any one of inventions 1 to 15, wherein the step of curing is carried out by UV/visible irradiation, wherein the polymerizable composition comprises at least one free-radical photoinitiator.

17. The method according to any one of inventions 1 to 16, wherein the polyanionic polymer is polyacrylic acid, polymethacrylic acid, poly(2-ethylacrylic acid), poly(acrylic acid-co-methacrylic acid), poly(acrylic acid-co-ethacrylic acid), poly(methacrylic acid-co-ethacrylic acid), or a mixture thereof.

18. The method according to any one of inventions 1 to 17, wherein the polyanionic polymer is a polyacrylic acid having a number average molecular weight of at least about 100000 Daltons (preferably from about 200000 Daltons to about 3000000 Daltons, more preferably from about 300000 Daltons to about 2500000 Daltons).

19. The method according to any one of inventions 1 to 17, wherein the aqueous solution of the polyanionic polymer has a pH of about 0 to about 2.5 and a temperature of from about 40° C. to about 80° C., wherein the concentration of the polyanionic polymer is from about 0.01% by weight to about 10% (preferably from about 0.2% by weight to about 5% by weight, more preferably from about 0.5% by weight to about 2% by weight).

20. The method according to any one of inventions 1 to 19, wherein the silicone hydrogel contact lens is immersed in the aqueous solution of the polyanionic polymer for a time period of from about 60 minutes to about 240 minutes.

21. The method according to any one of inventions 1 to 20, further comprising a step of immersing the silicone hydrogel contact lens in a buffered saline before the step of forming the base coating.

22. The method according to any one of inventions 1 to 20, further comprising a step of immersing the silicone hydrogel contact lens in water before the step of forming the base coating.
23. The method according to any one of inventions 1 to 20, further comprising a step of immersing the silicone hydrogel contact lens in a water with pH adjusted by oxidative acid (e.g. nitric acid) or non-oxidative acid (e.g. hydrochloride) before the step of forming the base coating.
24. The method according to any one of inventions 1 to 23, wherein the step of heating is carried out directly in a sealed lens package containing a packaging solution including the water-soluble, thermally crosslinkable hydrophilic polymeric material during sterilization by autoclave at a temperature from about 115° C. to about 125° C. for at least about 20 minutes.
25. The method according to any one of inventions 1 to 24, wherein the water-soluble thermally crosslinkable hydrophilic polymeric material is a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains.
26. The method according to invention 25, wherein the water-soluble thermally crosslinkable hydrophilic polymeric material is a chemically-modified poly(2-oxazoline-co-ethyleneimine)-epichlorohydrin or a chemically-modified polyamidoamine-epichlorohydrin, wherein the chemically-modified poly(2-oxazoline-co-ethyleneimine)-epichlorohydrin and the chemically-modified polyamidoamine-epichlorohydrin independently of each other comprise:
    (i) from about 20% to about 95% by weight of first polymer chains derived from a polyamidoamine-epichlorohydrin or a poly(2-oxazoline-co-ethyleneimine)-epichlorohydrin;
    (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof; and
    (iii) positively-charged azetidinium groups which are parts of the first polymer chains or pendant or terminal groups covalently attached to the first polymer chains, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent.
27. The method according to invention 26, wherein the chemically-modified poly(2-oxazoline-co-ethyleneimine)-epichlorohydrin and the chemically-modified polyamidoamine-epichlorohydrin independently of each other comprise from about 35% to about 90% by weight of first polymer chains derived from a polyamidoamine-epichlorohydrin or a poly(2-oxazoline-co-ethyleneimine)-epichlorohydrin; from about 10% to about 65% by weight of hydrophilic moieties or second polymer chains derived from at least one hydrophilicity-enhancing agent having at least one reactive functional group selected from the group consisting of amino group, carboxyl group, thiol group, and combination thereof.
28. The method according to invention 26, wherein the chemically-modified poly(2-oxazoline-co-ethyleneimine)-epichlorohydrin and the chemically-modified polyamidoamine-epichlorohydrin independently of each other comprise from about 50% to about 85% by weight of first polymer chains derived from a polyamidoamine-epichlorohydrin or a poly(2-oxazoline-co-ethyleneimine)-epichlorohydrin; from about 15% to about 50% by weight of hydrophilic moieties or second polymer chains derived from at least one hydrophilicity-enhancing agent having at least one reactive functional group selected from the group consisting of amino group, carboxyl group, thiol group, and combination thereof.
29. The method according to any one of inventions 25 to 28, wherein the hydrophilicity-enhancing agent is a hydrophilic polymer having one or more amino, carboxyl and/or thiol groups, wherein the content of the amino, carboxyl and/or thiol groups in the hydrophilic polymer as the hydrophilicity-enhancing agent is less than about 40%, preferably less than about 30%, more preferably less than about 20%, even more preferably less than about 10%, by weight based on the total weight of the hydrophilic polymer.
30. The method according to any one of inventions 25 to 29, wherein the hydrophilicity-enhancing agent is: PEG-N $H_2$; PEG-SH; PEG-COOH; $H_2$N-PEG-N$H_2$; HOOC-PEG-COOH; HS-PEG-SH; $H_2$N-PEG-COOH; HOOC-PEG-SH; $H_2$N-PEG-SH; multi-arm PEG with one or more amino, carboxyl or thiol groups; PEG dendrimers with one or more amino, carboxyl or thiol groups; a diamino-, dicarboxyl-, monoamino- or monocarboxyl-terminated homo- or co-polymer of a non-reactive hydrophilic vinylic monomer; or combinations thereof, wherein PEG is a polyethylene glycol segment, wherein the non-reactive vinylic monomer is selected from the group consisting of acrylamide, methacrylamide, N,N-dimethylacrylamide, N,N-dimethylmethacrylamide, N-vinylpyrrolidone, N,N-dimethylaminoethylmethacrylate, N,N-dimethylaminoethylacrylate, N,N-dimethylaminopropylmethacrylamide, N,N-dimethylaminopropylacrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, a phosphorylcholine-containing vinylic monomer, $C_1$-$C_4$-alkoxy polyethylene glycol (meth)acrylate having a number average molecular weight of up to 1500 Daltons, N-vinyl formamide, N-vinyl acetamide, N-vinyl isopropylamide, N-vinyl-N-methyl acetamide, allyl alcohol, vinyl alcohol (hydrolyzed form of vinyl acetate in the copolymer), and combinations thereof.

31. The method according to any one of inventions 25 to 29, wherein the hydrophilic polymer as the hydrophilicity-enhancing agent is a copolymer which is a polymerization product of a composition comprising (1) about 60% by weight or less (preferably from about 0.1% to about 30%, more preferably from about 0.5% to about 20%, even more preferably from about 1% to about 15%) by weight of at least one reactive vinylic monomer and (2) at least one non-reactive hydrophilic vinylic monomer, wherein the reactive vinylic monomer is selected from the group consisting of amino-$C_1$-$C_6$ alkyl (meth)acrylate, $C_1$-$C_6$ alkylamino-$C_1$-$C_6$ alkyl (meth)acrylate, allylamine, vinylamine, amino-$C_1$-$C_6$ alkyl (meth)acrylamide, $C_1$-$C_6$ alkylamino-$C_1$-$C_6$ alkyl (meth)acrylamide, acrylic acid, $C_1$-$C_4$ alkylacrylic acid, N,N-2-acrylamidoglycolic acid, beta-methyl-acrylic acid, alpha-phenyl acrylic acid, beta-acryloxy propionic acid, sorbic acid, angelic acid, cinnamic acid, 1-carobxy-4-phenyl butadiene-1,3, itaconic acid, citraconic acid, mesaconic acid, glutaconic acid, aconitic acid, maleic acid, fumaric acid, tricarboxy ethylene, and combinations thereof; wherein the non-reactive vinylic monomer is selected from the group consisting of acrylamide, methacrylamide, N,N-dimethylacrylamide, N,N-dimethylmethacrylamide, N-vinylpyrrolidone, N,N-dimethylaminoethylmethacrylate, N,N-dimethylaminoethylacrylate, N,N-dimethylaminopropylmethacrylamide, N,N-dimethylaminopropylacrylamide, glycerol methacrylate, 3-acryloylamino-1-propanol, N-hydroxyethyl acrylamide, N-hydroxyethyl methacrylamide, N-hydroxypropyl acrylamide, N-hydroxypropyl methacrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, a phosphorylcholine-containing vinylic monomer, $C_1$-$C_4$-alkoxy polyethylene glycol (meth)acrylate having a number average molecular weight of up to 1500 Daltons, N-vinyl formamide, N-vinyl acetamide, N-vinyl isopropylamide, N-vinyl-N-methyl acetamide, allyl alcohol, vinyl alcohol, and combinations thereof.

32. The method according to any one of inventions 25 to 31, wherein the hydrophilic polymer as the hydrophilicity-enhancing agent is a copolymer which is a polymerization product of a composition comprising from about 0.1% to about 30% (more preferably from about 0.5% to about 20%, even more preferably from about 1% to about 15%) by weight of at least one reactive vinylic monomer.

33. The method according to invention 26, wherein the hydrophilic polymer as the hydrophilicity-enhancing agent is an amino- or carboxyl-containing polysaccharide, hyaluronic acid, chondroitin sulfate, and combinations thereof.

34. The method according to any one of inventions 26 to 33, wherein the number average molecular weight $M_w$ of the hydrophilicity-enhancing agent is from about 500 to about 2,000,000, preferably from about 1,000 to about 500,000, even more preferably from about 5,000 to about 250,000 Daltons, 35. The method according to invention 26, wherein the hydrophilicity-enhancing agent is: amino-, carboxyl- or thiol-containing monosaccharides; amino-, carboxyl- or thiol-containing disaccharides; and amino-, carboxyl- or thiol-containing oligosaccharides.

36. The method according to any one of inventions 26 to 35, wherein the first polymer chains are derived from the polyamidoamine-epichlorohydrin.

37. The method according to any one of inventions 26 to 36, wherein the first polymer chains are derived from the poly(2-oxazoline-co-ethyleneimine)-epichlorohydrin.

38. A silicone hydrogel contact lens obtained according to the method according to any one of inventions 1 to 37, wherein the silicone hydrogel contact lens has at least one property selected from the group consisting of: an oxygen permeability of at least about 40 barrers; an elastic modulus of about 1.5 MPa or less; a water content of from about 15% to about 70% by weight when fully hydrated; an averaged water contact angle of about 80 degrees or less; and combinations thereof.

39. The silicone hydrogel contact lens obtained according to the method according to invention 38, wherein the silicone hydrogel contact lens has an oxygen permeability of at least about 40 barrers, preferably at least about 50 barrers, more preferably at least about 60 barrers, even more preferably at least about 70 barrers.

40. The silicone hydrogel contact lens obtained according to the method according to invention 38 or 39, wherein the silicone hydrogel contact lens has an elastic modulus of about 1.5 MPa or less, preferably about 1.2 MPa or less, more preferably about 1.0 or less, even more preferably from about 0.2 MPa to about 1.0 MPa.

41. The silicone hydrogel contact lens obtained according to the method according to any one of inventions 38 to 40, wherein the silicone hydrogel contact lens has a water content of from about 15% to about 70%, preferably from about 20% to about 65%, more preferably from about 25% to about 60%, even more preferably from about 30% to about 55% by weight when being fully hydrated.

42. The silicone hydrogel contact lens obtained according to the method according to any one of inventions 38 to 41, wherein the silicone hydrogel contact lens has an averaged water contact angle of about 80 degrees or less, more preferably about 70 degrees or less, even more preferably about 60 degrees or less when being fully hydrated.

43. The silicone hydrogel contact lens obtained according to the method according to any one of inventions 38 to 42, wherein the silicone hydrogel contact lens has a friction rating of about 3 or lower (preferably about 2.5 or lower, more preferably about 2 or lower, even more preferably about 1.5 or lower, most preferably about 1 or lower).

The previous disclosure will enable one having ordinary skill in the art to practice the invention. Various modifications, variations, and combinations can be made to the various embodiment described herein. In order to better enable the reader to understand specific embodiments and the advantages thereof, reference to the following examples is suggested. It is intended that the specification and examples be considered as exemplary.

The following abbreviations are used in the following examples: MCR-M07 represents monobutyl-terminated monomethacryloxypropyl-terminated polydimethylsiloxane (M.W. 600 to 800 g/mol from Gelest); NVP represents N-vinylpyrrolidone; MMA represents methyl methacrylate; TEGDMA represent triethyleneglycol dimethacrylate; EGDMA represents ethylene glycol methyl ether methacrylate; AMA represents allyl methacrylate; VAZO 64 represents 2,2'-dimethyl-2,2'azodipropiononitrile; Nobloc is 2-[3-(2H-Benzotriazol-2-yl)-4-hydroxyphenyl]ethyl methacrylate from Aldrich; RB246 is Reactive Blue 246 from Arran; LM-CEPDMS represents a di-methacrylate-terminated chain-extended polydimethylsiloxane (M.W. 6000 g/mol) which has three polydimethylsiloxane (PDMS) segments linked via diurethane linkages between two PDMS segments and is prepared according to method similar to what described in Example 2 of U.S. Pat. No. 8,529,057 (herein incorporated by reference in its entirety); X22-1661A represents a di-methacrylate-terminated polysiloxane (M.W. 9K g/mol) of the following structural formula ness of a lens surface on a friction rating scale of from 0 to 4. The higher the friction rating is, the lower the slipperiness (or lubricity).

Commercial lenses: DAILIES® TOTAL1®; ACUVUE® OASYS™; ACUVUE® ADVANCE PLUS™; DAILIES® Aqua Comfort Plus®; and AIR OPTIX®, are assigned a friction rating (designated "FR" hereinafter) of 0, 1, 2, 3, and 4 respectively. They are used as standard lenses for determining the friction rating of a lens under test.

The samples are placed in PBS for at least two rinses of 30 minutes each and then transferred to fresh PBS before the evaluation. Before the evaluation, hands are rinsed with a soap solution, extensively rinsed with DI water and then dried with KimWpe® towels. The samples are handled between the fingers and a numerical number is assigned for each sample relative to the above standard lenses described above. For example, if lenses are determined to be only slightly better than AIR OPTIX® lenses, then they are assigned a number 3. The value of a friction rating is one obtained by averaging the results of at least two friction ratings of a contact lens by two or more persons and/or by averaging the friction ratings of two or more contact lenses (from the identical batch of lens production) by one person.
Surface wettability Tests.

Water contact angle (WCA) on a contact lens is a general measure of the surface wettability of a contact lens. In

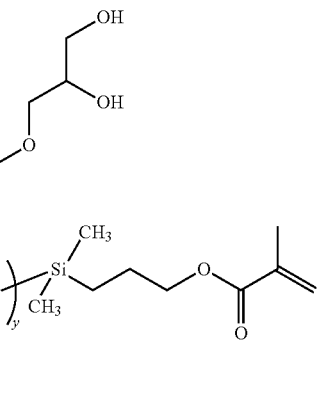

x ~ 93
y ~ 5

Example 1

Oxygen Permeability Measurements

Unless specified, the apparent oxygen permeability ($Dk_{app}$), the apparent oxygen transmissibility (Dk/t), the intrinsic (or edge-corrected) oxygen permeability ($Dk_c$) of a lens and a lens material are determined according to procedures described in Example 1 of U.S. patent application publication No. 2012/0026457 A1 (herein incorporated by reference in its entirety).

Ion Permeability Measurements

The ion permeability of a lens is measured according to procedures described in U.S. Pat. No. 5,760,100 (herein incorporated by reference in its entirety. The values of ion permeability reported in the following examples are relative ionoflux diffusion coefficients ($D/D_{ref}$) in reference to a lens material, Alsacon, as reference material. Alsacon has an ionoflux diffusion coefficient of $0.314 \times 10^{-3}$ mm$^2$/minute.

Lubricity Evaluation.

The lubricity of a lens is evaluated by using a finger-felt lubricity test which characterizes qualitatively the slipperiparticular, a low water contact angle corresponds to more wettable surface. Average contact angles (Sessile Drop) of contact lenses are measured using a VCA 2500 XE contact angle measurement device from AST, Inc., located in Boston, Mass. This equipment is capable of measuring advancing contact angles ($\theta_a$) or receding contact angles ($\theta_r$) or sessile (static) contact angles. Unless specified, water contact angle is sessile (static) contact angle. The measurements are performed on fully hydrated contact lenses and immediately after blot-drying as follows. A contact lens is removed from the vial and washed 3 times in ~200 ml of fresh DI water in order to remove loosely bound packaging additives from the lens surface. The lens is then placed on top of a lint-free clean cloth (Alpha Wpe TX1009), dabbed well to remove surface water, mounted on the contact angle measurement pedestal, blown dry with a blast of dry air and finally the sessile drop contact angle is automatically measured using the software provided by the manufacturer. The DI water used for measuring the contact angle has a resistivity >18 MΩcm and the droplet volume used is 2 µl. Typically, uncoated silicone hydrogel lenses (after autoclave) have a sessile drop contact angle around 120 degrees. The tweezers and the pedestal are washed well with Isopropanol and rinsed with DI water before coming in contact with the contact lenses.

Water Break-up Time (WBUT) Tests.

The surface hydrophilicity of lenses (after autoclave) is assessed by determining the time required for the water film to start breaking on the lens surface. Briefly, lenses are removed from the vial and placed in PBS (phosphate buffered saline) for at least two rinses of 30 minutes each and then transferred to fresh PBS in order to remove loosely bound packaging additives from the lens surface. The lens is removed from the solution and held against a bright light source. The time that is needed for the water film to break (de-wet) exposing the underlying lens material is noted visually. Uncoated lenses typically instantly break upon removal from PBS and are assigned a WBUT of 0 seconds. Lenses exhibiting WBUT 10 seconds are considered to have a hydrophilic surface and are expected to exhibit adequate wettability (ability to support the tear film) on-eye.

Digital Rubbing Tests.

The lenses are digitally rubbed (wearing disposable powder-free latex gloves) with PBS or RENU® multi-purpose lens care solution (or another multi-purpose lens care solution) for 20 seconds and then rinsed with saline. The above procedure is repeated for a given times, e.g., from 1 to 30 times, (i.e., number of repetitions of digital rubbing tests which imitate cleaning and soaking cycles).

Coating Intactness Tests. The intactness of a coating on the surface of a contact lens can be tested according to Sudan Black stain test as follow. Contact lenses with a coating (an LbL coating, a plasma coating, or any other coatings) are dipped into a Sudan Black dye solution (Sudan Black in the mixture ~80% mineral oil and ~20% vitamin E oil). Sudan Black dye is hydrophobic and has a great tendency to be adsorbed by a hydrophobic material or onto a hydrophobic lens surface or hydrophobic spots on a partially coated surface of a hydrophobic lens (e.g., silicone hydrogel contact lens). If the coating on a hydrophobic lens is intact, no staining spots should be observed on or in the lens. All of the lenses under test are fully hydrated. Visible fine lines on lens surface may indicate the presence of cracking of the cross-linked coatings.

Lens Surface Cracking Test.

Excessive crosslinking of a coating layer can lead to surface cracks visible under a darkfield microscope after rubbing a lens. The lens surface cracking test is used to differentiate the severity of surface cracking resulting from exposure of a lens to conditions and forces that could be encountered during routine and intended use of lenses.

Invert the lens confirmation by holding the edge of the lens between the thumb and index finger of one hand. The concave side of the lens should face the experimenter's body. Wth the thumb and/or index finger of the other hand, gently bend the top of the lens over the index finger holding the lens until the lens confirmation inverts. Look for surface cracks at 5× to 10× magnification under the darkfield stereomicroscope. If individual crack lines are clearly distinguishable, then the lenses are considered "yes" for cracking. If the lens appears to have long, cloudy, linear formations, but crack lines are not distinguishable, then these area maybe inspected at higher magnification as needed. If no crack lines or long, cloudy, linear formations are visible, then the lens are considered "no" cracking. Lenses exhibiting no cracking 0 are considered better and are expected to exhibit smooth and soft surface.

Lens Surface Bead Test.

The lens surface bead test is used to evaluate surface charges of contact lenses. The data generated from this method are the numbers of beads that are absorbed onto lens surface, and serve as an informational tool indicating the surface charge property.

The beads of Dovex 1×4 chloride form 50-100 mesh (Lot#54898PJV Sigma Aldrich CAS69011-19-4) are suspended in PBS. The lens is soaked in bead/PBS in a centrifuge tube. After on shaker at 300 rpm for 2 min, the lens is rinsed using PBS. The beads absorbed on lens surface are then observed under the dark field microscope. Image Pro software is used to analyze the total count number of cationic beads. The total for cationic beads is the total count number of the bead test.

Example 2

Preparation of Polymerizable Compositions

Two lens formulations (polymerizable compositions), I and II, are prepared to have compositions (in unit parts) as shown in Table 1.

TABLE 1

| | | Compositions (Unit parts) Formulation No. | |
|---|---|---|---|
| | | I | II |
| Monomethacryloxypropyl terminated polydimethylsiloxane, asymmetric (MW 600-800) | MCR-M07 | 34 | 34 |
| Low Molecular weight Chain extended polydimethylsiloxane | LM-CEPDMS | 6 | 0 |
| Glycerol polydimethylsiloxane | X22-1661A | 0 | 6 |
| 1-Vinyl-2-pyrrolidinone | NVP | 40 | 40 |
| Methyl methacrylate | MMA | 10 | 10 |
| Ethylene glycol methyl ether methacrylate | EGMA | 10 | 10 |
| Triethylene glycol dimethacrylate | TEGDMA | 0.2 | 0.2 |
| Allyl methaylate | AMA | 0.1 | 0.1 |
| 2-[3-(2H-Benzotriazol-2-yl)-4-hydroxyphenyl]ethyl methacrylate | Nobloc | 0.9 | 0.9 |
| 2,2'-dimethyl-2,2'azodipropiononitrile | Vazo 64 | 0.5 | 0.5 |
| Reactive Blue 246 | RB 246 | 0.01 | 0.01 |

The formulations are prepared by adding LM-CEPDMS, AMA, TEGDMA, MMA, EGMA, NVP, LM-CEPDMS, MCR-M07, Norbloc, RB246 and VAZO 64 into a clean bottle, with a stir bar to mix at 600 rpm for 30 min at room temperature. After all the solid is dissolved, a filtration of the formulation is carried out by using 2.7 μm GMF filter.

Preparation of Silicone Hydrogel Contact Lenses

A lens formulation is purged with nitrogen at room temperature for 30 to 35 minutes. The $N_2$-purged lens formulation is introduced into polypropylene molds and thermally cured under the following curing conditions: ramp from room temperature to 55° C. at a ramp rate of about 7° C./minute; holding at 55° C. for about 30 minutes; ramp from 55° C. to 80° C. at a ramp rate of about 7° C./minute; holding at 55° C. for about 30 minutes; ramp from 80° C. to 100° C. at a ramp rate of about 7° C./minute; and holding at 100° C. for about 30 minutes. The molds are opened and the molded lenses are removed from the molds.

Formulations I and II are used for coating studies in the examples below. In general, Formulation I is used unless otherwise specified.

Example 3

Preparation of PAA (M.W. 250000) Aqueous Solution

An aqueous solution of polyacrylic acid (PAA, M.W. 250000) is prepared by diluting a 35% by weight of PAA in water (directly from the supplier) with purified water (distilled or deionized water). The pH is adjusted by adding formic acid to the PAA aqueous solution to about 2.0. The concentration of PAA is about 0.5% by weight. The prepared PAA aqueous solution is filtered by using a VWR#28306-153 Filter paper (Particle Retention size=10 μm) to remove any particulate or foreign matter.

Phosphate Buffered Saline (PBS)

A phosphate buffered saline is prepared by dissolving $NaH_2PO_4.H_2O$, $Na_2HPO_4.2H_2O$, and in a given volume of purified water (distilled or deionized) to have the following composition: ca. 0.044 w/w % $NaH_2PO_4.H_2O$, ca. 0.388 w/w/% $Na_2HPO_4.2H_2O$, and ca. 0.79 w/w % NaCl.

Phosphate Buffered Solution without NaCl

A phosphate solution without NaCl may also be prepared using the same procedure for preparing PBS, but no NaCl is added.

IPC Saline

IPC saline is prepared by mixing appropriate amount of Poly(AAm-co-AA) or other wetting agent with PAE in phosphate buffered saline and pre-treated at certain temperature for a desired time. Poly(AAm-co-AA)(90/10) partial sodium salt, poly(AAm-co-AA) 90/10, Mw 200,000) is purchased from Polysciences, Inc. and used as received. Kymene or PAE solutons of different solid contents is purchased from Ashland as an aqueous solution and used as received. After the heat pre-treatment, the IPC saline is filtered using a 0.22 micron membrane filter and cooled down back to room temperature. 5 ppm hydrogen peroxide maybe added to the final IPC saline to prevent bioburden growth and the IPC saline is filtered using a 0.22 micron membrane filter.

Different code may be assigned to IPC saline. For example for IPC-3C, 0.07% of PAAm-PAA and about 0.35% Kymene was mixed together in PBS and pre-treated at 60° C. for about 6 hr, % of kymene may be adjusted based on solid content and azetidinium functionality. For example for IPC-3D, 0.07% of PAAm-PAA and about 0.35% Kymene was mixed together in PBS and pre-treated at 70° C. for about 7 hr. IPC-3X may be used to describe IPS saline of different PAAm-PAA and Kymene concentration and different heat pre-treatment condidstions.

PAA-Coated Lenses

After demolding, silicone hydrogel contact lenses prepared in Example 2 are subjected to a 3-step coating process (designated as "BC-1") to form PAA coatings (i.e., base coatings) on the silicone hydrogel contact lenses. In BC-1, the silicone hydrogel contact lenses are first immersed in PBS for about 60 minutes at room temperature, second immersed in the PAA solution prepared above for about 60 minutes at room temperature, and third rinsed with PBS for about 5 minutes at room temperature.

Application of Crosslinked Coating.

SiHy lenses having a PAA base coating thereon prepared above are placed in polypropylene lens packaging shells (or blisters) (one lens per shell) with 0.6 mL of the IPC saline (IPC-3C) (half of the saline is added prior to inserting the lens). The blisters are then sealed with foil and autoclaved for about 45 minutes at about 121° C., forming SiHy contact lenses with crosslinked coatings (PAA-x-hydrophilic polymeric material) thereon.

Characterization of SiHy Lenses

Control lenses are SiHy contact lenses without any coating thereon. After demolding, SiHy lenses prepared in Example 2 are immersed twice in PBS for about 60 minutes at room temperature. After rinsing in PBS with 5 min, the lens then is placed in polypropylene lens packaging shells (or blisters) (one lens per shell) with 0.6 mL of PBS. The blisters are then sealed with foil and autoclaved for about 45 minutes at about 121° C.

PAA-coated SiHy lenses are SiHy lenses with a PAA coating thereon but without a crosslinked hydrophilic coating on top of the PAA coating. SiHy lenses with a PAA base coating thereon as prepared above are placed in polypropylene lens packaging shells (or blisters) (one lens per shell) with 0.6 mL of PBS. The blisters are then sealed with foil and autoclaved for about 45 minutes at about 121° C.

SiHy lenses with a crosslinked coating thereon, PAA-coated SiHy lenses, and control SiHy lenses are tested for surface hydrphilicity (WBUT) and lubricity (friction rating) according to the procedures described in Example 1. The results are reported in Table 2.

TABLE 2

| Type of SiHy Lenses | WBUT | Friction rating |
| --- | --- | --- |
| Control (no coating) | 0 | 4 |
| With PAA Coating | 5, 8 | 2, 2 |
| With Crosslinked Coating | 5, 7 | 0.5, 0.5 |

The lenses have an oxygen permeability (measured according to polarographic method) of about 91 barrers (for Formulation I) or about 83 barrers (for Formulation II), a bulk elastic modulus of about 0.80 MPa (for formulation I) or 0.67 MPa (for formulation II), a water content of about 49% by weight (for Formulation I) or about 50% by weight (for Formulation II), a relative ion permeability of about 12.5 relative to Alsacon lens (for Formulation I) or about 11.0 relative to Alsacon lens (for Formulation II), and a water contact angle of 29 degrees, a WBUT of 14 seconds. Some cracking lines are visible after rubbing the test lens and stained with Sudan Black. However, the lenses are very lubricious in a finger rubbing test and having a friction rating of about 0.5. When the lenses are tested for lens surface charge according to the Positively Charged Particles Adhesion test, there are less than 71 positively-charged particles (DOWEX™ monosphere ion exchange resins) which are adhered onto lenses with the crosslinked coating.

Example 4

The PBS and IPC saline, both of which are prepared in Example 3, are used in this Example. A PAA coating solution is prepared by dissolving an amount of PAA (M.W.: 1.6 million Da, from Lubrizol) in a given volume of purified water (distilled or deionized) to have a concentration of about 0.5% by weight and the pH is adjusted with formic acid to about 2.0.

PAA-Coated Lenses

After demolding, silicone hydrogel contact lenses prepared in Example 2 are subjected to a 2-step coating process (designated as "BC-2") to form PAA coatings (i.e., base coatings) on the silicone hydrogel contact lenses. In BC-2, the silicone hydrogel contact lenses are first immersed in the PAA solution prepared above for about 150 minutes at room temperature and then rinsed with PBS for about 5 minutes at room temperature.

Application of crosslinked coating. Lenses having a PAA-LbL base coating thereon prepared above are placed in polypropylene lens packaging shells (one lens per shell) with 0.6 mL of the IPC saline (IPC-3C) (half of the saline is added prior to inserting the lens). The blisters are then sealed with foil and autoclaved for about 45 minutes at about 121° C., forming SiHy contact lenses with crosslinked coatings (PAA-x-hydrophilic polymeric material) thereon.

Characterization of SiHy lenses.

The resultant SiHy contact lenses with crosslinked coatings (PAA-x-hydrophilic polymeric material) thereon are tested according to procedures described in Example 1. The lenses have an oxygen permeability (measured according polarographic method) of about 91 barrers (for Formulation I) or about 83 barrers (for Formulation II), a bulk elastic modulus of about 0.80 MPa (for formulation I) or 0.67 MPa (for formulation II), a water content of about 49% by weight (for Formulation I) or about 50% by weight (for Formulation II), a relative ion permeability of about 12.5 relative to Alsacon lens (for Formulation I) or about 11.0 relative to Alsacon lens (for Formulation II), a water contact angle of 42 degrees, a WBUT of more than 10 seconds. No cracking lines are visible after rubbing the test lens and then stained with Sudan Black. The lenses are very lubricious in a finger rubbing test and having a friction rating of 0. When the lenses are tested for lens surface charge according to the Positively Charged Particles Adhesion test, there are less than 62 positively-charged particles (DOWEX™ monosphere ion exchange resins) which are adhered onto lenses with the crosslinked coating.

Example 5

The IPC-3C saline and PBS, both of which are prepared in Example 3, are used in this Example. Two aqueous solution of polyacrylic acid (PAA, M.W. 250000) are prepared by diluting a 35% by weight of PAA in water (directly from the supplier) with purified water (distilled or deionized water). The pH is adjusted by adding hydrochloric acid to the PAA aqueous solution to about 2.0 for one PAA solution and about 3.0 for the other PAA solution. The concentration of PAA in both solutions is about 0.5% by weight. The prepared PAA aqueous solutions are filtered by using a VWR#28306-153 Filter paper to remove any particulate or foreign matter.

PAA-Coated Lenses

After demolding, silicone hydrogel contact lenses prepared in Example 2 are subjected to a 7-step coating process (BC-3) to form PAA coatings (i.e., base coatings) on the silicone hydrogel contact lenses. In BC-3, the silicone hydrogel contact lenses are: first immersed in PBS for about 60 minutes at room temperature; second immersed in a PAA solution (pH~2.0 or pH~3.0) prepared above for about 20 minutes at room temperature; third rinsed with PBS for about 5 minutes at room temperature; fourth immersed in a PAA solution prepared above (having the same pH as in the $2^{nd}$ step) for about 20 minutes at room temperature; fifth rinsed with PBS for about 5 minutes at room temperature; sixth immersed in a PAA solution prepared above (having the same pH as in the $2^{nd}$ step) for about 20 minutes at room temperature; and seventh rinsed with PBS for about 5 minutes at room temperature.

Application of Crosslinked Coating

Lenses having a PAA-LbL base coating thereon prepared above are placed in polypropylene lens packaging shells (one lens per shell) with 0.6 mL of the IPC-3C saline (half of the saline is added prior to inserting the lens). The blisters are then sealed with foil and autoclaved for about 45 minutes at about 121° C., forming SiHy contact lenses with crosslinked coatings (PAA-x-hydrophilic polymeric material) thereon.

Characterization of SiHy Lenses.

The resultant SiHy contact lenses with crosslinked coatings (PAA-x-hydrophilic polymeric material) thereon are tested according to procedures described in Example 1. The resultant lenses have a WBUT of about 5 to about 7 seconds and a friction rating of about 0.5 for those lenses having a PAA base coating formed at pH 2.0; and a WBUT of about 5 and a friction rating of about 2 for those lenses having a PAA base coating formed at pH 3.0. A lower pH is preferably used for PAA-coating step.

Example 6

The PAA solution, the IPC-3C saline and PBS, all of which are p prepared in Example 3, are used in this Example.

PAA-Coated Lenses

After demolding, silicone hydrogel contact lenses prepared in Example 2 are subjected to a 7-step coating process (BC-4) at about 80° C. to form PAA coatings (i.e., base coatings) on the silicone hydrogel contact lenses. In BC-4, the silicone hydrogel contact lenses are: first immersed in PBS for ca. 60 minutes at ca. 80° C.; second immersed in the PAA solution (pH~2.0) prepared above for ca. 20 minutes at ca. 80° C.; third rinsed with PBS for ca. 5 minutes at ca. 80° C.; fourth immersed in the PAA solution (pH~2.0) prepared above for ca. 20 minutes at ca. 80° C.; fifth rinsed with PBS for ca. 5 minutes at ca. 80° C.; sixth immersed in the PAA solution (pH~2.0) prepared above for ca. 20 minutes at ca. 80° C.; and seventh rinsed with PBS for ca. 5 minutes at room temperature.

Application of Crosslinked Coating

Lenses having a PAA-LbL base coating thereon prepared above are placed in polypropylene lens packaging shells (one lens per shell) with 0.6 mL of the IPC saline (half of the saline is added prior to inserting the lens). The blisters are then sealed with foil and autoclaved for about 45 minutes at about 121° C., forming SiHy contact lenses with crosslinked coatings (PAA-x-hydrophilic polymeric material) thereon.

Characterization of SiHy Lenses.

Control lenses are SiHy contact lenses without any coating thereon. After demolding, SiHy lenses prepared in Example 2 are immersed twice in PBS for about 60 minutes at room temperature. After rinsing in PBS with 5 min, the lens then is placed in polypropylene lens packaging shells (or blisters) (one lens per shell) with 0.6 mL of PBS. The blisters are then sealed with foil and autoclaved for about 45 minutes at about 121° C.

PAA-coated SiHy lenses are SiHy lenses with a PAA coating thereon but without a crosslinked hydrophilic coating on top of the PAA coating. SiHy lenses with a PAA base coating thereon as prepared above are placed in polypropylene lens packaging shells (or blisters) (one lens per shell) with 0.6 mL of PBS. The blisters are then sealed with foil and autoclaved for about 45 minutes at about 121° C.

SiHy lenses with a crosslinked coating thereon prepared by placing PAA-coated SiHy lenses in polypropylene lens packaging shells (one lens per shell) with 0.6 mL of the IPC saline (IPC-3C) (half of the saline is added prior to inserting the lens). The blisters are then sealed with foil and autoclaved for about 45 minutes at about 121° C., forming SiHy contact lenses with crosslinked coatings (PAA-x-hydrophilic polymeric material) thereon.

SiHy lenses with a crosslinked coating thereon, PAA-coated SiHy lenses, and control SiHy lenses are tested for surface hydrphilicity (WBUT) and lubricity (friction rating) according to the procedures described in Example 1. The results are reported in Table 3. The results indicate that the PAA-coating step is preferably carried out at a temperature higher than room temperature.

TABLE 3

| Type of SiHy Lenses | WBUT | Friction rating |
|---|---|---|
| With PAA Coating (BC-3) | 5, 8 | 2, 2 |
| With Crosslinked Coating (BC-3) | 5, 7 | 0.5, 0.5 |
| With PAA Coating (BC-4) | 5, 7 | 1, 0.5 |
| With Crosslinked Coating (BC-4) | 13, 11 | 0, 0 |

Example 7

The PAA solution, the IPC-3C saline and PBS, all of which are p prepared in Example 3, are used in this Example.

PAA-Coated Lenses

After demolding, silicone hydrogel contact lenses prepared in Example 2 are subjected to a 3-step coating process (BC-5) to form PAA coatings (i.e., base coatings) on the silicone hydrogel contact lenses. In BC-5, the silicone hydrogel contact lenses are: first immersed in PBS for about 60 minutes at room temperature while shaking the lenses in the PBS; second immersed in the PAA solution (pH~2.0) prepared above for about 60 minutes at room temperature while shaking the lenses in the PAA solution; and third rinsed with PBS for about 5 minutes at room temperature.

Alternatively, after demolding, silicone hydrogel contact lenses prepared in Example 2 are subjected to a 5-step coating process (BC-6) to form PAA coatings (i.e., base coatings) on the silicone hydrogel contact lenses. In BC-6, the silicone hydrogel contact lenses are: first immersed in PBS for about 3 days at room temperature while shaking the lenses in the PBS; second immersed in the PAA solution (pH~2.0) prepared above for about 30 minutes at room temperature while shaking the lenses in the PAA solution; third rinsed with PBS for about 5 minutes at room temperature; fourth immersed in the PAA solution (pH~2.0) prepared above for about 30 minutes at room temperature while shaking the lenses in the PAA solution; and fifth rinsed with PBS for about 5 minutes at room temperature.

Application of Crosslinked Coating

Lenses having a PAA-LbL base coating thereon prepared above are placed in polypropylene lens packaging shells (one lens per shell) with 0.6 mL of the IPC saline (IPC-3C) (half of the saline is added prior to inserting the lens). The blisters are then sealed with foil and autoclaved for about 45 minutes at about 121° C., forming SiHy contact lenses with crosslinked coatings (PAA-x-hydrophilic polymeric material) thereon.

Characterization of SiHy Lenses.

SiHy lenses with a crosslinked coating thereon were observed under dark field for the presence of aggregates on lens surface. No aggregates are observed. Agitation action during extraction/coating process may be desirable for eliminating or minimizing particles aggregation.

Resultant SiHy lenses are tested for surface hydrophilicity (WBUT) and lubricity (friction rating) according to the procedures described in Example 1. The results are reported in Table 4.

TABLE 4

| Type of SiHy Lenses | WBUT | Friction rating | WCA |
|---|---|---|---|
| With Crosslinked Coating (BC-5) | 14, 15 | 0, 0 | 29 |
| With Crosslinked Coating (BC-6) | 12, 15 | 0, 0 | 41 |

Example 8

The PBS and the IPC-3D saline, both of which are prepared in Example 3, are used in this Example. Two aqueous solution of polyacrylic acid (PAA, M.W. 250000) are prepared by diluting a 35% by weight of PAA in water (directly from the supplier) with purified water (distilled or deionized water). The pH is adjusted by adding formic acid to the PAA aqueous solution to ca. 2.0. The concentration of PAA is ca. 0.5% by weight. The prepared PAA aqueous solution is filtered by using a VWR#28306-153 Filter paper to remove any particulate or foreign matter.

PAA-Coated Lenses

After demolding, silicone hydrogel contact lenses prepared in Example 2 are subjected to a 5-step coating process (designated as "BC-7") to form PAA coatings (i.e., base coatings) on the silicone hydrogel contact lenses. In BC-7, the silicone hydrogel contact lenses are first immersed in PBS for about 60 minutes at room temperature, second immersed in the PAA solution prepared above for about 60 minutes at room temperature, third rinsed with PBS for about 5 minutes at room temperature; fourth immersed in the PAA solution prepared above for about 30 minutes at room temperature, and fifth rinsed with PBS for about 5 minutes at room temperature.

Application of Crosslinked Coating.

SiHy lenses having a PAA base coating thereon prepared above are placed in polypropylene lens packaging shells (or blisters) (one lens per shell) with 0.6 mL of the IPC saline (half of the saline is added prior to inserting the lens). The blisters are then sealed with foil and autoclaved for about 45 minutes at about 121° C., forming SiHy contact lenses with crosslinked coatings (PAA-x-hydrophilic polymeric material) thereon.

Characterization of SiHy Lenses.

The resultant SiHy contact lenses with crosslinked coatings (PAA-x-hydrophilic polymeric material) thereon are tested according to procedures described in Example 1. The lenses have an oxygen permeability (measured according to polarographic method) of about 91 barrers (for Formulation I) or about 83 barrers (for Formulation II), a bulk elastic modulus of about 0.80 MPa (for formulation I) or 0.67 MPa (for formulation II), a water content of about 49% by weight (for Formulation I) or about 50% by weight (for Formulation II), a relative ion permeability of about 12.5 relative to Alsacon lens (for Formulation I) or about 11.0 relative to Alsacon lens (for Formulation II), a water contact angle of 24 degrees, a WBUT of 17 seconds. Cracking lines are not visible after rubbing the test lens and then stained with Sudan Black. The lenses are very lubricious in a finger rubbing test and having a friction rating of about 1.5. When the lenses are tested for lens surface charge according to the Positively Charged Particles Adhesion test, there are less than 42 positively-charged particles (DOWEX™ monosphere ion exchange resins) which are adhered onto lenses with the crosslinked coating.

Example 9

The PBS and the IPC-3D saline, both of which are prepared in Example 3, are used in this Example. Aqueous solution of polyacrylic acid (PAA, M.W. about 1.6 million) is prepared by adding PAA solid (directly from the supplier) in purified water (distilled or deionized water). The pH is adjusted by adding formic acid hydrochloric acid to the PAA aqueous solution to about 1.8. The concentration of PAA in both solutions is about 0.1% by weight. The prepared PAA aqueous solutions are filtered by using a VWR#28306-131 Filter paper to remove any particulate or foreign matter.

PAA-Coated Lenses

After demolding, silicone hydrogel contact lenses prepared in Example 2 are subjected to a 3-step coating process (BC-8) to form PAA coatings (i.e., base coatings) on the silicone hydrogel contact lenses. In BC-8, the silicone hydrogel contact lenses are: immersed in water for ca. 60 minutes at room temperature under agitation; then immersed in the PAA solution prepared above for ca. 60 minutes at room temperature while shaking the lenses in the PAA solution; and third rinsed with PBS for ca. 5 minutes at room temperature.

Application of Crosslinked Coating

Lenses having a PAA-LbL base coating thereon prepared above are placed in polypropylene lens packaging shells (one lens per shell) with about 0.6 mL of the IPC saline (IPC-3D) (half of the saline is added prior to inserting the lens). The blisters are then sealed with foil and autoclaved for about 45 minutes at about 121° C., forming SiHy contact lenses with crosslinked coatings (PAA-x-hydrophilic polymeric material) thereon. Characterization of SiHy Lenses.

SiHy lenses with a crosslinked coating thereon are observed under dark field for the presence of cracking and no cracking is observed.

Resultant SiHy lenses are tested for surface wettability (WCA) and lubricity (friction rating) according to the procedures described in Example 1. The results are reported in Table 5

TABLE 5

| Type of SiHy Lenses | Friction rating | WCA |
|---|---|---|
| With Crosslinked Coating (BC-8) | 1~2 | 31 |

Example 10

Various PAA aqueous solution having different PAA concentrations (see Table 5) are prepared according to the procedures described in Example 9 using formic acid to adjust pH to about 1.8. Lens core made from Formulation I and II (see Example 2 for details) is immersed in a PAA aqueous solution for about 2.5 hours at room temperature under agitation. It is then rinsed by PBS saline for 5 minutes till packaging in IPC saline. Details about IPC-3G can be found in Example 14. The lens packaging shell is then sealed and autoclaved at 121° C. for 45 minutes. Lens surface properties (See Example 1 about the test methods) are measured and reported in Table 6.

TABLE 6

| Lens Formulation Type/PAA Concentration/IPC type | Friction rating | Coating Intactness | Surface cracking? |
|---|---|---|---|
| I/0.50%/IPC-3C | 0 | No staining | Yes |
| I/0.10%/IPC-3C | 0 | No staining | Yes |
| I/0.02%/IPC-3C | 0 | Almost no staining | Yes |
| II/0.50%/IPC-3C | 0 | No staining | Yes |

TABLE 6-continued

| Lens Formulation Type/PAA Concentration/IPC type | Friction rating | Coating Intactness | Surface cracking? |
|---|---|---|---|
| II/0.10%/IPC-3C | 0 | No staining | Yes |
| II/0.02%/IPC-3C | 0 | No staining | Yes |
| I/0.50%/IPC-3G | 0 | No staining | No |
| I/0.10%/IPC-3G | 0 | No staining | No |
| I/0.02%/IPC-3G | 0 | No staining | No |
| II/0.50%/IPC-3G | 0 | No staining | No |
| II/0.10%/IPC-3G | 0 | No staining | Yes, very light |

Example 11

Effects of different molecular weights of PAA are accessed by preparing PAA solutions as stated in Example 9. PAA solutions of 0.05 weight percent are prepared with PAA of various molecular weights (Mw=1621 KDa, 963 kDa, 337 KDa, 257 KDa) that are purchased from various vendors. Lenses prepared from formulation I is lens core made from Formulation I and II (see Example 2 for details) is immersed in a PAA aqueous solution for eitherl) 2.5 hours or 2) 2 hour at room temperature under agitation. It is then rinsed by PBS saline for 5 minutes till packaging in IPC saline. Lenses are packaged in IPC solutions inside packaging shell which is then sealed and autoclaved at 121° C. for 45 minutes. Lens surface properties (See Example 1 about the test methods) are measured and reported in Table 7.

TABLE 7

| Lens Formulation/PAA mol wt./Dip time/IPC type | Friction rating | Surface cracking? |
|---|---|---|
| I/963/2.5 h/3L | 0 | Yes |
| I/257/2.5 h/3L | 1 | Yes |
| I/337/2.5 h/3L | 0 | Yes |
| I/1621/2.5 h/3L | 0 | Yes, but very faint |
| I/1621/2 h/3L | 0 | Yes, but very faint |
| I/963/2 h/3L | 0 | Yes, but very faint |
| I/1621/1.5 h/3L | 0 | No |
| I/963/1.5 h/3L | 0 | No |

*The lenses were soaked in PBS for 5 mins prior to packaging in IPC.

Example 12

The effect of the exchange of PAA after the first 30 mins of coating has also been explored. During this process, the lenses prepared using either formulation I or formulation II are coated with PAA solution which is prepared as stated in Example 9. Different molecular weight PAA solutions are used for the coating process and formic acid is used to adjust the pH in all cases. In addition to the use of fresh PAA after the first 30 mins, the total coating time is also adjusted to be either 2 h or 2.5 h. The lenses thus prepared are then rinsed by PBS saline for 60 minutes before being loaded onto blisters pre-loaded with IPC saline and then sealed and autoclaved at 121° C. for 45 minutes. Lens surface properties (See Example 1 about the test methods) are measured and reported in Table 8.

TABLE 8

| Lens Formulation Type/PAA mol. wt./total dip time/IPC type | Friction rating | Coating Intactness | Surface cracking*? |
|---|---|---|---|
| I/1621/2.5 h/3L | 0 | Almost no staining | No |
| I/1621/2.5 h/3C | 0 | Almost no staining | Yes |
| I/963/2.5 h/3L | 0 | Almost no staining | No |
| I/963/2.5 h/3C | 0 | Almost no staining | Yes |
| II/1621/2.5 h/3L | 0 | No staining | No |
| II/1621/2.5 h/3C | 0 | No staining | Yes |
| II/963/2.5 h/3L | 0 | No staining | No |
| II/963/2.5 h/3C | 0 | No staining | Yes |
| I/1621/2.0 h/3L | 0 | Almost no staining | No |

*All lenses are soaked in PBS for 60 mins prior to packaging into IPC solution

Example 13

0.1% PAA (Mw 963 kDa) aqueous solution is prepared by adding various amount of either formic acid (FA), or phosphoric acid (PA) to adjust the solution pH. Lens core made from Formulation I and II (see example 2 for details) is immersed in a PAA aqueous solution for about 2.5 hours at room temperature under agitation. It is then rinsed by PBS saline for 60 minutes till packaging in IPC saline. Details about IPC-3L (same as IPC-3G) can be found in Example 14. The lens packaging shell is then sealed and autoclaved at 121° C. for 45 minutes. Lens mechanical properties and surface properties are measured and reported in Table 9.

TABLE 9

| Lens Formulation Type/Acid Type/Dip Soln pH/IPC type | Friction rating | Surface cracking? | Modulus (MPa) | Elongation (%) |
|---|---|---|---|---|
| I/FA/pH~1.8/IPC-3L | 0 | No | 0.74 ± 0.01 | 296.4 ± 9.4 |
| II/FA/pH~1.8/IPC-3L | 0 | No | 0.63 ± 0.01 | 268.6 ± 29.2 |
| I/PA/pH~1.0/IPC-3C | 0 | No | NA | NA |
| I/PA/pH~1.0/IPC-3L | 0 | No | 0.73 ± 0.01 | 257.8 ± 10.4 |
| I/PA/pH~1.1/IPC-3C | 0 | No | NA | NA |
| I/PA/pH~1.1/IPC-3L | 0 | No | 0.73 ± 0.01 | 273.4 ± 8.3 |

Example 14

0.5% PAA (Mw~1.6 Million) and 0.02% PAA (Mw~1.6 Million) aqueous solution is prepared by adding various amount of formic acid (FA) to adjust the solution pH to about 1.8. Lens core made from Formulation I is immersed in a PAA aqueous solution for about 2.5 hours at room temperature under agitation. It is then rinsed by PBS saline for 60 minutes (additional 10 minutes in Di-water for [PAA]=0.5%) till packaging in IPC saline. The lens packaging shell is then sealed and autoclaved at 121° C. for 45 minutes. Table 10 summarizes the IPC saline preparation process parameters and Table 11 reports the results.

TABLE 10

| IPC code | PAE % | PAAm-PAA % | Rxn T (° C.) | Rxn time (hrs) |
|---|---|---|---|---|
| IPC-3C | 0.088 | 0.07 | 60 | 6 |
| IPC-3D | 0.088 | 0.07 | 70 | 7 |
| IPC-3E | 0.088 | 0.07 | 65 | 6 |
| IPC-3F | 0.088 | 0.14 | 65 | 6 |
| IPC-3G | 0.044 | 0.07 | 65 | 6 |
| IPC-3H | 0.066 | 0.21 | 65 | 6 |
| IPC-3I | 0.044 | 0.14 | 65 | 6 |
| IPC-3J | 0.022 | 0.07 | 65 | 6 |
| IPC-3K | 0.066 | 0.11 | 65 | 6 |
| IPC-3L | 0.044 | 0.07 | 65 | 6 |
| IPC-3M | 0.022 | 0.04 | 65 | 6 |
| IPC-3N | 0.033 | 0.05 | 65 | 6 |

TABLE 11

| Lens Formulation Type/PAA Concentration/IPC type | Friction rating | Coating Intactness | Surface cracking? |
|---|---|---|---|
| I/0.02%/IPC-3H | 0 | Almost no staining | No |
| I/0.02%/IPC-3I | 0 | Minor staining | No |
| I/0.02%/IPC-3J | 0 | Minor staining | No |
| I/0.02%/IPC-3K | 0 | NA | Yes |
| I/0.02%/IPC-3L | 0 | Almost no staining | Yes |
| I/0.02%/IPC-3M | 0 | Minor staining | No |
| I/0.5%/IPC-3C | 0 | Almost no staining | No |
| I/0.5%/IPC-3L | 0 | No staining | No |
| I/0.5%/IPC-3K | 0 | Almost no staining | No |
| I/0.5%/IPC-3N | 0 | No staining | No |

Example 15

0.25% PAA (Mw~1.6 Million) and 0.1% PAA (Mw~1.6 Million) aqueous solution is prepared by adding various amount of citric acid (CA) to adjust the solution pH. Lens core made from Formulation I is immersed in a PAA aqueous solution for about 2.5 hours at room temperature under agitation. It is then rinsed by PBS saline for 60 minutes till packaging in IPC saline. The lens packaging shell is then sealed and autoclaved at 121° C. for 45 minutes. Table 12 summarizes the results.

TABLE 12

| Lens Formulation Type/[PAA]/dip soln pH/IPC type | Friction rating | Coating Intactness | Surface cracking? |
|---|---|---|---|
| I/0.25%/pH~1.7/IPC-3C | 0 | NA | No |
| I/0.25%/pH~1.7/IPC-3L | 0 | Minor staining | No |
| I/0.25%/pH~1.7/IPC-3K | 0 | NA | No |
| I/0.25%/pH~1.9/IPC-3C | 0 | Minor staining | No |
| I/0.25%/pH~1.9/IPC-3L | 0 | Some staining | No |
| I/0.25%/pH~1.9/IPC-3K | 0 | NA | No |
| I/0.10%/pH~1.9/IPC-3C | 0 | Minor staining | Yes |
| I/0.10%/pH~1.9/IPC-3L | 0 | Minor staining | No |

Example 16

In addition to the PAA molecular weights, various concentrations and dip time, various acids are also used to adjust the pH of the PAA solutions to prepare it for the coating process. Selected acids that are assessed are listed in Example 16. The acids used are added either at various concentrations or to achieve various pH values. The results are listed in Table 13 and 14. As demonstrated in previous examples, either formulation II or both have been assessed for some conditions. Furthermore, different dip times (2 h vs. 2.5 h) and IPCs are accesses. The results from these studies are listed in the tables below.

Similar to before, lenses were coated for a pre-determined amount of time in various PAA solutions, followed by exchange with PBS for various times. The lenses are then directly transferred into the blisters pre-loaded with IPC saline and then sealed and autoclaved at 121° C. for 45 minutes. Lens surface properties are listed below.

TABLE 13

| Lens Formulation Type/PAA mwt./acid type/acid amount/ total dip time/IPC type | Friction rating | Coating Intactness | Surface cracking*? |
|---|---|---|---|
| I/1621PA/2.5%/3L/2.5 h | 0 | No staining | No |
| I/963/PA/5.5%/3L/2.5 h | 0 | N/A | No |
| I/963/PA/3.7%/3L/2.5 h | 0 | N/A | No |
| I/963/PA/3.7%/3L/2 h | 0 | N/A | No |
| I/1621/PA/2.5%/3L/2.5 h | 0 | No staining | No |
| II/1621/PA/2.5%/3L/2.5 h | 0 | N/A | No |

*All lenses are soaked in PBS (without NaCl) for 60 mins prior to packaging into IPC solution

TABLE 14

| Lens Formulation Type/PAA mol. wt./pH/IPC type* | Friction rating | Coating Intactness | Surface cracking*? |
|---|---|---|---|
| I/1621/1.1/3L/HCl | 0 | N/A | No |
| I/1621/0.5/3L/HCl | 0 | N/A | No |
| II/1621/1.1/3L/HCl | 0 | N/A | No |
| II/1621/0.5/3L/HCl | 0 | N/A | Yes |
| I/1621/1.0/3L/HNO$_3$ | 0 | N/A | Yes |
| I/1621/0.5/3L/HNO$_3$ | 0 | N/A | Yes |
| II/1621/1.0/3L/HNO$_3$ | 0 | N/A | Yes |
| II/1621/0.5/3L/HNO$_3$ | 0 | N/A | Yes |
| I/1621/1.0/3L/HNO$_3$/1 h** | 0 | N/A | No |

*All lenses are soaked in PBS for 60 mins prior to packaging into IPC solution and total dip time for all lenses is 2 h and packaged in 3L.
**Total dip time = 1 h

Example 17

PBS and PB (w/o NaCl) are prepared in Example 3 and used in this Example.

Preparation of PAA Aqueous Solution

An aqueous solution of polyacrylic acid (PAA) is prepared by adding adequate amount of PAA in water (distilled or deionized water). After PAA is fully dissolved, the pH is adjusted by adding ~1.85% formic acid to the PAA aqueous solution to about 2. The target concentration of PAA is about 0.1% by weight. The prepared PAA aqueous solution is filtered to remove any particulate or foreign matter.

IPC Saline

IPC saline is prepared as follows. Poly(AAm-co-AA)(90/10) partial sodium salt, poly(AAm-co-AA) 90/10, Mw 200,000) is purchased from Polysciences, Inc. and used as received. Kymene or PAE solutions of different solid contents is purchased from Ashland as an aqueous solution and used as received. 0.132 w/w % of PAAm-PAA and about 0.11 w/w % of PAE is mixed together in PBS and pre-treated at 65° C. for about 6 hr. After the heat pre-treatment, the IPC saline is cooled down back to room temperature. Up to 5 ppm hydrogen peroxide maybe added to the final IPC saline to prevent bioburden growth and the IPC saline is filtered using a 0.22 micron membrane filter.

PAA-Dip Coating

After de-molding, dry silicone hydrogel contact lenses (prepared in Example 2, formulation II) are placed in adequate trays. Then the trays with lenses are immersed in a PAA solution for a certain periods of time, either for 120 min in one bath of PAA, or in two consecutive baths of PAA with 30 min dip in the 1$^{st}$ bath and 90 min dip in the 2$^{nd}$ bath. The PAA dip solution is heated to above room temperature, for example 40° C. Adequate agitation (e.g. horizontal shaking or up-down movement) may be used to ensure appropriate flow of PAA solution during the dip step.

After PAA dip, the lenses are transferred to a bath with PB for up to about an hour, usually at room temperature. Adequate agitation (e.g. horizontal shaking or up-down movement) may be used to ensure appropriate flow of PB during the dip step.

Then lenses are transferred to a bath with water for about 5-10 min, usually at room temperature. Adequate agitation (e.g. horizontal shaking or up-down movement) may be used to ensure appropriate flow of water during the dip step Application of Cross-Linked Coating (In-Packaging-Coating, IPC)

PAA dip coated lenses thereon prepared above are placed in polypropylene lens packaging shells (one lens per shell) with 0.55 mL or 0.65 ml of the IPC saline (about half of the saline may be added prior to inserting the lens). The blisters are then sealed with foil and autoclaved for about 45 minutes at about 121° C., forming SiHy contact lenses with cross-linked coatings (PAA-x-hydrophilic polymeric material) thereon. To test coating durability, the lenses may also be subjected to multiple or continuous autoclave for more than 45 mins Surface Properties of Coated Lenses The finger lubricity for the coated lenses are evaluated for lenses out of pack (OOP), the fingers lubricity is rated as 0. The coating uniformity or intactness is tested by Sudan black dye testing and the coating passed Sudan black dye testing.

The lens is also autoclaved 90 min at 121° C., the finger lubricity remains to have a rating of 0. The lenses after 90 min autoclave also passed Sudan black dye testing.

What is claimed is:

1. A method for producing coated silicone hydrogel contact lenses each having a durable crosslinked hydrophilic coating thereon, comprising the steps of:
    (1) introducing a polymerizable composition into a lens mold, wherein the polymerizable composition comprises
        (a) at least silicone-containing polymerizable component which is at least one siloxane-containing vinylic monomer, at least one silicone-containing vinylic macromer, or a combination thereof,
        (b) at least one vinylic crosslinking agent,
        (c) a blending vinylic monomer, wherein the blending vinylic monomer is a $C_1$-$C_{10}$ alkyl (meth)acrylate, cyclopentylacrylate, cyclohexylmethacrylate, cyclohexylacrylate, isobornyl (meth)acrylate, styrene, 4,6-trimethylstyrene (TMS), t-butyl styrene (TBS), trifluoroethyl (meth)acrylate, hexafluoro-isopropyl (meth)acrylate, hexafluorobutyl (meth)acrylate, or combinations thereof, (d) from about 30% to about 60% by weight of at least one N-vinyl amide monomer relative to the total amount of polymerizable components, wherein said at least one N-vinyl amide monomer is N-vinylpyrrolidone, N-vinyl-N-methyl acetamide, N-vinyl acetamide, N-vinyl formamide, N-vinyl isopropylamide, or a mixture thereof, and
        (e) at least one free-radical initiator;
    (2) curing thermally or actinically the polymerizable composition in the lens mold to form a silicone hydrogel contact lens;
    (3) forming a stable base coating on the formed silicone hydrogel contact lens according to a water-based coating process which comprises
        (i) a substep of immersing the formed silicone hydrogel contact lens in an aqueous solution of a polyanionic polymer having carboxyl groups and a number average molecular weight of at least about 100000 Daltons for a time period of from about 60 minutes to about 240 minutes, wherein the aqueous solution has a pH of from about 0 to about 3.5, and
  (ii) a substep of rinsing the silicone hydrogel contact lens having the base coating thereon with a buffered saline having a pH from about 6.5 to about 9.5; and
(4) heating the rinsed silicone hydrogel contact lens having the stable base coating thereon in a packaging solution including a water-soluble, thermally-crosslinkable hydrophilic polymeric material at a temperature from about 60° C. to about 140° C. to form the durable crosslinked hydrophilic coating, wherein the packaging solution has a pH from about 6.8 to about 7.6 and a tonicity of from about 200 to about 450 milliosmol (mOsm), wherein the durable crosslinked hydrophilic coating exhibits a water-break-up-time (WBUT) of at least about 5 seconds, a friction rating of about 3 or lower, and a coating durability characterized by surviving a digital rubbing test,
provided that after step (2) the silicone hydrogel contact lens is not in contact with any organic solvent other than propylene glycol and polyethylene glycol having a molecular weight of 400 Daltons or less to remove unpolymerized polymerizable components.

2. The method of claim 1, wherein the polymerizable composition comprises from about 35% to about 56% by weight of N-vinylpyrrolidone relative to the total amount of polymerizable components.

3. The method of claim 1, wherein the polymerizable composition is a solution of all used components dissolved in propylene glycol or a polyethylene glycol having a molecular weight of about 400 Daltons or less.

4. The method of claim 1, wherein the polymerizable composition is free of any organic solvent.

5. The method of claim 1, wherein the step of curing is carried out thermally for a time period of at least about 60 minutes, wherein the polymerizable composition comprises at least one thermal free-radical initiator.

6. The method of claim 1, wherein the step of curing is carried out by UV/visible irradiation, wherein the polymerizable composition comprises at least one free-radical photoinitiator.

7. The method of claim 1, wherein the polyanionic polymer is polyacrylic acid, polymethacrylic acid, poly(2-ethylacrylic acid), poly(acrylic acid-co-methacrylic acid), poly(acrylic acid-co-ethacrylic acid), poly(methacrylic acid-co-ethacrylic acid), or a mixture thereof.

8. The method of claim 7, wherein the aqueous solution of the polyanionic polymer has a pH of about 0 to about 2.5, wherein the concentration of the polyanionic polymer is from about 0.01% by weight to about 10% by weight.

9. The method of claim 7, wherein the aqueous solution of the polyanionic polymer has a temperature of from about 35° C. to about 90° C.

10. The method of claim 7, wherein the silicone hydrogel contact lens is immersed in the aqueous solution of the polyanionic polymer for a time period of from about 60 minutes to about 240 minutes.

11. The method of claim 7, wherein the silicone hydrogel contact lens having the base coating thereon is rinsed with a buffered saline having a pH from about 6.8 to about 8.

12. The method of claim 7, wherein the silicone hydrogel contact lens having the base coating thereon is rinsed with a buffered saline having a temperature of from about 22° C. to about 28° C.

13. The method of claim 7, further comprising a step of immersing the silicone hydrogel contact lens in a buffered saline before the step of forming the base coating.

14. The method of claim 7, further comprising a step of immersing the silicone hydrogel contact lens in water before the step of forming the base coating.

15. The method of claim 7, further comprising a step of immersing the silicone hydrogel contact lens in a water with pH adjusted by oxidative acid or non-oxidative acid before the step of forming the base coating.

16. The method of claim 7, wherein the step of heating is carried out directly in a sealed lens package containing a packaging solution including the water-soluble, thermally crosslinkable hydrophilic polymeric material during sterilization by autoclave at a temperature from about 115° C. to about 125° C. for at least about 20 minutes.

17. The method of claim 7, wherein the water-soluble thermally crosslinkable hydrophilic polymeric material is a poly(2-oxazoline-co-ethyleneimine)-epichlorohydrin, a chemically-modified poly(2-oxazoline-co-ethyleneimine)-epichlorohydrin, a chemically-modified polyamidoamine-epichlorohydrin, or combinations thereof, wherein the chemically-modified poly(2-oxazoline-co-ethyleneimine)-epichlorohydrin or the chemically-modified polyamidoamine-epichlorohydrin comprises (i) from about 20% to about 95% by weight of first polymer chains derived from a polyamidoamine-epichlorohydrin or a poly(2-oxazoline-co-ethyleneimine)-epichlorohydrin, (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent, and (iii) azetidinium groups which are parts of the first polymer chains or pendant or terminal groups covalently attached to the first polymer chains.

18. The method of claim 17, wherein the water-soluble thermally crosslinkable hydrophilic polymeric material is a chemically-modified poly(2-oxazoline-co-ethyleneimine)-epichlorohydrin or a chemically-modified polyamidoamine-epichlorohydrin, wherein the chemically-modified poly(2-oxazoline-co-ethyleneimine)-epichlorohydrin and the chemically-modified polyamidoamine-epichlorohydrin independently of each other comprise:
  (i) from about 20% to about 95% by weight of first polymer chains derived from a polyamidoamine-epichlorohydrin or a poly(2-oxazoline-co-ethyleneimine)-epichlorohydrin;
  (ii) from about 5% to about 80% by weight of hydrophilic moieties or second polymer chains derived from at least one hydrophilicity-enhancing agent having at least one reactive functional group selected from the group consisting of amino group, carboxyl group, thiol group, and combination thereof; and
  (iii) positively-charged azetidinium groups which are parts of the first polymer chains or pendant or terminal groups covalently attached to the first polymer chains, wherein the hydrophilic moieties or second polymer chains are covalently attached to the first polymer chains through one or more covalent linkages each formed between one azetitdinium group of the polyamidoamine-epichlorohydrin or the poly(2-oxazoline-co-ethyleneimine)-epichlorohydrin and one amino, carboxyl or thiol group of the hydrophilicity-enhancing agent.

19. The method of claim 18, wherein the hydrophilicity-enhancing agent is: PEG-NH$_2$; PEG-SH; PEG-COOH; H$_2$N-PEG-NH$_2$; HOOC-PEG-COOH; HS-PEG-SH; H$_2$N-PEG-COOH; HOOC-PEG-SH; H$_2$N-PEG-SH; multi-arm PEG with one or more amino, carboxyl or thiol groups; PEG dendrimers with one or more amino, carboxyl or thiol groups; a diamino-, dicarboxyl-, monoamino- or monocarboxyl-terminated homo- or co-polymer of a non-reactive hydrophilic vinylic monomer; or combinations thereof, wherein PEG is a polyethylene glycol segment, wherein the non-reactive vinylic monomer is selected from the group consisting of acrylamide, methacrylamide, N,N-dimethylacrylamide, N,N-dimethylmethacrylamide, N-vinylpyrrolidone, N,N-dimethylaminoethylmethacrylate, N,N-dimethylaminoethylacrylate, N,N-dimethylaminopropylmethacrylamide, N,N-dimethylaminopropylacrylamide, glycerol methacrylate, 3-acryloylamino-1-propanol, N-hydroxyethyl acrylamide, N-[tris(hydroxymethyl)methyl]-acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, a phosphorylcholine-containing vinylic monomer, C$_1$-C$_4$-alkoxy polyethylene glycol (meth)acrylate having a number average molecular weight of up to 1500 Daltons, N-vinyl formamide, N-vinyl acetamide, N-vinyl isopropylamide, N-vinyl-N-methyl acetamide, allyl alcohol, vinyl alcohol, and combinations thereof.

20. The method of claim 18, wherein the hydrophilicity-enhancing agent is a copolymer which is a polymerization product of a composition comprising (1) about 60% by weight or less by weight of at least one reactive vinylic monomer and (2) at least one non-reactive hydrophilic vinylic monomer, wherein the reactive vinylic monomer is selected from the group consisting of amino-C$_1$-C$_6$ alkyl (meth)acrylate, C$_1$-C$_6$ alkylaminoC$_1$-C$_6$ alkyl (meth)acrylate, allylamine, vinylamine, aminoC$_1$-C$_6$ alkyl (meth)acrylamide, C$_1$-C$_6$ alkylamino-C$_1$-C$_6$ alkyl (meth)acrylamide, acrylic acid, C$_1$-C$_4$ alkylacrylic acid, N,N-2-acrylamidoglycolic acid, beta-methyl-acrylic acid, alpha-phenyl acrylic acid, beta-acryloxy propionic acid, sorbic acid, angelic acid, cinnamic acid, 1-carboxy-4-phenyl butadiene-1,3, itaconic acid, citraconic acid, mesaconic acid, glutaconic acid, aconitic acid, maleic acid, fumaric acid, tricarboxy ethylene, and combinations thereof;

wherein the non-reactive vinylic monomer is selected from the group consisting of acrylamide, methacrylamide, N,N-dimethylacrylamide, N,N-dimethylmethacrylamide, N-vinylpyrrolidone, N,N-dimethylaminoethylmethacrylate, N,N-dimethylaminoethylacrylate, N,N-dimethylaminopropylmethacrylamide, N,N-dimethylaminopropylacrylamide, glycerol methacrylate, 3-acryloylamino-1-propanol, N-hydroxyethyl acrylamide, N-hydroxyethyl methacrylamide, N-hydroxypropyl acrylamide, N-hydroxypropyl methacrylamide, N-[tris(hydroxymethyl)methyl]acrylamide, N-methyl-3-methylene-2-pyrrolidone, 1-ethyl-3-methylene-2-pyrrolidone, 1-methyl-5-methylene-2-pyrrolidone, 1-ethyl-5-methylene-2-pyrrolidone, 5-methyl-3-methylene-2-pyrrolidone, 5-ethyl-3-methylene-2-pyrrolidone, 2-hydroxyethyl (meth)acrylate, hydroxypropyl (meth)acrylate, a phosphorylcholine-containing vinylic monomer, C$_1$-C$_4$-alkoxy polyethylene glycol (meth)acrylate having a number average molecular weight of up to 1500 Daltons, N-vinyl formamide, N-vinyl acetamide, N-vinyl isopropylamide, N-vinyl-N-methyl acetamide, allyl alcohol, vinyl alcohol, and combinations thereof.

21. The method of claim 18, wherein the hydrophilicity-enhancing agent is an amino- or carboxyl-containing polysaccharide, hyaluronic acid, chondroitin sulfate, and combinations thereof.

22. The method of claim 18, wherein the hydrophilicity-enhancing agent is: amino-, carboxyl- or thiol-containing monosaccharides; amino-, carboxyl- or thiol-containing disaccharides; and amino-, carboxyl- or thiol-containing oligosaccharides.

* * * * *